United States Patent
Nagumo

(10) Patent No.: US 8,036,488 B2
(45) Date of Patent: Oct. 11, 2011

(54) IMAGE PROCESSING APPARATUS, IMAGE PROCESSING METHOD AND PROGRAM

(75) Inventor: Takefumi Nagumo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1007 days.

(21) Appl. No.: 11/934,852

(22) Filed: Nov. 5, 2007

(65) Prior Publication Data
US 2008/0175519 A1 Jul. 24, 2008

(30) Foreign Application Priority Data
Nov. 30, 2006 (JP) ................ P2006-324318

(51) Int. Cl.
*G06K 9/40* (2006.01)
(52) U.S. Cl. ............. 382/275; 375/240.16; 375/E7.256
(58) Field of Classification Search ............ 345/3.3; 348/333.11; 375/240.16, E7.104, E7.106, 375/E7.123, E7.164, E7.256, E7.252; 382/148, 382/275, 299
See application file for complete search history.

(56) References Cited

U.S. PATENT DOCUMENTS

| | | | |
|---|---|---|---|
| 7,764,848 B2 * | 7/2010 | Ida et al. ............ | 382/299 |
| 2007/0133903 A1 * | 6/2007 | Zomet et al. .......... | 382/299 |
| 2009/0080805 A1 * | 3/2009 | Tanaka et al. ......... | 382/299 |

FOREIGN PATENT DOCUMENTS

| | | |
|---|---|---|
| JP | 2004-272751 | 9/2004 |
| JP | 2004-295236 | 10/2004 |
| JP | 2005-284635 | 10/2005 |
| JP | 2006-202168 | 8/2006 |

OTHER PUBLICATIONS

Michal Irani et al., Improving Resolution by Image Registration, CVGIP: Graphical Models and Image Processing, vol. 53, No. 3, May 1991, pp. 231-239.

* cited by examiner

*Primary Examiner* — Gregory F Cunningham
(74) *Attorney, Agent, or Firm* — Finnegan, Henderson, Farabow, Garrett & Dunner, L.L.P.

(57) ABSTRACT

An image processing apparatus includes a plurality of addition means and an image processing means. The addition means performs addition processing of adding pixels of a differential image at a second resolution representing a difference between an inputted image at a first resolution and an image at the second resolution higher than the first resolution as pixels of an inputted image at the second resolution. The image processing means is configured to perform second and subsequent addition processing, and generate an image of the second resolution as a processing result by performing the addition processing for a predetermined number of times. The addition processing is performed with inputs of an image at the first resolution and an image at the second resolution obtained by an immediately preceding addition processing, which are different from each other.

9 Claims, 39 Drawing Sheets

RECONSTRUCTED IMAGE
(SR IMAGE)

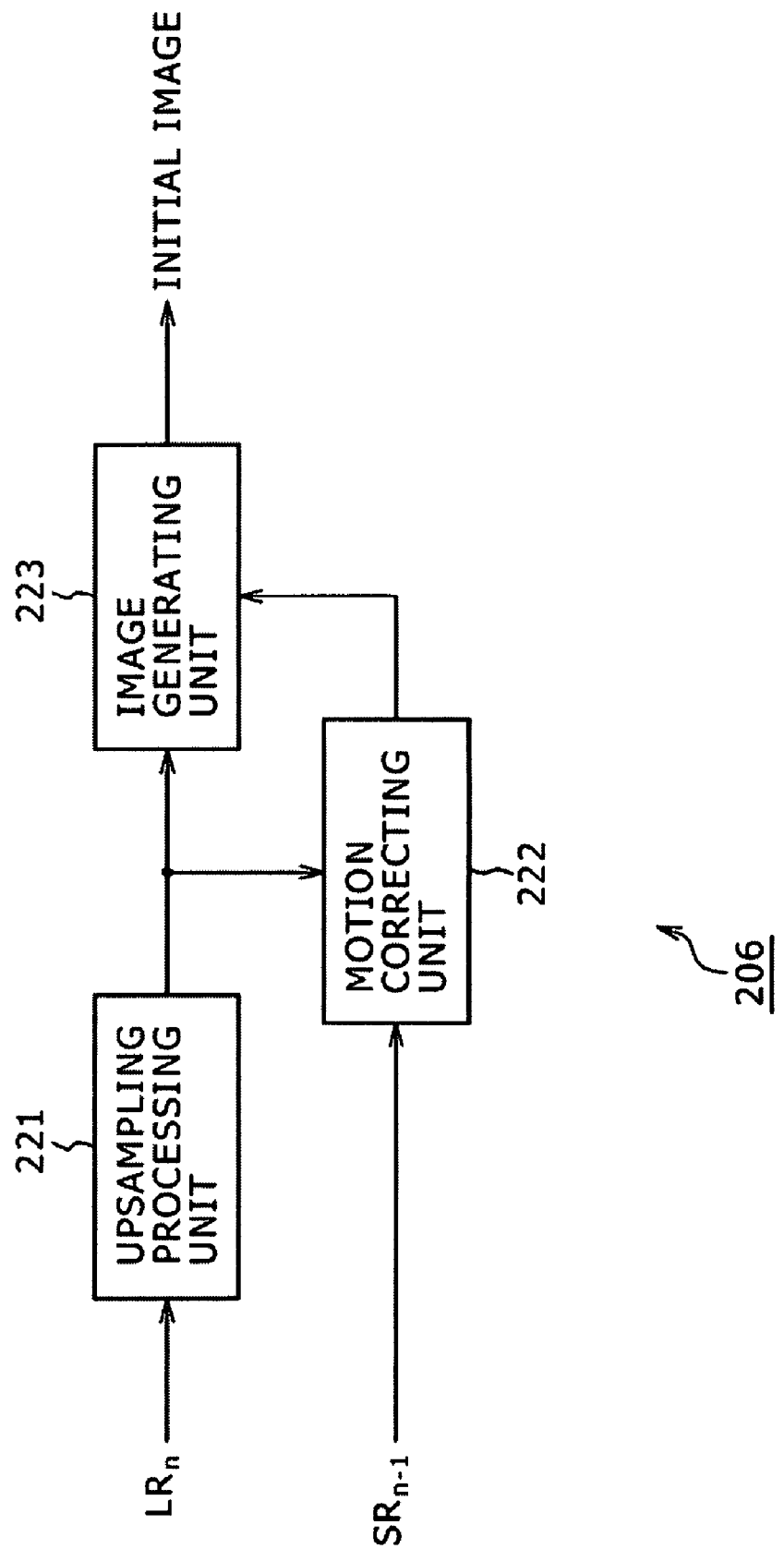

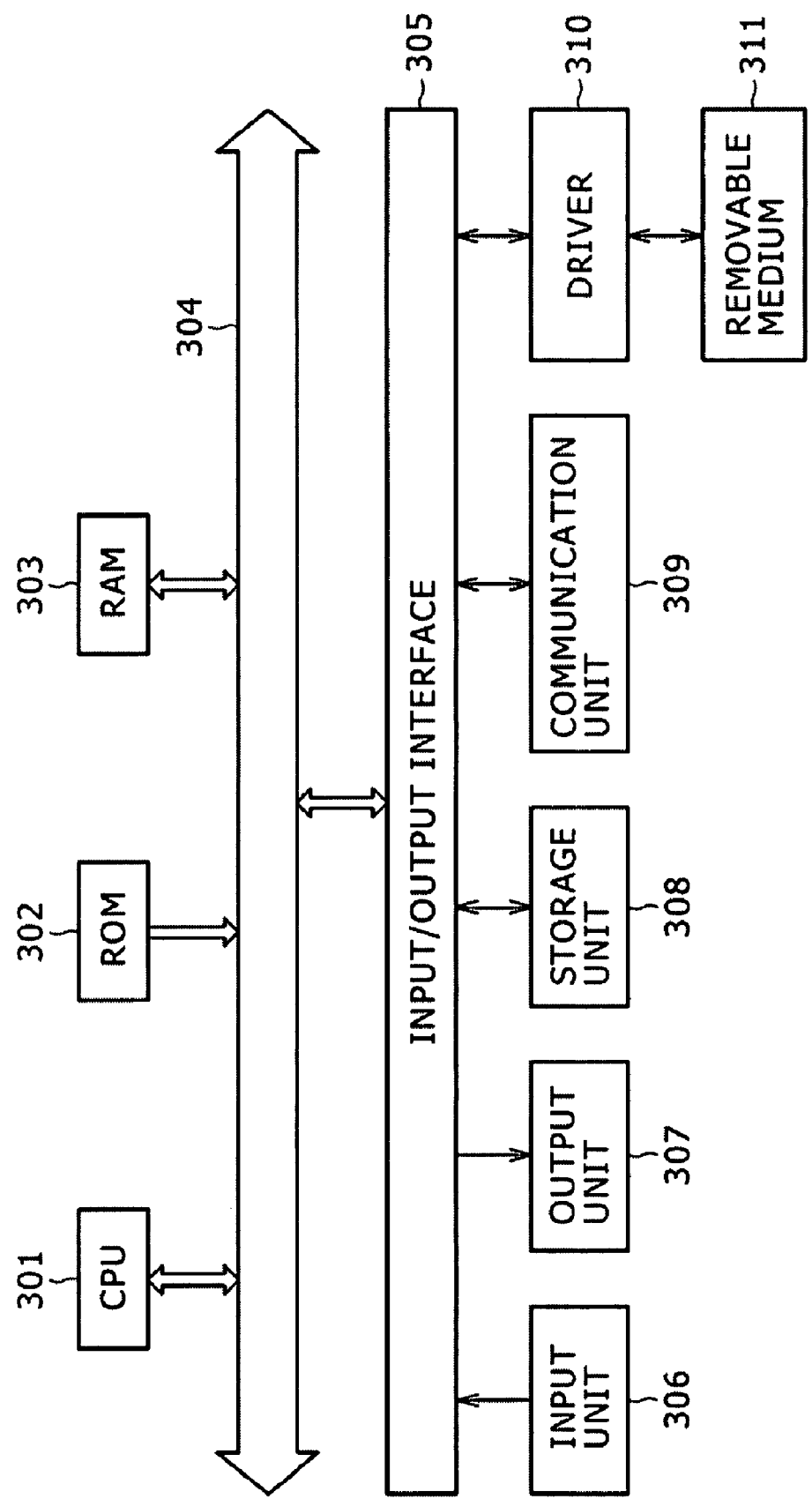

IMAGE PROCESSING APPARATUS, IMAGE PROCESSING METHOD AND PROGRAM

BACKGROUND OF THE INVENTION

1. Field of the Invention

The present invention relates to an image processing apparatus, an image processing method, and a program, and particularly to an image processing apparatus, an image processing method, and a program that attain high-speed process for generating a high-resolution image.

2. Description of Related Art

As a technique for generating a high-resolution image from a low-resolution image, there is super resolution.

Super-resolution is a technique in which a pixel value of each pixel in one frame of high-resolution image is found from a plurality of low-resolution images having overlap to thereby reconstruct an image at a resolution beyond a resolution of an imaging element such as a CCD (Charge Coupled Device) and a CMOS (Complementary Metal Oxide Semiconductor). For example, the super-resolution is used when generating a high-resolution satellite photograph, or the like.

FIGS. 1 and 2 are diagrams showing a principle of super-resolution.

Reference characters a, b, c, d, e, f shown in the upper parts of FIGS. 1 and 2 denote pixel values of a high-resolution image (SR (Super Resolution) image) to be found from low resolution images (LR (Low Resolution) images) obtained by imaging a subject, that is, pixel values of respective pixels when the subject is pixilated at the same resolution as that of the SR image.

For example, in the case where a width of one pixel of an imaging element is equivalent to a width of two pixels constituting the subject, and thus, the subject cannot be captured at the resolution at it is, as shown in FIG. 1, in a left pixel among three pixels of the imaging element, a pixel value of A obtained by mixing pixel values of a and b is captured, in a central pixel, a pixel value of B obtained by mixing pixel values of c and d is captured, and in a right pixel, a pixel value of C obtained by mixing pixel values of e and f is captured.

Reference characters A, B, C denote pixel values of pixels constituting LR images obtained by imaging.

When the subject in a position shifted by a width of 0.5 pixel of the pixel constituting the subject with respect to a position of the subject in FIG. 1 due to camera shake is captured as shown in FIG. 2 (captured while being shifted) together with the subject of FIG. 1, in the left pixel of the three pixels of the imaging element, a pixel value of D obtained by mixing pixel values of half of a, entire b, and half of c is captured, and in the central pixel, a pixel value of E obtained by mixing pixel values of half of c, entire d, and half of e is captured. Moreover, in the right pixel, a pixel value of F obtained by mixing half of e and entire f is captured. Reference characters D, E, F also denote pixel values of pixels constituting LR images obtained by imaging.

The following formula (1) is given from the imaging results of the above-described LR images. By finding a, b, c, d, e and f from formula (1), respectively, an image of a resolution higher than that of the imaging element can be obtained.

$$\begin{pmatrix} 1 & 1 & 0 & 0 & 0 & 0 \\ 0 & 0 & 1 & 1 & 0 & 0 \\ 0 & 0 & 0 & 0 & 1 & 1 \\ 1/2 & 1 & 1/2 & 0 & 0 & 0 \\ 0 & 0 & 1/2 & 1 & 1/2 & 0 \\ 0 & 0 & 0 & 0 & 1/2 & 1 \end{pmatrix} \begin{pmatrix} a \\ b \\ c \\ d \\ e \\ f \end{pmatrix} = \begin{pmatrix} A \\ B \\ C \\ D \\ E \\ F \end{pmatrix} \quad (1)$$

FIG. 3 is a block diagram showing a configuration example of an existing image processing apparatus 1 that generates an SR image by super-resolution processing using Back Projection.

The image processing apparatus 1 of FIG. 3 is provided in a digital camera, for example, to perform processing of a still image obtained by imaging.

As shown in FIG. 3, the image processing apparatus 1 is composed of super-resolution processors $11_0$ to $11_2$, a summing circuit 12, an addition circuit 13, and an SR image buffer 14.

$LR_0$, which is an LR image obtained by imaging, is inputted to the super-resolution processor $11_0$, and $LR_1$ is inputted to the super-resolution processor $11_1$. $LR_2$ is inputted to the super-resolution processor $11_2$. $LR_0$ to $LR_2$ are images obtained by continuously imaging, and have overlap in imaging ranges thereof, respectively. When imaging is continuously performed, normally, the ranges of the subject caught on the images of the imaging results are slightly deviated from each other due to camera shaking or the like, and thus, do not completely coincidence with each other, thereby resulting in partial overlap.

The super-resolution processor $11_0$, based on $LR_0$ and an SR image stored in the SR image buffer 14, generates a differential image representing a difference between them, and outputs a feedback value to the summing circuit 12. The feedback value is a value representing the differential image at the same resolution as that of the SR image.

In the SR image buffer 14, an SR image generated by the super-resolution processing performed immediately before is stored. If the processing has just started, and thus, no frame of SR image has not been generated, for example, an image obtained by upsampling $LR_0$ to an image at the same resolution as that of the SR image is stored in the SR image buffer 14.

Similarly, the super-resolution processor $11_1$, based on $LR_1$ and the SR image stored in the SR image buffer 14, generates a differential image representing a difference between them, and outputs a feedback value representing the generated differential image to the summing circuit 12.

The super-resolution processor $11_2$, based on $LR_2$ and the SR image stored in the SR image buffer 14, generates a differential image representing a difference between them, and outputs a feedback value representing the generated differential image to the summing circuit 12.

The summing circuit 12 averages the feedback values supplied from the super-resolution processors $11_0$ to $11_2$, and outputs an image at the same resolution as that of the SR image, which has been obtained by averaging, to the addition circuit 13.

The addition circuit 13 adds the SR image stored in the SR image buffer 14 and the SR image supplied from the summing circuit 12 and outputs an SR image obtained by the addition. The output of the addition circuit 13 is supplied outside of the image processing apparatus 1 as a result of the super-resolution processing, and at the same time, is supplied to the SR image buffer 14 to be stored.

FIG. 4 is a block diagram showing a configuration example of the super-resolution processor $11_n$ (super-resolution processor $11_0$, $11_1$ or $11_2$).

As shown in FIG. 4, the super-resolution processor $11_n$ is made of a motion vector detecting circuit 21, a motion compensating circuit 22, a downsampling filter 23, an addition circuit 24, an upsampling filter 25, and a reverse-direction motion compensating circuit 26.

The SR image read from the SR image buffer 14 is inputted to the motion vector detecting circuit 21 and the motion compensating circuit 22, and $LR_n$ obtained by imaging is inputted to the motion vector detecting circuit 21 and the addition circuit 24.

The motion vector detecting circuit 21 detects a motion vector with the SR image used as a reference, based on the inputted SR image and $LR_n$, and outputs the detected motion vector to the motion compensating circuit 22 and the reverse-direction motion compensating circuit 26.

The motion compensating circuit 22 applies the motion compensation to the SR image based on the motion vector supplied from the motion vector detecting circuit 21, and outputs an image obtained by applying the motion compensation to the downsampling filter 23. The position of an object caught on the image obtained by applying the motion compensation becomes closer to the position of the object caught on $LR_n$.

The downsampling filter 23 generates an image at the same resolution as that of $LR_n$ by downsampling the image supplied from the motion compensating circuit 22, and outputs the generated image to the addition circuit 24. Finding the motion vector from the SR image and $LR_n$, and converting the image obtained by the motion compensation using the found motion vector into the image at the same resolution as that of LR image corresponds to simulating the image obtained by imaging based on the SR image stored in the SR image buffer 14.

The addition circuit 24 generates a differential image representing a difference between $LR_n$ and the image simulated in such a manner, and outputs the generated differential image to the upsampling filter 25.

The upsampling filter 25 generates an image at the same resolution as that of the SR image by upsampling the differential image supplied from the addition circuit 24, and outputs the generated image to the reverse-direction motion compensating circuit 26.

The reverse-direction motion compensating circuit 26 applies motion compensation in the reverse direction to the image supplied from the upsampling filter 25, based on the motion vector supplied from the motion vector detecting circuit 21, and outputs a feedback value representing an image obtained by applying the motion compensation in the reverse direction to the summing circuit 12. The position of the object caught on the image obtained by the motion compensation in the reverse direction becomes closer to the position of the object caught on the SR image stored in the SR image buffer 14.

There has been developed to try and address the known issues with image processing (See, e.g., "Improving Resolution by Image Registration", MICHAL IRANI AND SHMUEL PELEG, Department of Computer Science, The Hebrew University of Jerusalem, 91904 Jerusalem, Israel, Communicated by Rama Chellapa, Received Jun. 16, 1989; accepted May 25, 1990).

SUMMARY OF THE INVENTION

The super-resolution processing by Back Projection is usually repeated a plurality of times to obtain one frame of SR image having a sufficient resolution. For example, if the SR image generated by the image processing apparatus 1 of FIG. 3 and outputted from the addition circuit 13 does not have the sufficient resolution, the SR image is stored in the SR image buffer 14, and then, is reused as inputs of the super-resolution processors $11_0$ to $11_2$ to repeat the super-resolution processing.

As a result of this, it takes a long time to obtain the SR image having the sufficient resolution.

Accordingly, it is desirable to provide an improved technique which achieves high-speed processing for generating a high-resolution image.

In accordance with one aspect of the present invention, there is provided an image processing including; addition means for performing addition processing of adding pixels of a differential image at a second resolution representing a difference between an inputted image at a first resolution and an image at the second resolution higher than the first resolution as pixels of an inputted image at the second resolution, and image processing means including a plurality of the addition means. The image processing means is configured to perform second and subsequent addition processing, and generate an image of the second resolution as a processing result by performing the addition processing for a predetermined number of times, the addition processing being performed with inputs of an image at the first resolution and an image at the second resolution obtained by an immediately preceding addition processing, which are different from each other.

The image processing apparatus may further include control means for controlling whether or not to perform the next addition processing with the input of the image at the second resolution obtained by the addition processing, based on the image at the second resolution obtained by the addition processing.

The image processing apparatus may further include adjustment means for performing adjustment of a gain of a signal representing the differential image.

The image processing apparatus may further include adjustment means for performing at least any one of adjustment of a gain of the signal representing the image at the second resolution inputted as the image used to obtain the differential image, and adjustment of a gain of the signal representing the found differential image.

The image processing apparatus may further include generation means for generating an initial image at the second resolution, which is the input of the first addition processing. When the image processing means generates an image at the second resolution as a processing result of an n-th frame using an picked-up image at the first resolution of an n-th frame, the generating means may generate as the initial image an image in which a part of pixels constituting an image at the second resolution of a processing result of an (n−1)-th frame are replaced with pixels constituting an image obtained by upsampling the image at the first resolution of the n-th frame.

The generating means may further include upsampling processing means for upsampling the image at the first resolution of the n-th frame obtained by imaging, correction means for applying motion compensation to the image at the second resolution as the processing result of the (n−1)-th frame, using a motion vector detected based on the image at the second resolution as the processing result of the (n−1)-th frame and the image obtained with the upsampling of the upsampling processing means, and image generating means for generating the initial image by replacing pixels in a region where an object whose position is moved by the motion compensation is displayed in the image obtained by applying the motion compensation by the correction means, with pixels of the image obtained with upsampling of the upsampling processing means, in a region located correspondingly.

An image processing method or a program of one aspect of the present invention includes the step of performing second and subsequent addition processing with the inputs of the image at the first resolution and the image at the second resolution obtained by an immediately preceding addition processing, which are different from each other, and generating an image at the second resolution as a processing result by performing the addition processing for a predetermined number of times.

In one aspect of the present invention, the addition processing is performed with inputs of an image at the first resolution and an image at the second resolution obtained by the immediately preceding addition processing, which are different from each other, and an image at the second resolution as a processing result is generated by performing the addition processing for a predetermined number of times.

According to one aspect of the present invention, high-speed processing for generating a high-resolution image is realized.

These and other features and aspects of the invention are set forth in detail below with reference to the accompanying drawings in the following detailed description of the embodiments.

BRIEF DESCRIPTION OF THE DRAWINGS

FIG. 26 is a block diagram showing a configuration example of an initial image generating circuit.

FIG. 41 is a block diagram showing a configuration example of a personal computer.

DETAILED DESCRIPTION OF THE EMBODIMENTS

Hereinafter, embodiments of the present invention are described, and corresponding relations between constitutional requirements of the present invention and the embodiments described and shown in the specification and the drawings are exemplified as follows. This description is intended to confirm that the embodiments supporting the present invention are described in the specification and the drawings. Accordingly, even if there is an embodiment not described herein as an embodiment corresponding to a constitutional requirement of the present invention although it is described or shown in the specification or the drawings, it does not mean that the embodiment does not correspond to the constitutional requirement. On the contrary, even if an embodiment is described here as one corresponding to the present invention, it does not mean that the embodiment does not correspond to other than the constitutional requirement.

Figure 7:
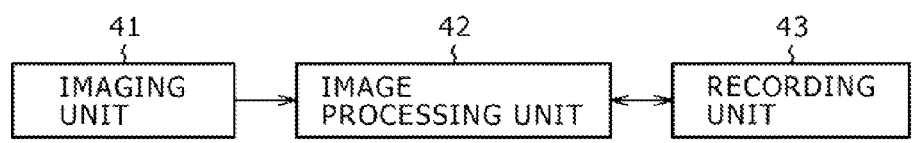
FIG. 7 is a block diagram showing a configuration example of the imaging apparatus.

An image processing apparatus of an embodiment of the present invention (e.g., an imaging apparatus 31 of FIG. 5) includes image processing means (e.g., an image processing unit 42 of FIG. 7). The image processing means includes a plurality of addition means (e.g., an addition circuit $52_0$ in FIG. 8). The addition means performs addition processing of adding pixels of a differential image at a second resolution representing a difference between an inputted image at a first resolution and an image at the second resolution higher than the first resolution as pixels of an inputted image at the second resolution. The image processing means is configured to perform second and subsequent addition processing, and generate an image at the first resolution and an image at the second resolution obtained by an immediately preceding addition processing, which are different from each other.

The imaging processing apparatus may be further provided with control means (e.g., a loop control circuit $71_0$ in FIG. 12) for performing the control as to whether or not to perform the next addition processing with the input of the image at the second resolution obtained by the addition processing, based on the image at the second resolution obtained by the addition processing.

Furthermore, an adjustment means for performing adjustment of a gain of a signal representing the differential image (e.g., a feedback gain control circuit 81 of FIG. 14) may be provided.

Also, an adjustment means (e.g., a taste control circuit 101 of FIG. 18) for performing at least any one of adjustment of a gain of the signal representing the image at the second resolution inputted as the image used to obtain the differential image, and adjustment of a gain of the signal representing the found differential image may be further provided.

Generation means (e.g., an initial image generating circuit 206 of FIG. 25) for generating an initial image at the second resolution which is an input of the first addition processing may be further provided.

The generating means may be provided with upsampling processing means (e.g., an upsampling processing unit 221 of FIG. 26) for upsampling an image at the first resolution of an n-th frame obtained by imaging, correction means (e.g., a motion correcting unit 222 of FIG. 26) for applying motion compensation to the image at the second resolution as a processing result of the (n−1)-th frame, using a motion vector detected based on the image at the second resolution as the processing result of the (n−1)-th frame and the image obtained with the upsampling of the upsampling processing means, and image generating means (e.g., an image generating unit 223 of FIG. 26) for generating the initial image by replacing pixels in a region where an object whose position is moved by the motion compensation is displayed in the image obtained by applying the motion compensation by the correction means, with pixels of the image obtained with the upsampling of the upsampling processing means, in a region located correspondingly.

Hereinafter, embodiments of the present invention are described referring to the drawings.

Figure 5:
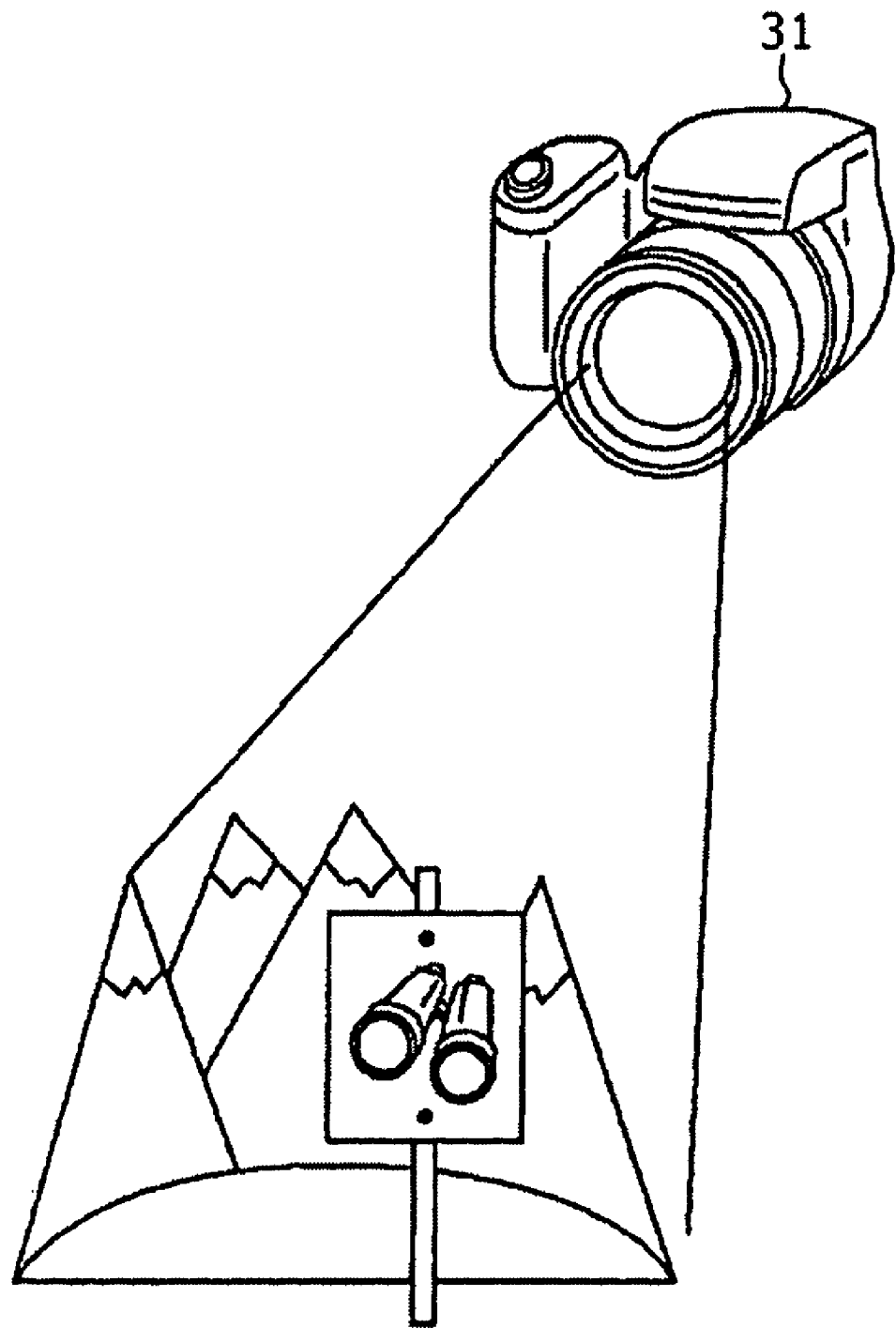
FIG. 5 is a diagram showing an imaging apparatus according to one embodiment of the present invention.

FIG. 5 is a diagram showing the imaging apparatus 31 according to one embodiment of the present invention.

The imaging apparatus 31, which is a digital camera, takes a still picture in accordance with user operation and a moving picture at a predetermined frame rate. Moreover, the imaging apparatus 31 also generates an SR image at a high resolution by super-resolution processing using LR images obtained by the above-described imaging functions.

Figure 6:
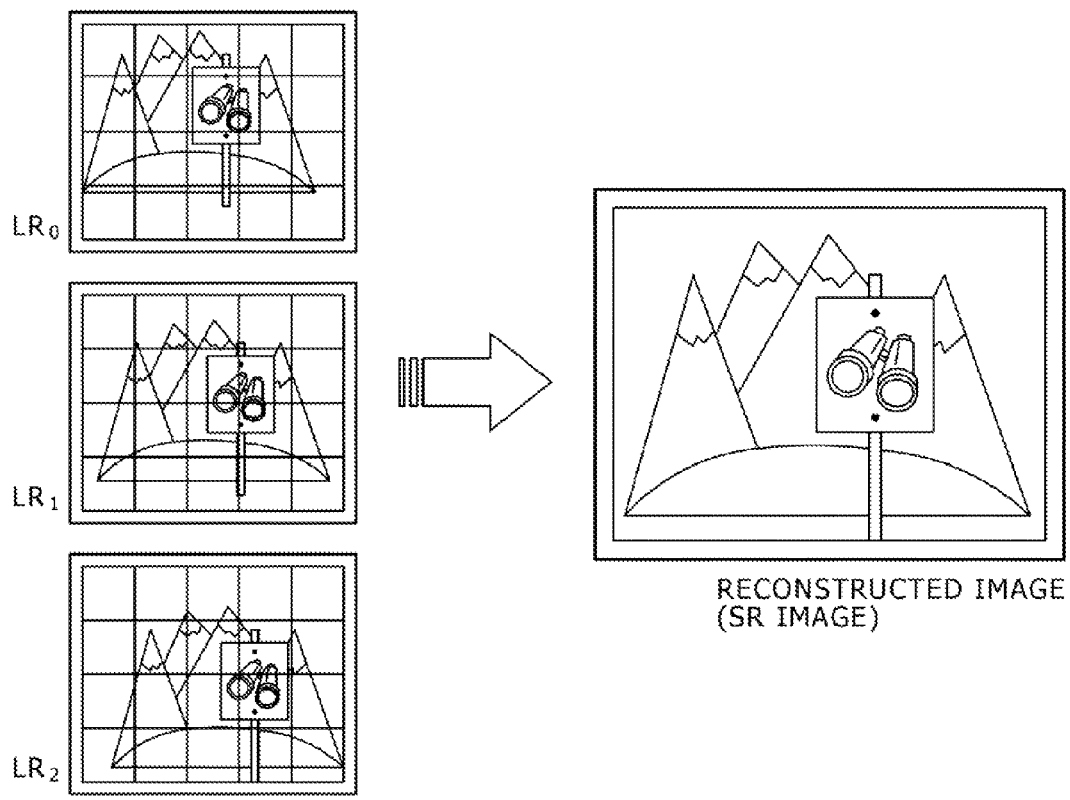
FIG. 6 is a diagram showing one example of super-resolution processing.

FIG. 6 is a diagram showing an example of the super-resolution processing.

In the example of FIG. 6, reconstruction of an image is performed based on $LR_0$ to $LR_2$, which are LR images obtained by imaging to generate one frame of SR image. $LR_0$ to $LR_2$ are the LR images picked up continuously, and thus, have overlap in the imaging ranges. Vertical lines and horizontal lines shown in such a manner as to overlap $LR_0$ to $LR_2$ in FIG. 6 are given for convenience of description.

The imaging apparatus 31 performs a super-resolution processing using an SR image in addition to the LR images as shown in FIG. 6 when generating the SR image.

FIG. 7 is a block diagram showing a configuration example of the imaging apparatus 31.

As shown in FIG. 7, the imaging apparatus 31 is composed of an imaging unit 41, the image processing unit 42, and a recording unit 43.

The imaging unit 41 performs the imaging of a still picture or a moving picture, and outputs the LR images obtained by imaging to the image processing unit 42.

The image processing unit 42 performs the super-resolution processing based on the LR images supplied from the imaging unit 41, and outputs an SR image obtained by the super-resolution to the recording unit 43. The super-resolution processing by the image processing unit 42 is repeated in accordance with the control by the recording unit 43 until an SR image having a target resolution is generated.

When the SR image supplied from the image processing unit 42 has a sufficient resolution, the recording unit 43 records the SR image in a predetermined recording medium such as a flash memory, and controls the image processing unit 42 to stop repeating the super-resolution processing. The resolution of the SR image recorded on the recording medium is higher than the resolution of an imaging element provided in the imaging unit 41.

Figure 8:
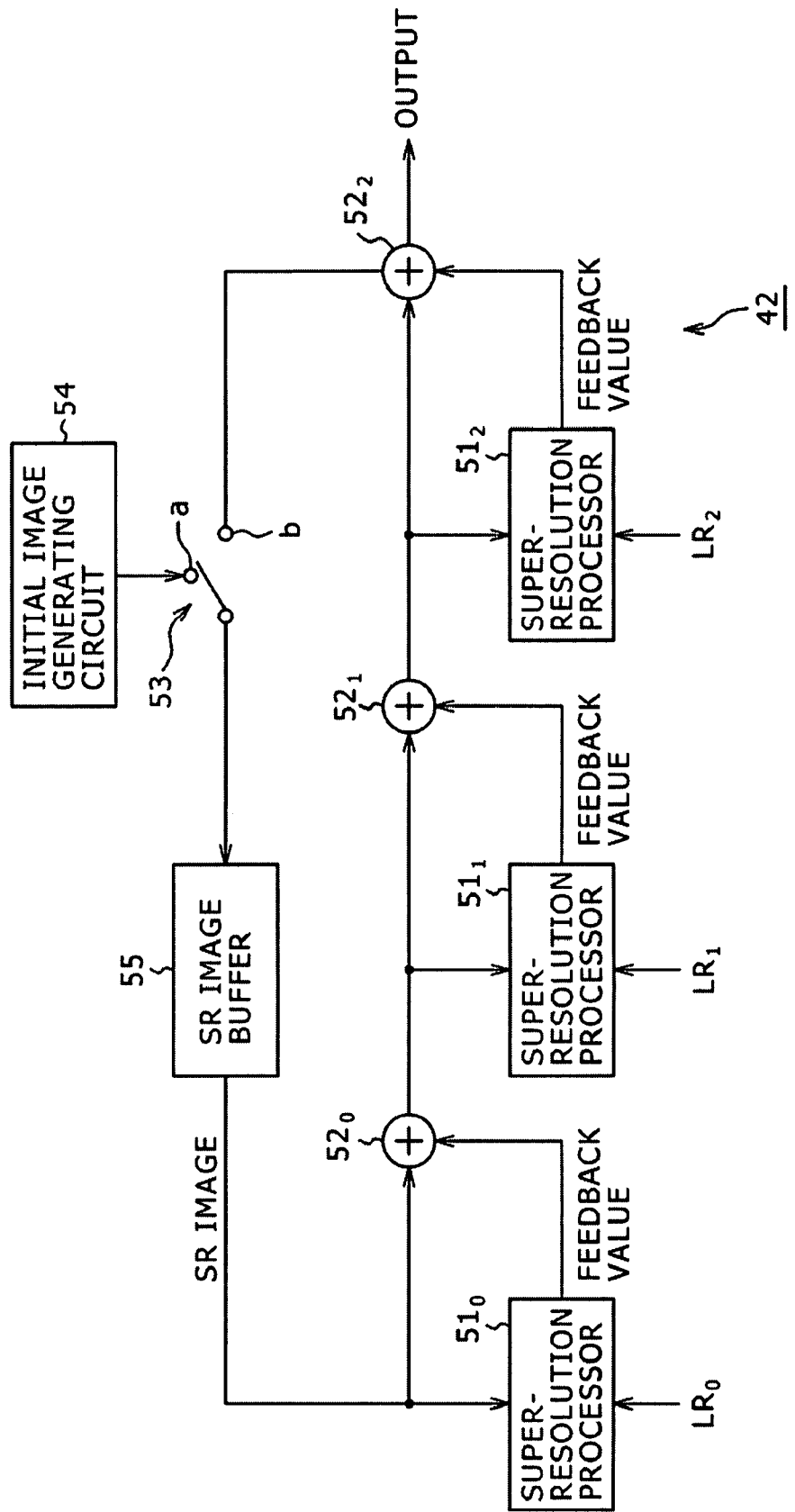
FIG. 8 is a block diagram showing a configuration example of an image processing unit.

FIG. 8 is a block diagram showing a configuration example of the image processing unit 42 of FIG. 7.

The configuration of the image processing unit 42 shown in FIG. 8 is prepared, for example, as one realizing the function of imaging a still picture, and is made of super-resolution processors $51_0$ to $51_2$, addition circuits $52_0$ to $52_2$, a switch 53, an initial image generating circuit 54, and an SR image buffer 55.

In the example of FIG. 8, a feedback value found by the super-resolution processor $51_0$ is added to an SR image stored in the SR image buffer 55, and an SR image obtained by the first addition processing is added to a feedback value found by the next super-resolution processor $51_1$, and further, an SR image obtained by the second addition processing is added to a feedback value found by the next super-resolution processor $51_2$. In this manner, an SR image is generated by the super-resolution processing using the Gauss-Seidel method.

Figure 1:
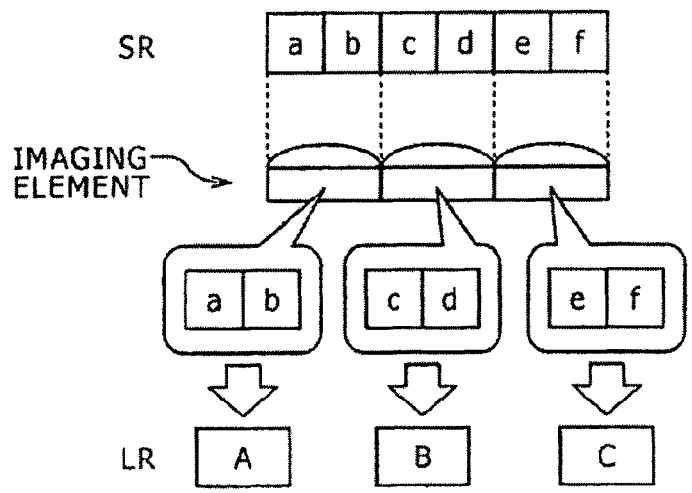
FIG. 1 is a diagram showing a principle of super-resolution.
Figure 2:
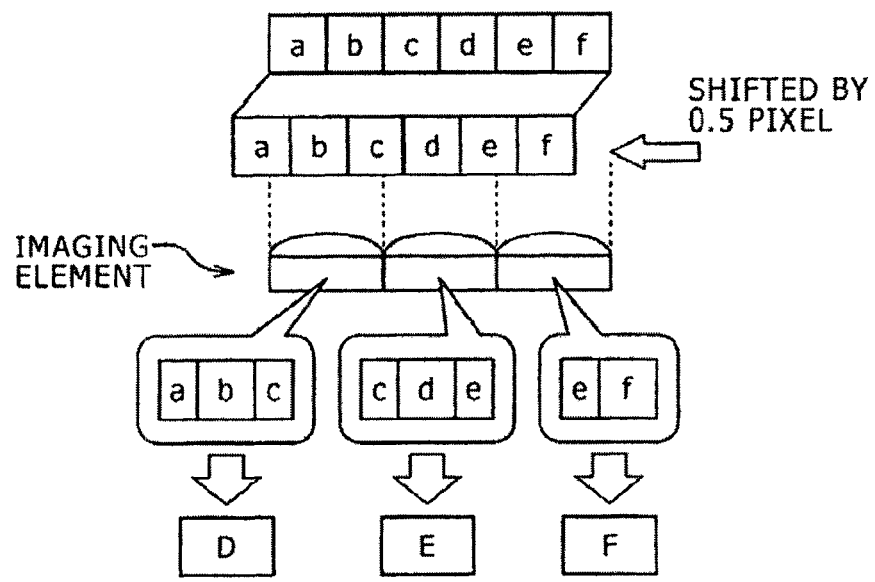
FIG. 2 is another diagram showing the principle of super-resolution.
Figure 3:
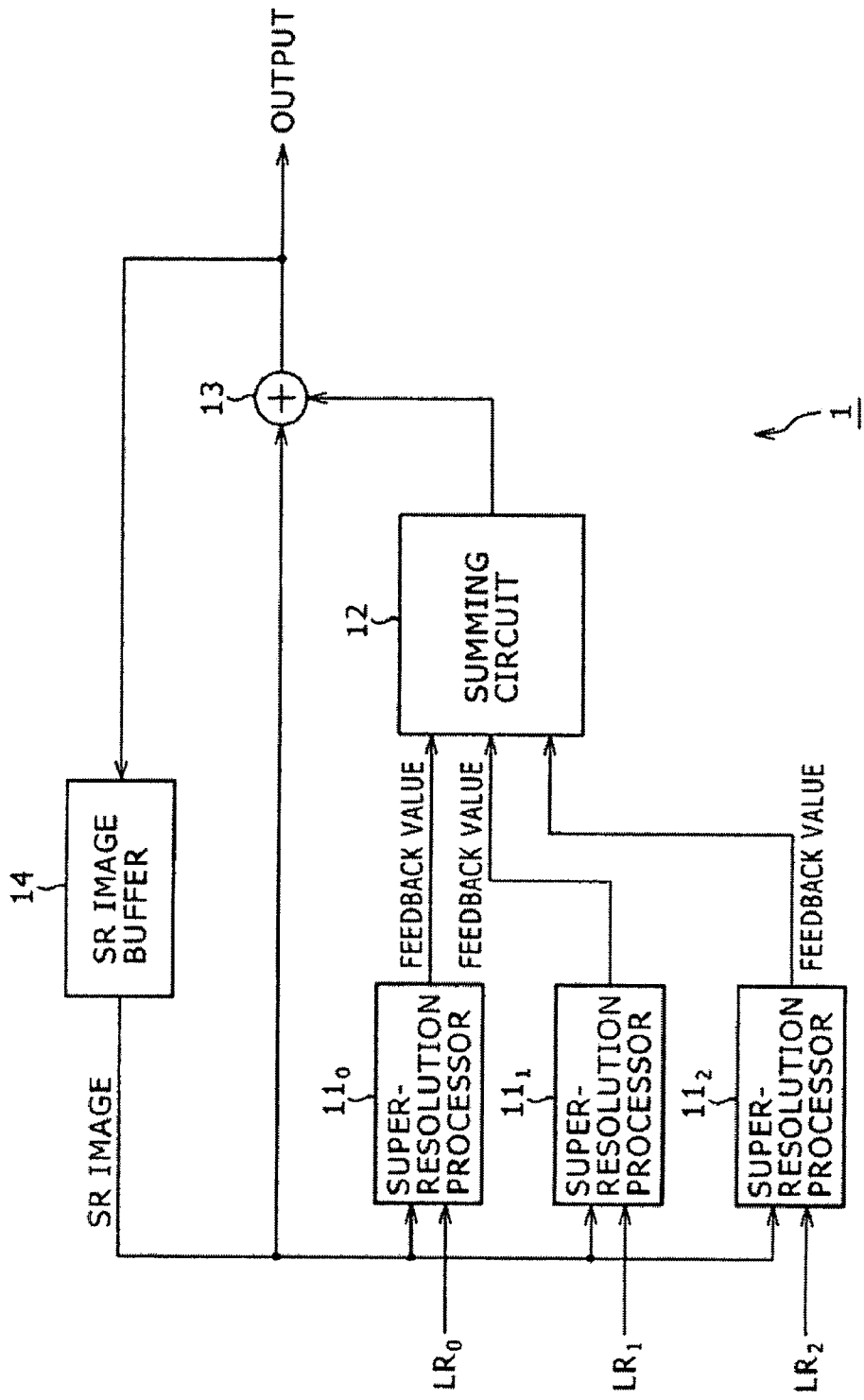
FIG. 3 is a block diagram showing a configuration example of a conventional image processing apparatus.

While in the configuration in FIG. 3, the plurality of feedback values found based on the LR images and the SR image are averaged in the summing circuit 12, and then added to the SR image, as shown in FIG. 8, the feedback value found by the next super-resolution processor is immediately added to the SR image represented by the feedback value found based on the LR image and the SR image, by which the number of feedbacks are increased, so that a time required to obtain the SR image having a sufficient resolution (time required to converge) is reduced. That is, the processing to obtain the SR image can be made faster.

Hereinafter, as needed, the processing for finding the feedback value using the inputted LR image and the SR image, which is performed by the super-resolution processors $51_0$ to $51_2$, is referred to as feedback value arithmetic processing, and the processing for generating one frame of SR image by adding the image represented by the feedback value to the SR image is referred to as addition processing. The super-resolution processing is realized by repeating the feedback value arithmetic processing and the addition processing.

$LR_0$, which is an LR image obtained by the imaging unit 41, is inputted to the super-resolution processor $51_0$, and $LR_1$ is inputted to the super-resolution processor $51_1$. Moreover, $LR_2$ is inputted to the super-resolution processor $51_2$. $LR_0$ to $LR_2$ are LR images picked up continuously, and have overlap in the imaging ranges, respectively.

The super-resolution processor $51_0$ performs the feedback value arithmetic processing based on $LR_0$ and an SR image stored in the SR image buffer 55, and outputs a feedback value representing an image at the same resolution as that of the SR image to the addition circuit $52_0$.

The addition circuit $52_0$ adds the SR image stored in the SR image buffer 55 and the SR image represented by the feedback value supplied from the super-resolution processor $51_0$ (adds pixel values of pixels contained in the SR image represented by the feedback value as pixel values of pixels absent in the SR image stored in the SR image buffer 55), and outputs one frame of SR image obtained by the addition as a result of the first addition processing. The SR image outputted from the addition circuit $52_0$ is inputted to the super-resolution processor $51_1$ and the addition circuit $52_1$.

The super-resolution processor $51_1$ performs the feedback value arithmetic processing based on $LR_1$ and the SR image supplied from the addition circuit $52_0$, and outputs a feedback value to the addition circuit $52_1$.

The addition circuit $52_1$ adds the SR image supplied from the addition circuit $52_0$ and the SR image represented by the feedback value supplied from the super-resolution processor $51_1$, and outputs one frame of SR image obtained by the addition as a result of the second addition processing. The SR image outputted from the addition circuit $52_1$ is inputted to the super-resolution processor $51_2$ and the addition circuit $52_2$.

The super-resolution processor $51_2$ performs the feedback value arithmetic processing based on $LR_2$ and the SR image supplied from the addition circuit $52_1$, and outputs a feedback value to the addition circuit $52_2$.

The addition circuit $52_2$ adds the SR image supplied from the addition circuit $52_1$ and the SR image represented by the feedback value supplied from the super-resolution processor $51_2$, and outputs an SR image obtained by the addition as a result of the third addition processing, that is, result of the super-resolution processing. The SR image outputted from the addition circuit $52_2$ is inputted to the recording unit 43, and at the same time, is supplied to the SR image buffer 55 through the switch 53 to be stored.

When an initial image is generated by the initial image generating circuit 54, the switch 53 connects to a terminal a to cause the initial image to be stored in the SR image buffer 55. Moreover, when the SR image obtained as the result of the super-resolution processing is supplied from the addition circuit $52_2$, the switch 53 connects to a terminal b to cause the SR image to be stored in the SR image buffer 55.

When starting to generate one frame of SR image by the super-resolution processing, the initial image generating circuit 54, for example, upsamples $LR_0$ to an image at the same resolution as that of the SR image to thereby generate the initial image, and causes the generated initial image to be stored in the SR image buffer 55 through the switch 53 with the terminal a connected.

The SR image buffer 55 stores the initial image generated by the initial image generating circuit 54 or the SR image supplied from the addition circuit $52_2$.

Figure 9:
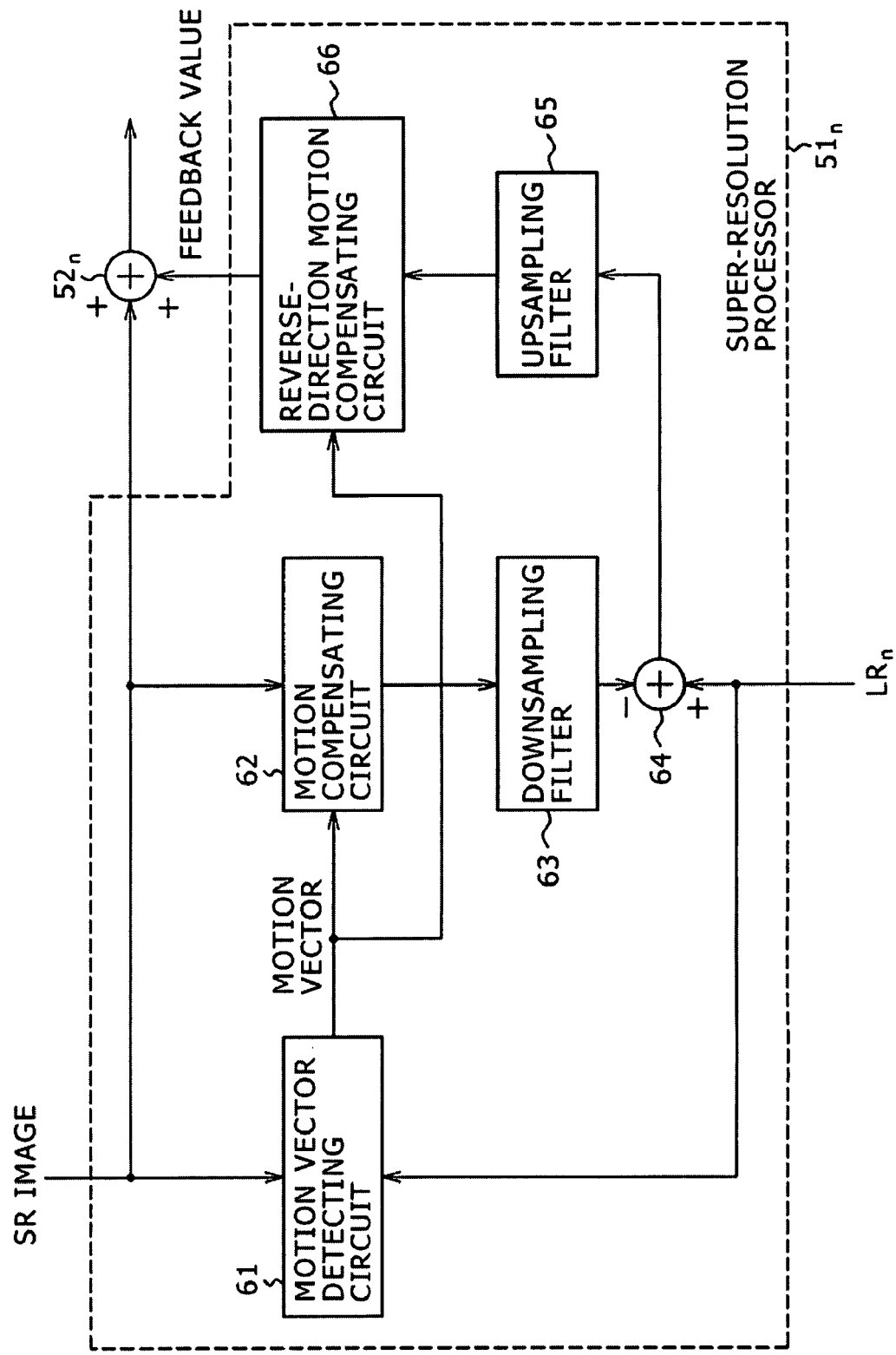
FIG. 9 is a block diagram showing a configuration example of a super-resolution processor.

FIG. 9 is a block diagram showing a configuration example of a super-resolution processor $51_n$ (super-resolution processor $51_1$, $51_1$ or $51_2$).

Figure 4:
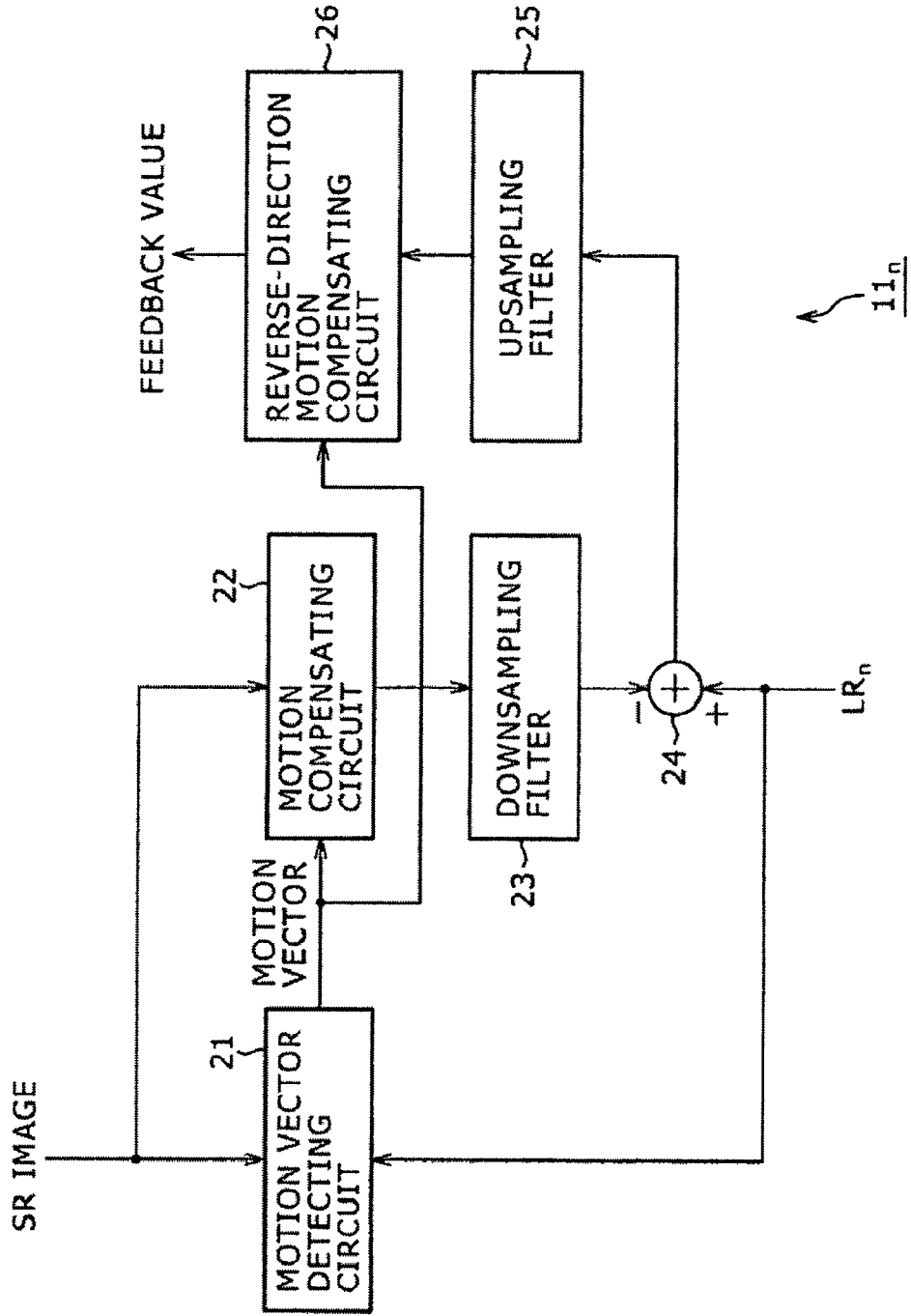
FIG. 4 is a block diagram showing a configuration example of a super-resolution processor.

As shown in FIG. 9, the super-resolution processor $51_n$ has a similar configuration to that in FIG. 4, and is composed of a motion vector detecting circuit 61, a motion compensating circuit 62, a downsampling filter 63, an addition circuit 64, upsampling filter 65, and a reverse-direction motion compensating circuit 66.

An SR image supplied to be used for the arithmetic of the feedback value is inputted to the motion vector detecting circuit 61 and the motion compensating circuit 62, and $LR_n$ obtained by imaging is inputted to the motion vector detecting circuit 61 and the addition circuit 64. The SR image stored in the SR image buffer 55 is inputted to the motion vector detecting circuit 61 and the motion compensating circuit 62 of the super-resolution processor $51_1$, and the SR image outputted from each of the addition circuits $52_0$, $52_1$ provided in the previous stage is inputted to the motion vector-detecting circuit 61 and the motion compensating circuit 62 of the super-resolution processor $51_1$ or the super-resolution processor $51_2$.

The motion vector detecting circuit 61 detects a motion vector with the SR image used as a reference, based on the inputted SR image and $LR_n$, and outputs the detected motion vector to the motion compensating circuit 62 and the reverse-direction motion compensating circuit 66.

The motion compensating circuit 62 applies the motion compensation to the SR image based on the motion vector supplied from the motion vector detecting circuit 61, and outputs an image obtained by applying the motion compensation to the downsampling filter 63. The position of an object caught on the image obtained by applying the motion compensation becomes closer to the position of the object caught on $LR_n$.

The downsampling filter 63 generates an image at the same resolution as that of $LR_n$ by downsampling the image supplied from the motion compensating circuit 62, and outputs the generated image to the addition circuit 64. Finding the motion vector from the SR image and $LR_n$, and converting the image obtained by the motion compensation using the found motion vector into the image at the same resolution as that of the LR image corresponds to simulating the image obtained by imaging based on the SR image.

The addition circuit 64 generates a differential image representing a difference between $LR_n$ and the image simulated in such a manner, and outputs the generated differential image to the upsampling filter 65.

The upsampling filter 65 generates an image at the same resolution as that of the SR image by upsampling the differential image supplied from the addition circuit 64, and outputs the generated image to the reverse-direction motion compensating circuit 66.

The reverse-direction motion compensating circuit 66 applies motion compensation in the reverse direction to the image supplied from the upsampling filter 65, based on the motion vector supplied from the motion vector detecting circuit 61, and outputs a feedback value representing an image obtained by applying the motion compensation in the reverse direction to the addition circuit $52_n$. The position of the object caught on the image obtained by the motion compensation in the reverse direction becomes closer to the position of the object caught on the SR image.

Figure 10:
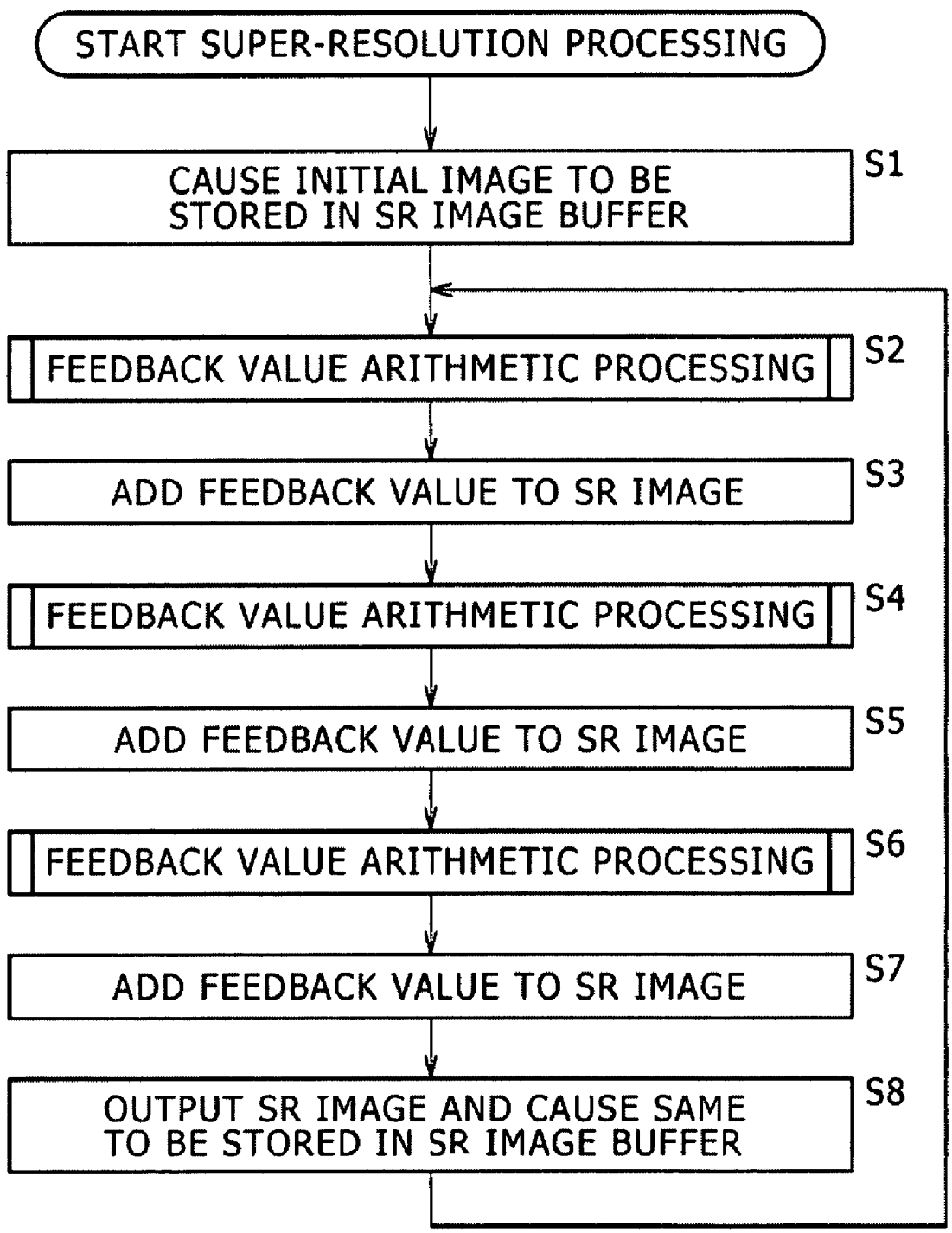
FIG. 10 is a flowchart for explaining the super-resolution processing of the imaging apparatus.

Hereinafter, referring to a flowchart of FIG. 10, the super-resolution processing performed by the image processing unit 42 having the configuration in FIG. 8 is described.

This processing is started when a still picture is imaged by the imaging unit 41, and $LR_0$ is inputted to the super-resolution processor $51_0$, $LR_1$ to the super-resolution processor $51_1$, and $LR_2$ to the super-resolution processor $51_2$, respectively.

In step S1, the initial image generating circuit 54 generates an initial image, for example, by upsampling $LR_0$ to an image at the same resolution as that of an SR image, and causes the generated initial image to be stored in the SR image buffer 55 through the switch 53. $LR_0$ obtained by the imaging unit 41 is also inputted to the initial image generating circuit 54.

In step S2, the super-resolution processor $51_0$ performs the feedback value arithmetic processing based on $LR_0$ and the SR image stored in the SR image buffer 55, and outputs a feedback value to the addition circuit $52_0$. The feedback value arithmetic processing will be described later with reference to a flowchart of FIG. 11.

In Step S3, the addition circuit $52_0$ adds the SR image stored in the SR image buffer 55 and the SR image represented by the feedback value found by the feedback value arithmetic processing performed in step S2 and supplied from the super-resolution processor $51_0$, and outputs one frame of SR image obtained by the addition as a result of the first addition processing.

In step S4, the super-resolution processor $51_1$ performs the feedback value arithmetic processing based on $LR_1$ and the SR image supplied from the addition circuit $52_0$, and outputs a feedback value to the addition circuit $52_1$.

In step S5, the addition circuit $52_1$ adds the SR image supplied from the addition circuit $52_0$ and the SR image represented by the feedback value found by the feedback value arithmetic processing performed in step S4 and supplied from the super-resolution processor $51_1$, and one frame of SR image obtained by the addition is outputted as a result of the second addition processing.

In step S6, the super-resolution processor $51_2$ performs the feedback value arithmetic processing based on $LR_2$ and the SR image supplied from the addition circuit $52_1$, and outputs a feedback value to the addition circuit $52_2$.

In step S7, the addition circuit $52_2$ adds the SR image supplied from the addition circuit $52_1$ and the SR image represented by the feedback value found by the feedback value arithmetic processing performed in step S6 and supplied from the super-resolution processor $51_2$.

In step S8, the addition circuit $52_2$ outputs to the recording unit 43, an SR image obtained by adding the SR image supplied from the addition circuit $52_1$ and the SR image represented by the feedback value supplied from the super-resolution processor $51_2$ as a result of the super-resolution processing, and at the same time, causes the same to be stored in the SR image buffer 55.

Thereafter, the recording unit 43 determines whether the SR image outputted from the addition circuit $52_2$ has a sufficient resolution, and if it is determined that the SR image does not have the sufficient resolution, the processing returns to step S2 to repeat the above-described processing. In the first feedback value arithmetic and addition processing of the repeated super-resolution processing, the SR image stored in the SR image buffer 55 in the processing of step S8 is used.

On the other hand, if it is determined that the SR image outputted from the addition circuit $52_2$ has the sufficient resolution, then the repetition of the super-resolution processing is stopped, and the image having the sufficient resolution is recorded.

Figure 11:
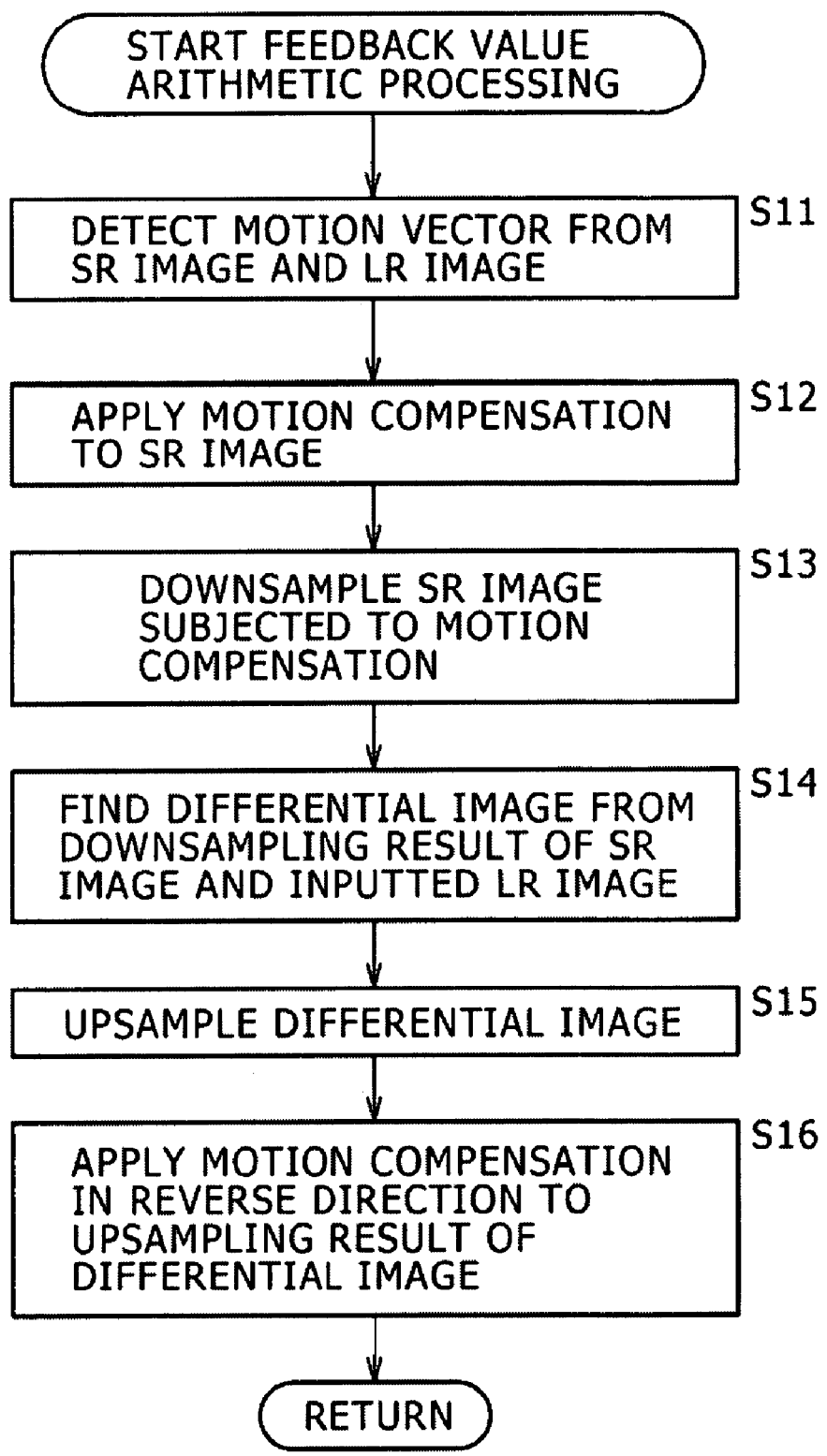
FIG. 11 is a flowchart for explaining feedback value arithmetic processing performed in step S2 of FIG. 10.

Next, referring to the flowchart of FIG. 11, the feedback value arithmetic processing performed in steps S2, S4, S5 is described.

In step S11, the motion vector detecting circuit 61 detects a motion vector with an SR image used as a reference, based on the inputted SR image and $LR_n$, and outputs the detected motion vector to the motion compensating circuit 62 and the reverse-direction motion compensating circuit 66.

In step S12, the motion compensating circuit 62 applies the motion compensation to the SR image based on the motion vector supplied from the motion vector detecting circuit 61, and outputs an image obtained by applying the motion compensation to the downsampling filter 63.

In step S13, the downsampling filter 63 generates an image at the same resolution as that of $LR_n$ by downsampling the image supplied from the motion compensating circuit 62, and outputs the generated image to the addition circuit 64.

In step S14, the addition circuit 64 generates a differential image representing a difference between the inputted $LR_n$ and the image supplied from the downsampling filter 63 as the downsampling result, and outputs the generated differential image to the upsampling filter 65.

In step 15, the upsampling filter 65 generates an image at the same resolution as that of the SR image by upsampling the differential image supplied from the addition circuit 64, and outputs the generated image to the reverse-direction motion compensating circuit 66.

In step 16, the reverse-direction motion compensating circuit 66 applies motion compensation in the reverse direction to the image supplied from the upsampling filter 65 as the upsampling result, based on the motion vector supplied from the motion vector detecting circuit 61, and outputs a feedback value representing an image obtained by applying the motion compensation in the reverse direction to the addition circuit $52_n$. The processing then returns to step S2, S4 or S6 of FIG. 10 and the relevant processing and subsequent processing are repeated.

Figure 12:
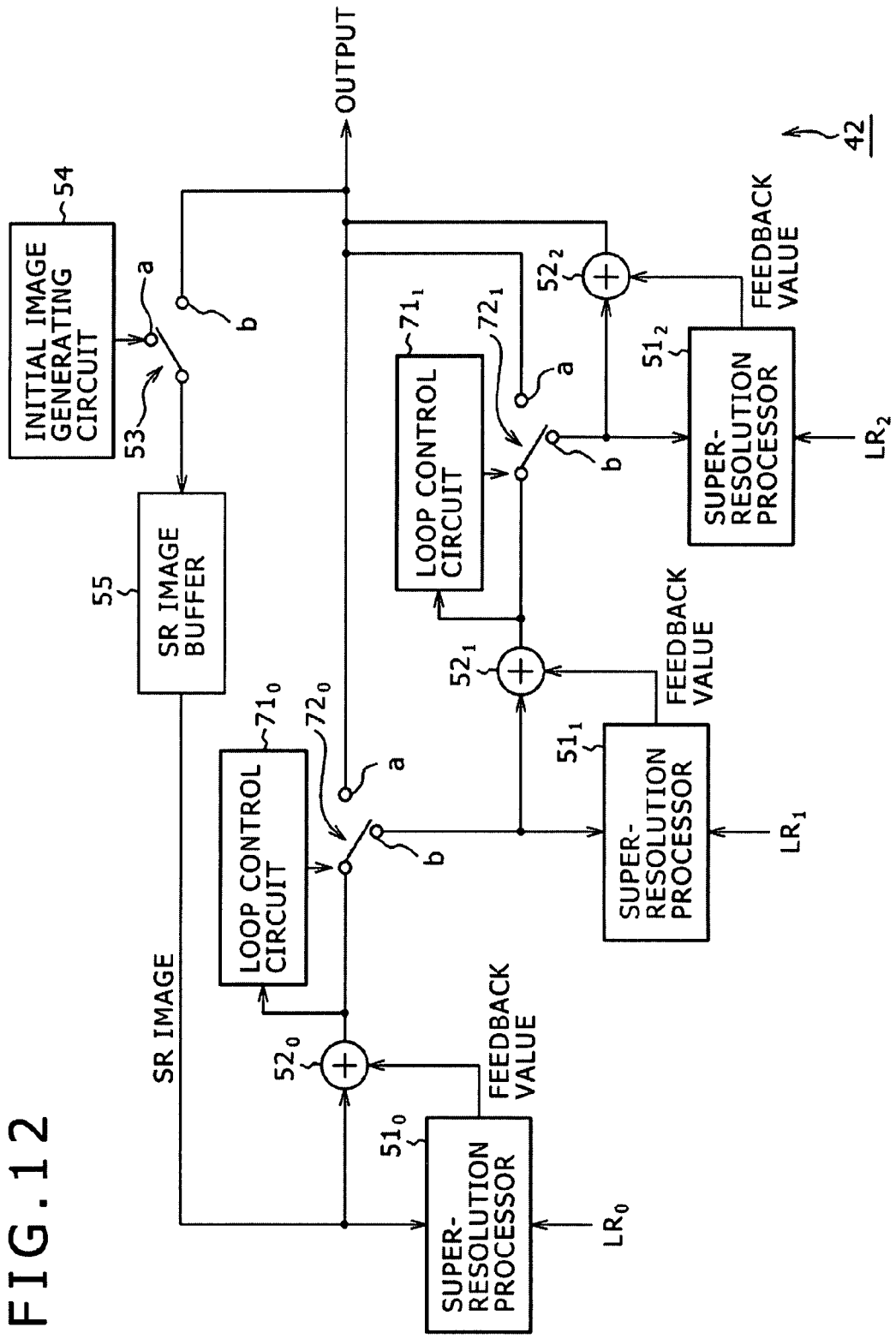
FIG. 12 is a block diagram showing another configuration example of the image processing unit.

FIG. 12 is a block diagram showing another configuration example of the image processing unit 42. The same reference numerals are given to the same components as those of FIG. 8. Duplicative description is omitted where appropriate.

The configuration of the image processing unit 42 in FIG. 12 is different from the configuration of FIG. 8 in that loop control circuits $71_0$ and $71_1$, and switches $72_0$ and $72_1$ are further provided, and in accordance with the switch-over of the switch $72_0$ by the loop control circuit $71_0$ and the switch-over of the switch $72_1$ by the loop control circuit $71_1$, it is controlled whether the result of the addition processing is outputted to the recording unit 43, or is used for the next addition processing.

More specifically, the image processing unit 42 of FIG. 12 controls, in accordance with the switch-over of the switch $72_0$ by the loop control circuit $71_0$, whether the result of the first addition processing outputted from the addition circuit $52_0$ is used for the second addition processing or is outputted to the recording unit 43 as it is. The image processing unit 42 also controls, in accordance with the switch-over of the switch $72_1$ by the loop control circuit $71_1$, whether the result of the second addition processing outputted from the addition circuit $52_1$ is used for the third addition processing or is outputted to the recording unit 43 as it is.

For example, only when the SR image at the sufficient resolution has not been obtained as the result of the first addition processing, the second or the subsequent feedback value arithmetic processing and addition processing are performed, and only when the SR image at the sufficient resolution has not been obtained as the result of the second addition processing outputted from the addition circuit $52_1$, the third feedback value arithmetic processing and addition processing. In this manner, the resolution of the SR image is checked every time the processing using each LR image of $LR_0$ to $LR_2$ is finished, and if the sufficient resolution has not been obtained, the next feedback value arithmetic processing and the addition processing are performed, and on the contrary, if the sufficient resolution has been obtained, the processing is terminated. Thus, in some cases, the feedback value operating processing and the addition processing can be terminated after fewer repetitions, which can make the super-resolution processing faster.

The super-resolution processor $51_0$ performs the feedback value arithmetic processing based on $LR_0$ and the SR image stored in the SR image buffer 55, and outputs a feedback value to the addition circuit $52_0$.

The addition circuit $52_0$ adds the SR image stored in the SR image buffer 55 and the SR image represented by the feedback value supplied from the super-resolution processor $51_0$, and outputs one frame of SR image obtained by the addition as a result of the first addition processing. The SR image outputted from the addition circuit $52_0$ is supplied to the loop control circuit $71_0$ and the switch $72_0$.

The loop control circuit $71_0$ checks the resolution (image quality) of the SR image supplied from the addition circuit $52_0$, and if the sufficient resolution has been obtained, connects the switch $72_0$ to a terminal a to thereby cause the SR Image as the result of the first addition processing to be outputted to the recording unit 43. Moreover, if the sufficient resolution has not been obtained, the loop control circuit $71_0$ connects the switch $72_0$ to a terminal b to thereby cause the SR image as the result of the first addition processing to be outputted to the super-resolution processor $51_1$ and the addition circuit $52_1$.

To the loop control circuit $71_0$ is provided, for example, a reference SR image used to check the resolution of the SR image, so that the output destination of the SR image as the result of the addition processing is determined based on a difference, least squares error, covariance and the like with respect to the reference SR image. For example, if the difference from the reference SR image is smaller than a difference set as a threshold, the SR image as the result of the addition processing is outputted to the recording unit 43. For example, the reference SR image may be the SR image recorded in the SR image buffer 55, or the SR image outputted from any one of the super-resolution processors $52_0$ to $52_2$ may be selected as needed.

The super-resolution processor $51_1$ performs the feedback value arithmetic processing based on $LR_1$ and the SR image supplied from the addition circuit $52_0$ through the switch $72_0$, and outputs a feedback value to the addition circuit $52_1$.

The addition circuit $52_1$ adds the SR image supplied from the addition circuit $52_0$ through the switch $72_0$ and the SR image represented by the feedback value supplied from the super-resolution processor $51_1$, and outputs one frame of SR image obtained by the addition as a result of the second addition processing. The SR image outputted from the addition circuit $52_1$ is supplied to the loop control circuit $71_1$ and the switch $72_1$.

The loop control circuit $71_1$ checks the resolution of the SR image supplied from the addition circuit $52_1$, and if the sufficient resolution has been obtained, connects the switch $72_1$ to a terminal a to thereby cause the SR Image as the result of the second addition processing to be outputted to the recording unit 43. Moreover, if the sufficient resolution has not been obtained, the loop control circuit $71_1$ connects the switch $72_1$ to a terminal b to thereby cause the SR image as a result of the second addition processing to be outputted to the super-resolution processor $51_2$ and the addition circuit $52_2$.

The reference SR image used to check the resolution of the SR image is also applied to the loop control circuit $71_1$.

The super-resolution processor $51_2$ performs the feedback value arithmetic processing based on $LR_2$ and the SR image supplied from the addition circuit $52_1$ through the switch $72_1$, and outputs a feedback value to the addition circuit $52_2$.

The addition circuit $52_2$ adds the SR image supplied from the addition circuit $52_1$ through the switch $72_1$ and the SR image represented by the feedback value supplied from the super-resolution processor $51_2$, and outputs one frame of SR image obtained by the addition as a result of the super-resolution processing. The SR image outputted from the addition circuit $52_2$ is supplied to the recording unit 43 and at the same time, is supplied to the SR image buffer 55 through the switch 53 to be stored.

The super-resolution processors $51_0$ to $51_2$ of FIG. 12 each have the same configuration as the configuration shown in FIG. 9.

Figure 13:
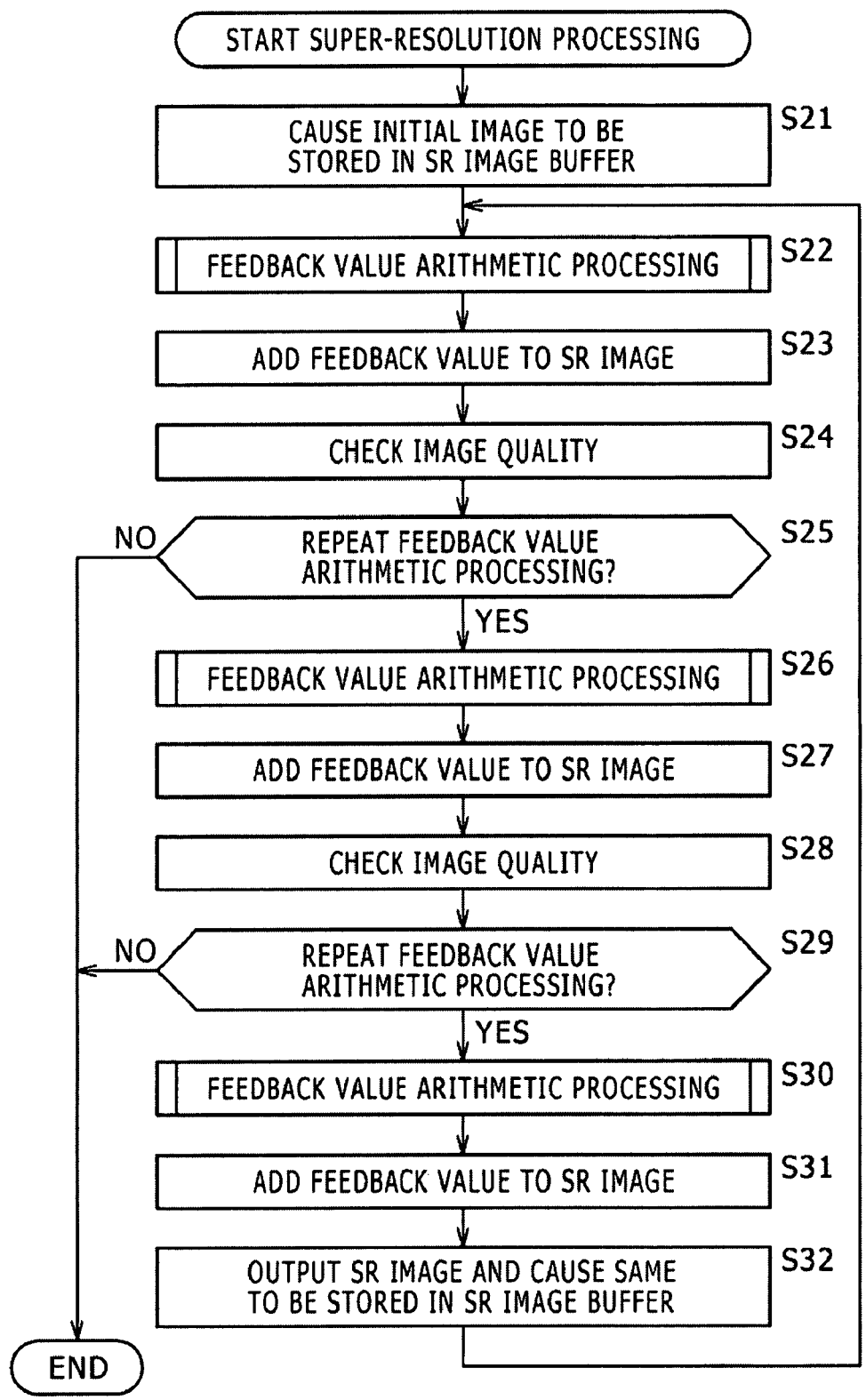
FIG. 13 is a flowchart for explaining another super-resolution processing of the imaging apparatus.

Here, referring to a flowchart of FIG. 13, the super-resolution processing performed by the image processing unit 42 having the configuration of FIG. 12 is described.

This processing is also started when a still picture is imaged by the imaging unit 41, and $LR_0$ is inputted to the super-resolution processor $51_0$, $LR_1$ to the super-resolution processor $51_1$, and $LR_2$ to the super-resolution processor $51_2$, respectively.

In step S21, the initial image generating circuit 54 generates an initial image by upsampling $LR_0$ and the like, and causes the generated initial image to be stored in the SR image buffer 55 through the switch 53.

In step S22, the super-resolution processor $51_0$ performs the feedback value arithmetic processing based on $LR_0$ and the SR image stored in the SR image buffer 55, and outputs a feedback value to the addition circuit $52_0$. Here, the same processing as the processing described with reference to FIG. 11 is performed.

In step S23, the addition circuit $52_0$ adds the SR image represented by the feedback value found by the feedback value arithmetic processing performed in step S22 and supplied from the super-resolution processor $51_0$ to the SR image stored in the SR image buffer 55, and outputs one frame of SR image obtained by the addition as a result of the first addition processing.

In step S24, the loop control circuit $71_0$ checks an image quality of the SR image supplied from the addition circuit $52_0$.

In step S25, the loop control circuit $71_0$ determines whether or not to repeat the feedback value arithmetic processing and the like based on the check result of the image quality of the SR image.

If the repetition of the feedback value arithmetic processing is determined in step S25, then in step S26, the super-resolution processor $51_1$ performs the feedback value arithmetic processing based on $LR_1$ and the SR image supplied from the addition circuit $52_0$ through the switch $72_0$ and outputs a feedback value to the addition circuit $52_1$.

In step S27, the addition circuit $52_1$ adds the SR image represented by the feedback value found by the feedback value arithmetic processing performed in step S26 and supplied from the super-resolution processor $51_1$ to the SR image supplied from the addition circuit $52_0$, and one frame of SR image obtained by the addition is outputted as a result of the second addition processing.

In step S28, the loop control circuit $71_1$ checks the image quality of the SR image supplied from the addition circuit $52_1$.

In step S29, the loop control circuit $71_1$ determines whether or not to repeat the feedback value arithmetic processing and the like, based on the check result of the image quality of the SR image.

If the repetition of the feedback value arithmetic processing is determined in step S29, then in step S30, the super-resolution processor $51_2$ performs the feedback value arithmetic processing based on $LR_2$ and the SR image supplied from the addition circuit $52_1$ through the switch $72_1$ and outputs a feedback value to the addition circuit $52_2$.

In step S31, the addition circuit $52_2$ adds the SR image represented by the feedback value found by the feedback value arithmetic processing performed in step S30 and supplied from the super-resolution processor $51_2$ to the SR image supplied from the addition circuit $52_1$.

In step S32, the addition circuit $52_2$ adds the SR image supplied from the addition circuit $52_1$ and the SR image represented by the feedback value supplied from the super-resolution processor $51_2$, and outputs obtained one frame of SR image as a result of the super-resolution processing to the recording unit 43, and at the same time, causes the same to be stored in the SR image buffer 55. The processing then returns to step S22 to repeat the above-described processing.

On the other hand, in steps S25, S29, if it is determined not to repeat the feedback value arithmetic processing and the like, the SR image, which is determined to have the sufficient quality, is outputted to the recording unit 43, and the processing is finished.

Figure 14:
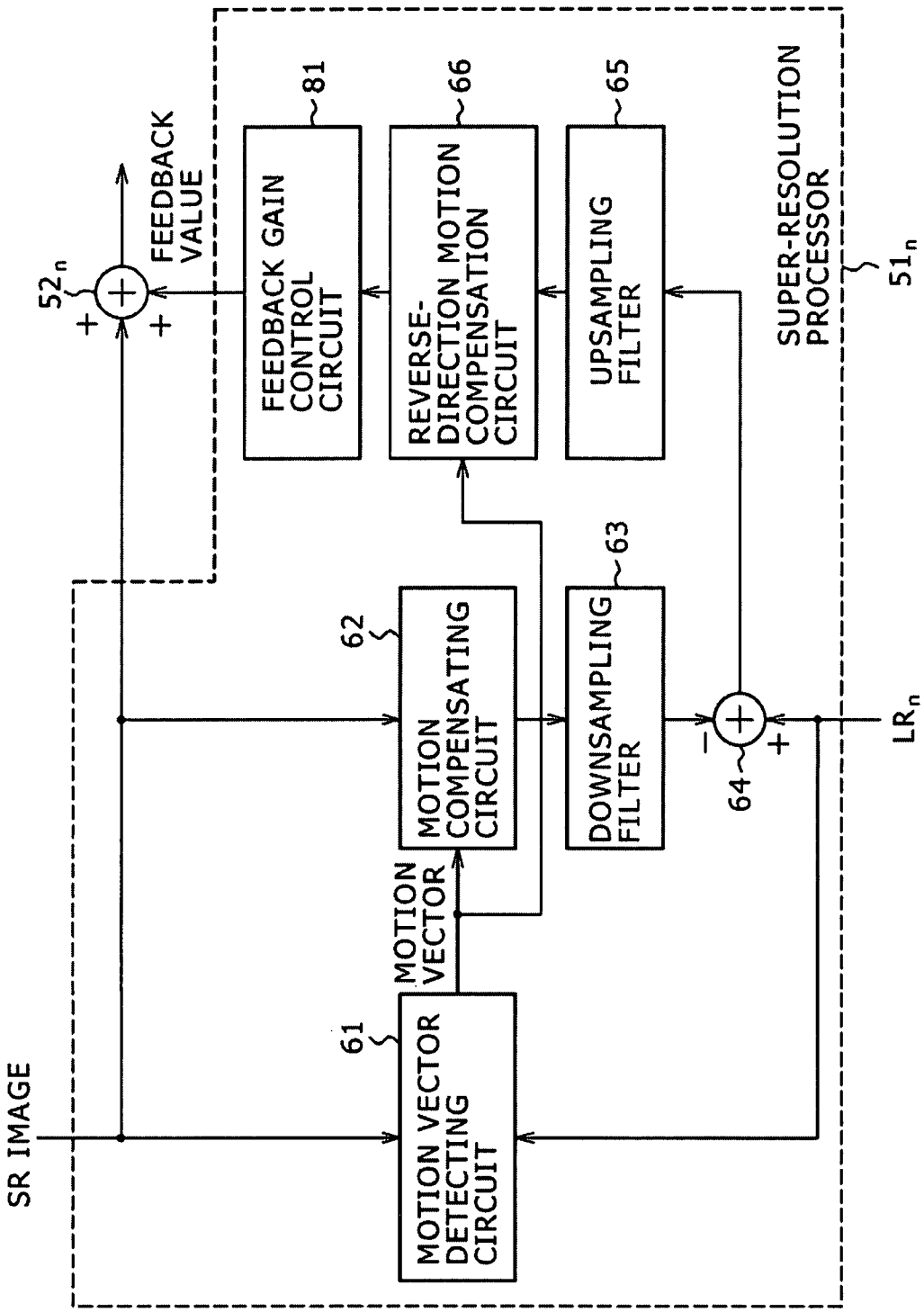
FIG. 14 is a block diagram showing another configuration example of the super-resolution processor.

FIG. 14 is a block diagram showing another configuration example of the super-resolution processor $51_n$. The same reference numerals are given to the same components of those of FIG. 9. Duplicative description is omitted where appropriate.

The configuration of the super-resolution processor $51_n$ of FIG. 14 is different from the configuration of FIG. 9 in that a feedback gain control circuit 81 is further provided in a subsequent stage of the reverse-direction motion compensating circuit 66.

The feedback gain control circuit 81 adjusts a gain of a feedback value supplied from the reverse-direction motion compensating circuit 66, and outputs a feedback value obtained by adjusting the gain to the addition circuit $52_n$. An image obtained by applying the motion compensation in the reverse direction to an image obtained by upsampling a differential image between $LR_n$ and the SR image is supplied as the feedback value from the reverse-direction motion compensating circuit 66.

For example, the feedback gain control circuit 81 adjusts the gain by multiplying by an arbitrary value an overall frequency component of the image signal of the SR image represented by the feedback value supplied from the reverse-direction motion compensating circuit 66, or adjusts the gain by multiplying each frequency component by a different value.

Moreover, the feedback gain control circuit 81 decreases the gain of a signal of the frequency component, which is likely to have adverse effects on the image quality when the increased gain is applied to the SR image. Whether or not the frequency component has adverse effects on the image quality is determined, for example, based on an amount of noise contained in the feedback value supplied from the reverse-direction motion compensating circuit 66 or the reliability of the motion vector of SAD (Sum of Absolute Difference) and the like, which is found at the time of motion vector detection. The processing of adjusting the gain may be uniformly applied to the entire image, or may be applied on a region basis.

FIGS. 15A to 15D are charts showing examples of characteristics of the gain adjustment realized by the feedback gain control circuit 81.

Figure 15A:
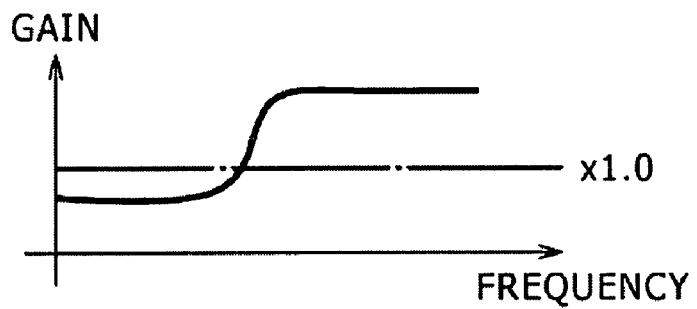
FIGS. 15A-15D are charts showing examples of characteristics of the gain adjustment.
Figure 15B:
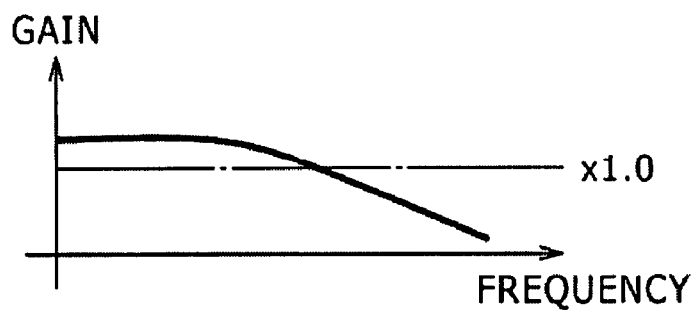
Figure 15C:
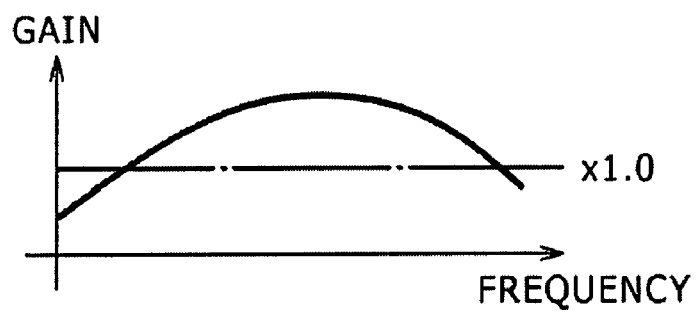
Figure 15D:
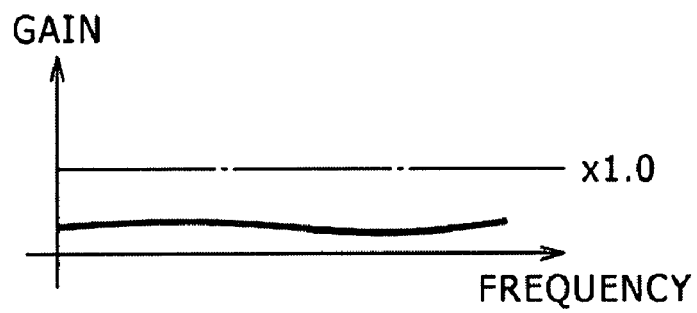

The horizontal axis indicates a frequency, and the vertical axis indicates a gain, and the characteristic shown in FIG. 15A is a decrease in gain of a lower frequency component, and an increase in gain of a higher frequency component. The characteristic shown in FIG. 15B is an increase in gain of the lower frequency component, and a decrease in gain of the higher frequency component. The characteristics shown in FIG. 15C is an increase in gain of frequency component around the middle, and a decrease in gain of other than this. The characteristic shown in FIG. 15D is a decrease in all the frequency components.

Figure 16:
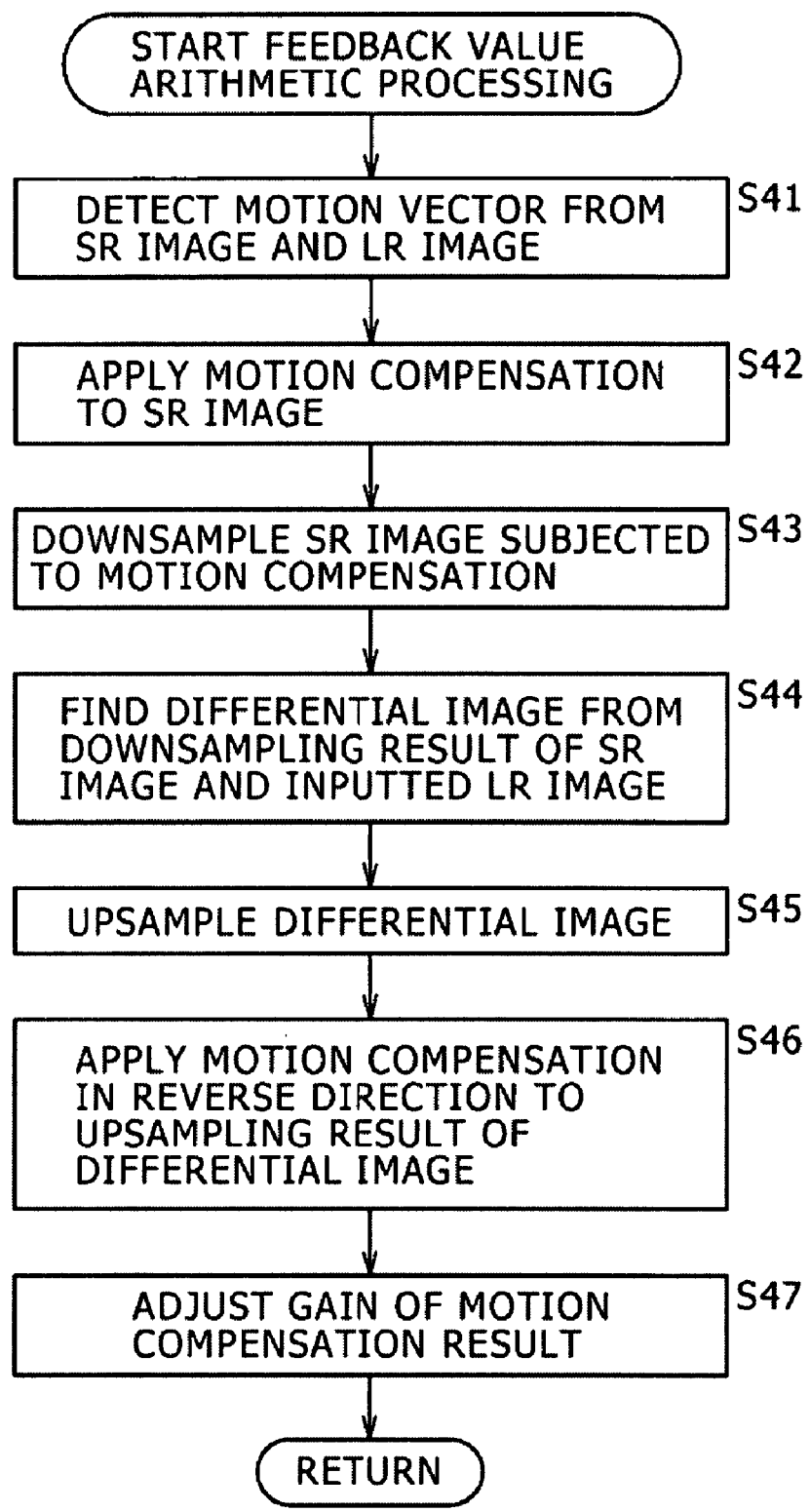
FIG. 16 is a flowchart for explaining another feedback value arithmetic processing.

Here, referring to a flowchart of FIG. 16, the feedback value arithmetic processing performed by the super-resolution processor $51_n$ having the configuration of FIG. 14 is described. This processing is also performed in steps, S2, S4, S6 of FIG. 10.

The processing shown in FIG. 16 is the same as the processing described with reference to FIG. 11 except that the processing for adjusting the gain is added. More specifically, in step S41, the motion vector detecting circuit 61 detects a motion vector, based on an inputted SR image and $LR_n$, and outputs the detected motion vector to the motion compensating circuit 62 and the reverse-direction motion compensating circuit 66.

In step S42, the motion compensating circuit 62 applies the motion compensation to the SR image based on the motion vector supplied from the motion vector detecting circuit 61, and outputs the image obtained by applying the motion compensation to the downsampling filter 63.

In step S43, the downsampling filter 63 generates an image at the same resolution as that of $LR_n$ by downsampling the image supplied from the motion compensating circuit 62, and outputs the generated image to the addition circuit 64.

In step S44, the addition circuit 64 generates a differential image representing a difference between the inputted $LR_n$ and the image supplied from the downsampling filter 63 as a result of the downsampling, and outputs the generated differential image to the upsampling filter 65.

In step S45, the upsampling filter 65 generates an image at the same resolution as that of the SR image by upsampling the image supplied from the addition circuit 64, and outputs the generated image to the reverse-direction motion compensating circuit 66.

In step S46, the reverse-direction motion compensating circuit 66 applies motion compensation in the reverse direction to the image supplied from the upsampling filter 65 as the upsampling result, based on the motion vector supplied from the motion vector detecting circuit 61, and outputs an image obtained by applying the motion compensation in the reverse direction to the feedback gain control circuit 81.

In step S47, the feedback gain control circuit 81 adjusts the gain of the signal representing the image supplied from the reverse-direction motion compensating circuit 66 as the result of the motion compensation in the reverse direction, and outputs a feedback value obtained by adjusting the gain to the addition circuit $52_n$. The processing then returns to step S2, S4 or S6 of FIG. 10, and the relevant processing and the subsequent processing are repeated.

Figure 17:
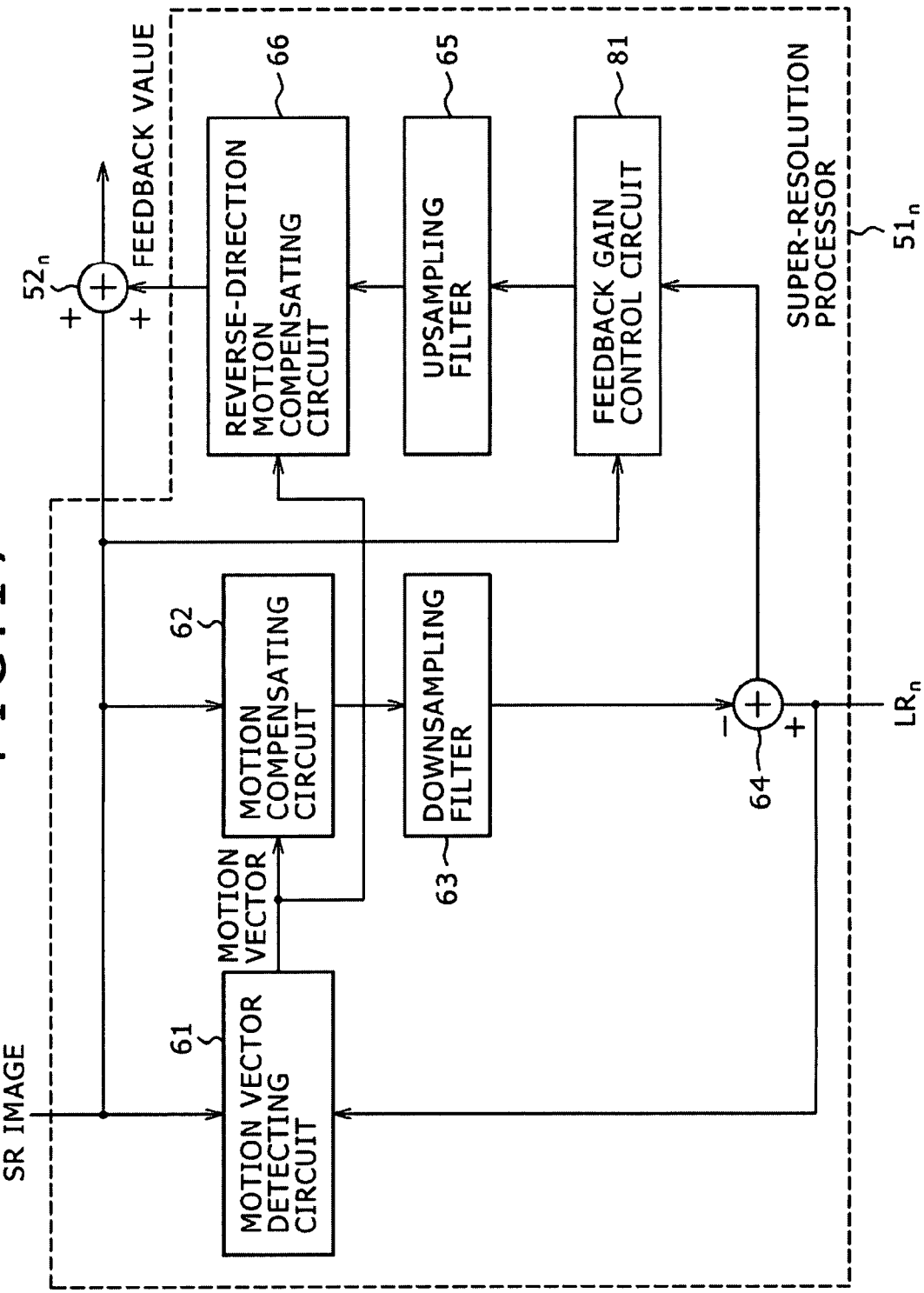
FIG. 17 is a block diagram showing still another configuration example of the super-resolution processor.

FIG. 17 is a block diagram showing still another configuration example of the super-resolution processor $51_n$. The same reference numerals are given to the same components as those in FIG. 14. Duplicative description is omitted where appropriate.

The configuration of the super-resolution processor $51_n$ of FIG. 17 is different from the configuration of FIG. 14 in that the feedback gain control circuit 81 is provided between the addition circuit 64 and the upsampling filter 65 instead of being provided in the subsequent stage of the reverse-direction motion compensating circuit 66. In other words, in the configuration of FIG. 17, the differential image found by the addition circuit 64 is supplied to the feedback gain control circuit 81 so that in this stage, the gain adjustment to the differential image is performed.

Thus, the insertion position of the feedback gain control circuit 81 is not limited to the position in the subsequent stage of the reverse-direction motion compensating circuit 66. As shown in FIG. 17, in the case where the feedback gain control circuit 81 is interposed between the addition circuit 64 and the upsampling filter 65, the function of the upsampling filter 65 and the function of the feedback gain control circuit 81 may be realized by one circuit.

Figure 18:
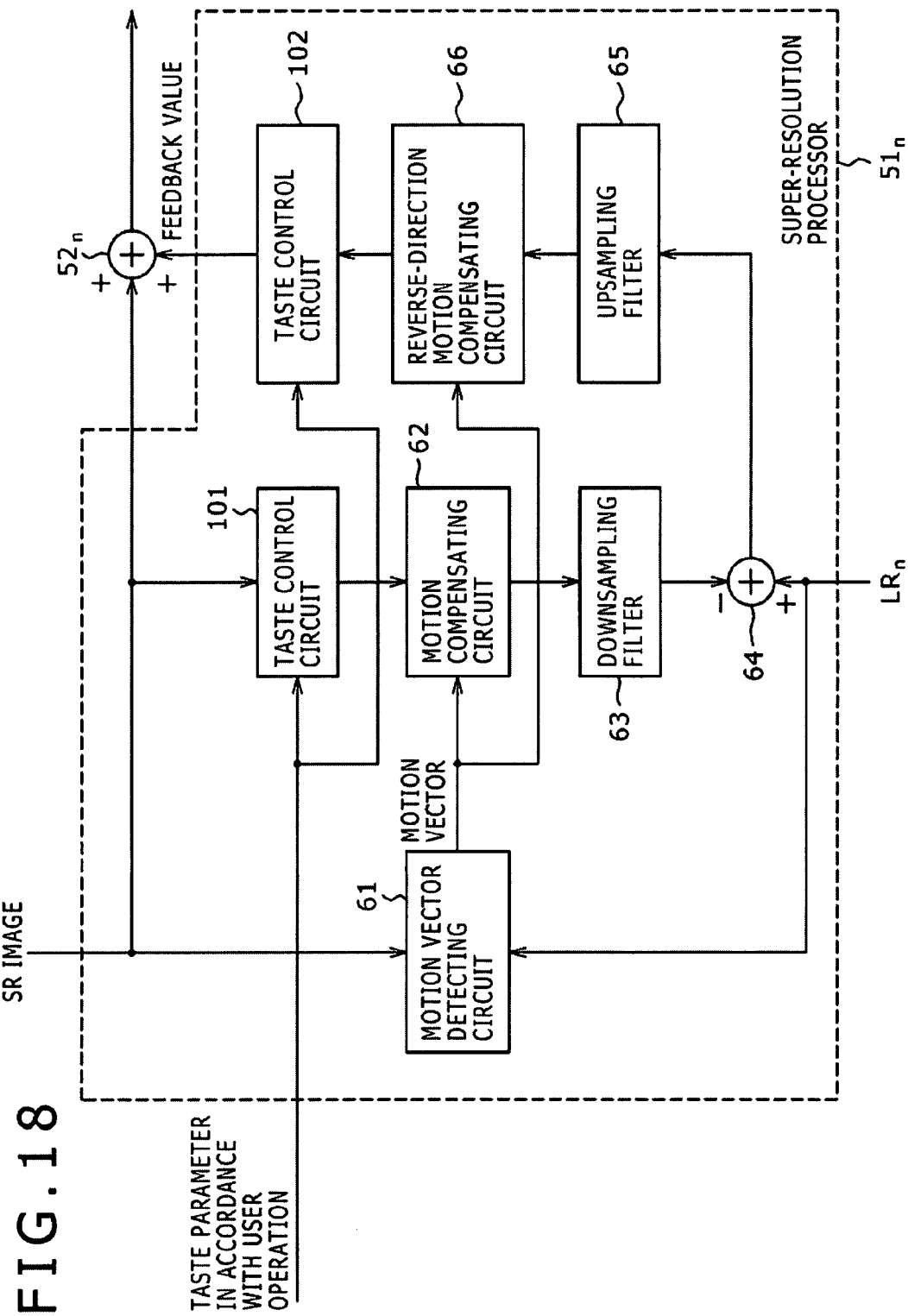
FIG. 18 is a block diagram showing another configuration example of the super-resolution processor.

FIG. 18 is a block diagram showing another configuration example of the super-resolution processor 51n. The same reference numerals are given to the same components as those of FIG. 9. Duplicative description is omitted where appropriate.

The configuration of the super-resolution processor $51_n$ of FIG. 18 is different from the configuration of FIG. 9 in that a taste control circuit 101 is provided in the previous stage of the motion compensating circuit 62, and that a taste control circuit 102 is provided in the subsequent stage of the reverse-direction motion compensating circuit 66.

As shown in FIG. 18, an SR image used for the arithmetic of the feedback value is supplied to the motion vector detecting circuit 61 and the taste control circuit 101. A taste parameter in accordance with user operation is also supplied to the taste control circuit 101. The taste parameter is also supplied to the taste control circuit 102.

Figure 19:
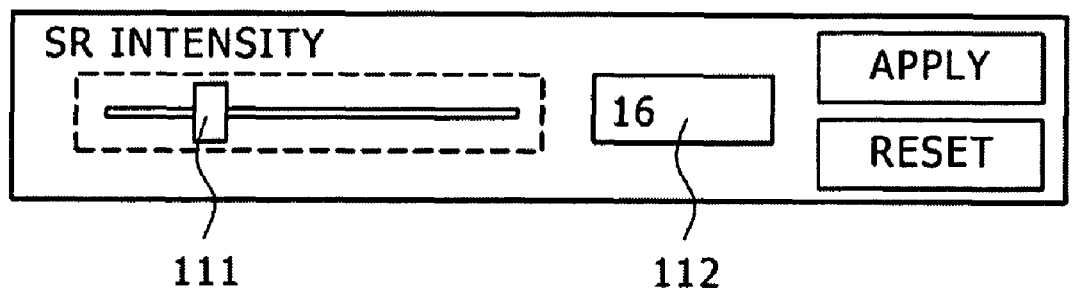
FIG. 19 is a diagram showing an example of GUI.

The taste parameter indicates a value adjusted by the user using GUI (Graphical User Interface) as shown in FIG. 19, and in accordance with this value, a filter to be used for processing is selected, and an SR image with an image quality in accordance with the selected filter is generated by the super-resolution processor $51_n$. In the example of FIG. 19, the user can adjust the value by sliding a slide bar 111, and a current adjusted value is displayed on a display unit 112.

To return to the description of FIG. 18, the taste control circuit 101 selects a filter in accordance with the taste parameter, and applies filtering to the SR image using the selected filter. The taste control circuit 101 outputs the SR image obtained by applying filtering to the motion compensating circuit 62.

In the circuits in the subsequent stage, processing similar to the above-described processing is performed. More specifically, in the motion compensating circuit 62, the motion compensation is applied to the SR image supplied from the taste control circuit 101, and the image obtained by applying the motion compensation is downsampled in the downsampling filter 63. In the addition circuit 64, a differential image representing a difference from $LR_n$ is generated, and an image obtained by upsampling the differential image in the upsampling filter 65 is subjected to the motion compensation in the reverse direction in the reverse-direction motion compensating circuit 66. The SR image obtained by applying the motion compensation in the reverse direction is supplied to the taste control circuit 102.

The taste control circuit 102 selects the filter in accordance with the taste parameter, and applies filtering to the SR image supplied from the reverse-direction motion compensating circuit 66 using the selected filter. The taste control circuit 102 outputs the SR image obtained by applying filtering to the addition circuit $52_n$ as a feedback value.

FIGS. 20A to 20D are charts showing examples of characteristics of the filters selected in the taste control circuits 101, 102.

Figure 20A:
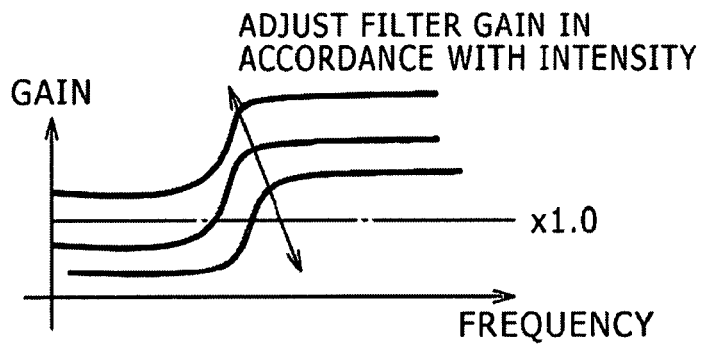
FIGS. 20A-20D are charts showing examples of filter characteristics.
Figure 20B:
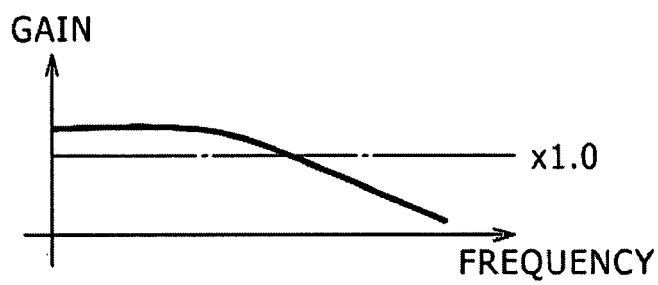
Figure 20C:
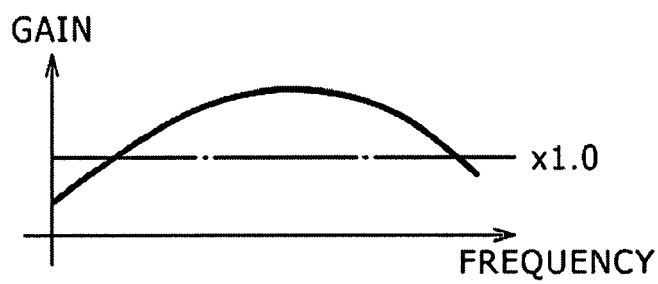
Figure 20D:
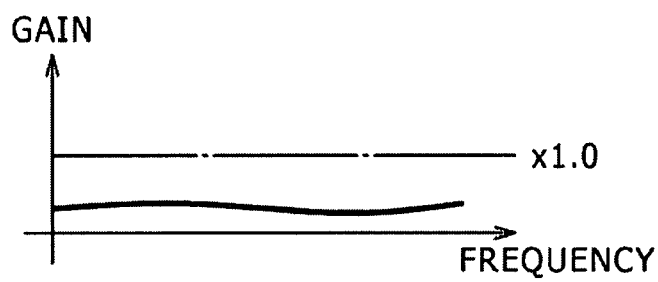

The characteristics shown in FIGS. 20A to 20D are similar to the characteristics shown in FIGS. 15A to 15D, respectively, and the characteristic of the filter is adjusted in accordance with the taste parameter as shown in FIG. 20A.

For example, when the image quality of the SR image outputted from the addition circuit $52_n$ has too much glare, and the user adjusts so as to reduce the glare, the taste control circuit 102 selects LPF (Low Pass Filter) so that the image quality of the SR image outputted from the addition circuit $52_n$ is adjusted to be milder.

Figure 21:
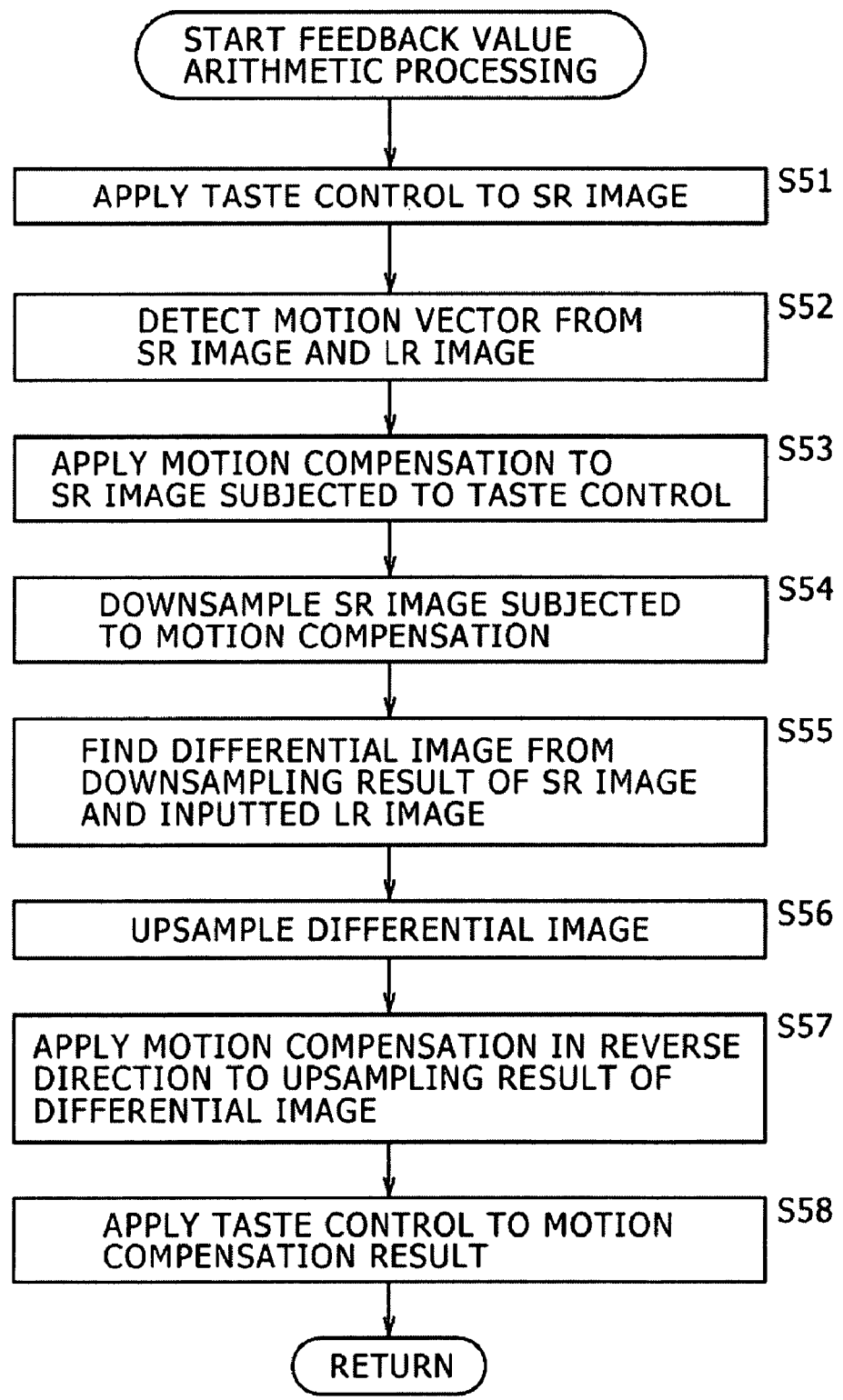
FIG. 21 is a flowchart for explaining still another feedback value arithmetic processing.

Here, referring to a flowchart of FIG. 21, a feedback value arithmetic processing performed by the super-resolution processor $51_n$ having the configuration of FIG. 18 is described.

The processing shown in FIG. 21 is the same as the processing described with reference to FIG. 11 and the like except that processing for adjusting the image quality is added.

In step S51, the taste control circuit 101 selects a filter in accordance with the taste parameter, and applies the filtering to the supplied SR image using the selected filter (applies taste control). The taste control circuit 101 outputs an SR image obtained by applying the filtering to the motion compensating circuit 62.

In step S52, the motion vector detecting circuit 61 detects a motion vector, based on the inputted SR image and $LR_n$, and outputs the detected motion vector to the motion compensating circuit 62 and the reverse-direction motion compensating circuit 66.

In step S53, the motion compensating circuit 62, based on the motion vector supplied from the motion vector detecting circuit 61, applies the motion compensation to the SR image, which is subjected to the taste control and is supplied from the taste control circuit 101, and outputs the image obtained by applying the motion compensation to the downsampling filter 63.

In step S54, the downsampling filter 63 generates an image at the same resolution as that of $LR_n$ by downsampling the image supplied from the motion compensating circuit 62, and outputs the generated image to the addition circuit 64.

In step S55, the addition circuit 64 generates a differential image representing a difference between the inputted $LR_n$ and the image supplied from the downsampling filter 63 as a result of the downsampling, and outputs the generated differential image to the upsampling filter 65.

In step S56, the upsampling filter 65 generates an image at the same resolution as that of the SR image by upsampling the image supplied from the addition circuit 64, and outputs the generated image to the reverse-direction motion compensating circuit 66.

In step S57, the reverse-direction motion compensating circuit 66 applies motion compensation in the reverse direction to the image supplied from the upsampling filter 65 as the upsampling result, based on the motion vector supplied from the motion vector detecting circuit 61, and outputs an image obtained by applying the motion compensation in the reverse direction to the taste control circuit 102.

In step S58, the taste control circuit 102 selects a filter in accordance with the taste parameter, and applies the filtering to the SR image supplied from the reverse-direction motion compensating circuit 66 using the selected filter. The taste control circuit 102 outputs an SR image obtained by applying the filtering to the addition circuit $52_n$ as a feedback value. The processing then returns to step S2, S4, or S6 of FIG. 10, and the relevant processing and the subsequent processing are repeated.

Figure 22:
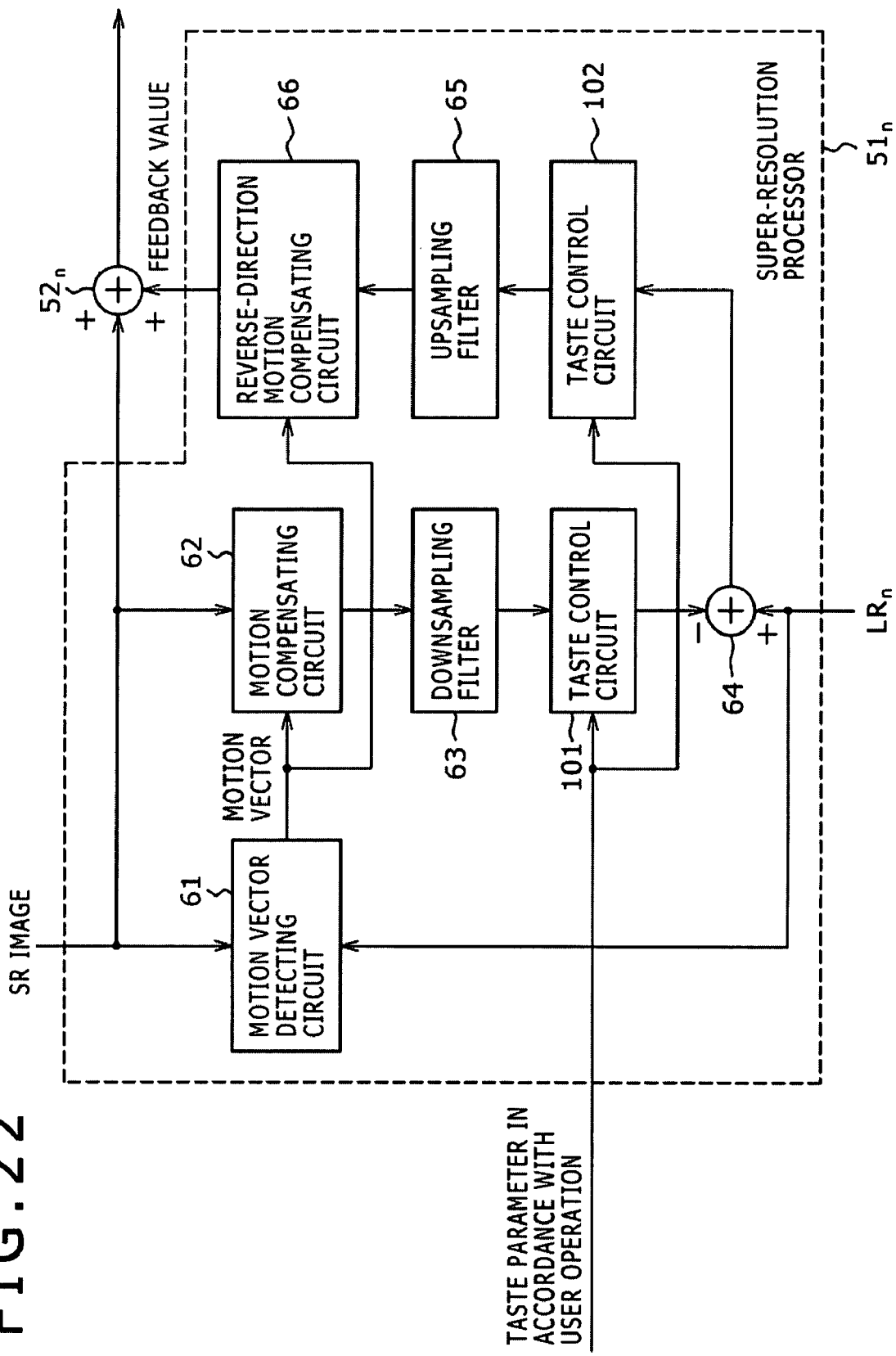
FIG. 22 is a block diagram showing another configuration example of the super-resolution processor.

FIG. 22 is a block diagram showing still another configuration example of the super-resolution processor $51_n$. The same reference numerals are given to the same components as those of FIG. 18. Duplicative description is omitted where appropriate.

The configuration of the super-resolution processor $51_n$ of FIG. 22 is different from the configuration of FIG. 18 in that the taste control circuit 101 is provided between the downsampling filter 63 and the addition circuit 64 instead of being provided in the previous stage of the motion compensating circuit 62, and that the taste control circuit 102 is provided between the addition circuit 64 and the upsampling filter 65 instead of being provided in the subsequent stage of the reverse-direction motion compensating circuit 66.

More specifically, in the configuration of FIG. 22, an image obtained by the downsampling filter 63 is supplied to the taste control circuit 101, and the image at the same resolution as that of $LR_n$ is subjected to filtering. Moreover, a differential image found by the addition circuit 64 is supplied to the taste control circuit 102, so that in this stage, the filtering is applied to the differential image.

Thus, the taste control circuit 101 may be provided in any position within the super-resolution processor $51_n$, as long as it is in a position in the previous stage of the addition circuit 64, which is a component finding the differential image. Moreover, the taste control circuit 102 may be provided in any position within the super-resolution processor $51_n$, as long as it is in a position in the subsequent stage of the addition circuit 64. For example, the taste control circuits 101, 102 can be also realized by a synthesis filter with DSF or USF.

Only one of the taste control circuit 101 and the taste control circuit 102 may be provided.

Next, a configuration to realize the function of imaging a moving picture is described.

Figure 23:
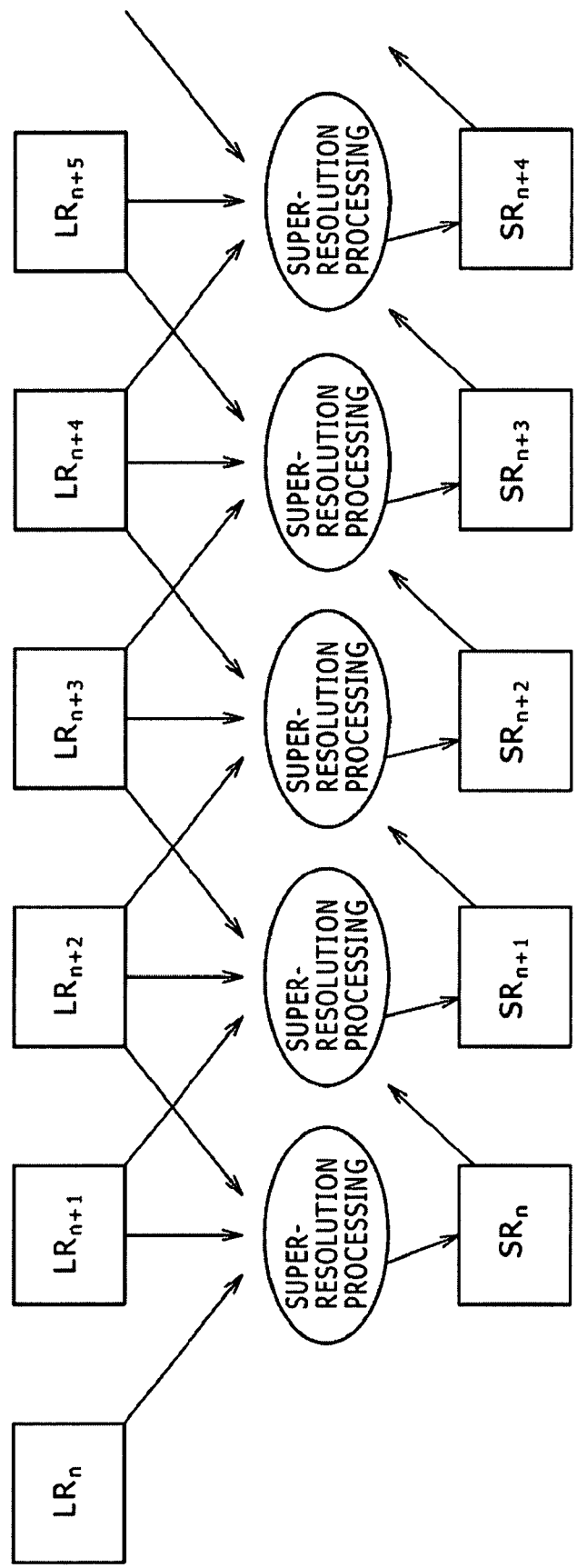
FIG. 23 is a diagram showing a concept of imaging of a moving picture.

FIG. 23 is a diagram showing a concept of the imaging of a moving picture performed by the imaging apparatus 31.

$LR_n$ to $LR_{n+5}$ in FIG. 23 are LR images picked up by the imaging unit 41 and used for super-resolution processing. In the imaging unit 41, the imaging of the LR images is performed at a frame rate of 30 frames/second, for example.

As shown in FIG. 23, in each of the super-resolution processing except for the first processing, three frames of LR images picked up continuously, and one frame of SR image are used. For example, in the first super-resolution processing, three frames of LR images of $LR_n$, $LR_{n+1}$, and $LR_{n+2}$ are used to generate $SR_n$, which is one frame of SR image.

Moreover, in the second super-resolution processing, three frames of LR images of $LR_{n+1}$, $LR_{n+2}$, $LR_{n+3}$, and $SR_n$ which is the SR image generated by the first super-resolution processing are used to generate $SR_{n+1}$ which is one frame of SR image.

In the third super-resolution processing, three frames of LR images of $LR_{n+2}$, $LR_{n+3}$, $LR_{n+4}$, and $SR_{n+1}$ which is the SR image generated by the second super-resolution processing are used to generate $SR_{n+2}$ which is one frame of SR image.

Figure 24:
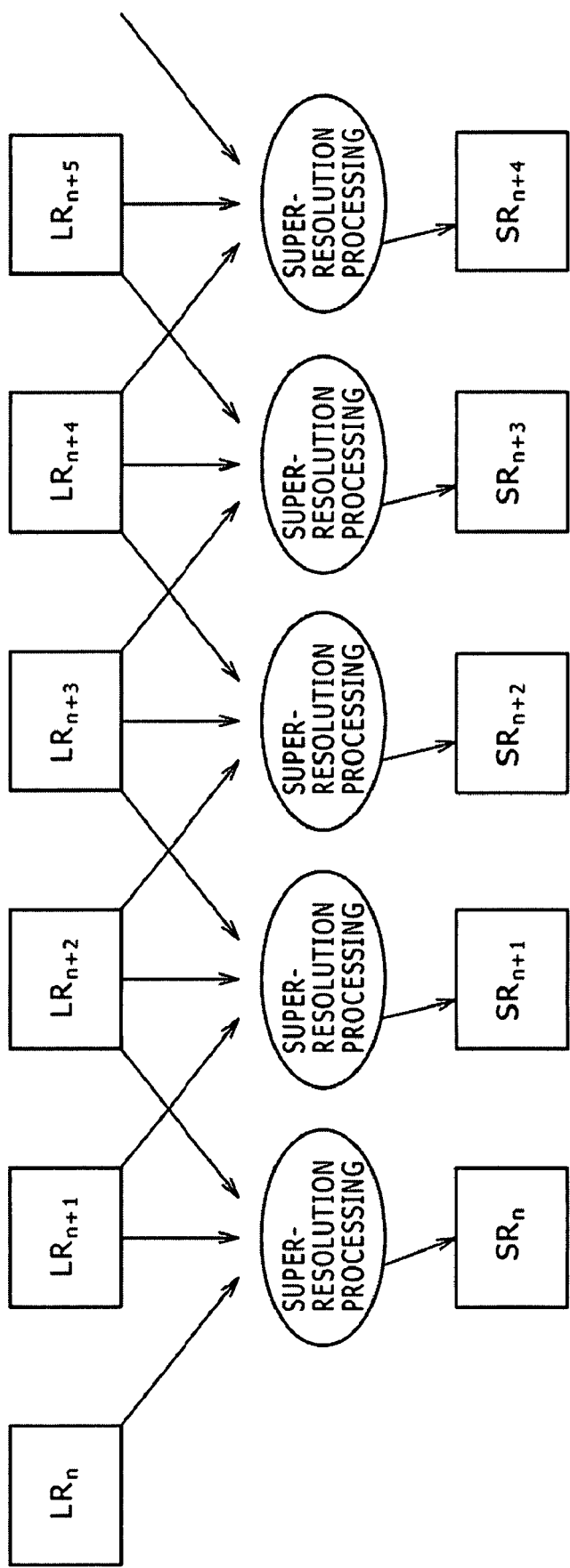
FIG. 24 is a diagram showing a conventional concept of imaging of a moving picture.

In this manner, in the imaging apparatus 31, the SR image generated in the super-resolution processing is also used for the immediately subsequent super-resolution processing, which can make the processing faster as compared with the case where only the LR images are used to perform the super-resolution processing, as shown in FIG. 24, for example.

FIG. 24 is a block diagram showing an existing concept of the function of the imaging of a moving picture using the super-resolution processing, in which in each super-resolution processing, only three frames of LR images picked up continuously are used. For example, in the first super-resolution processing, three frames of LR images of $LR_n$, $LR_{n+1}$, $LR_{n+2}$ are used to generate $SR_n$ which is one frame of SR image. Moreover, in the second super-resolution processing, three frames of LR images of $LR_{n+1}$, $LR_{n+2}$, $LR_{n+3}$ are used to generate $SR_{n+1}$ which is one frame of SR image.

Figure 25:
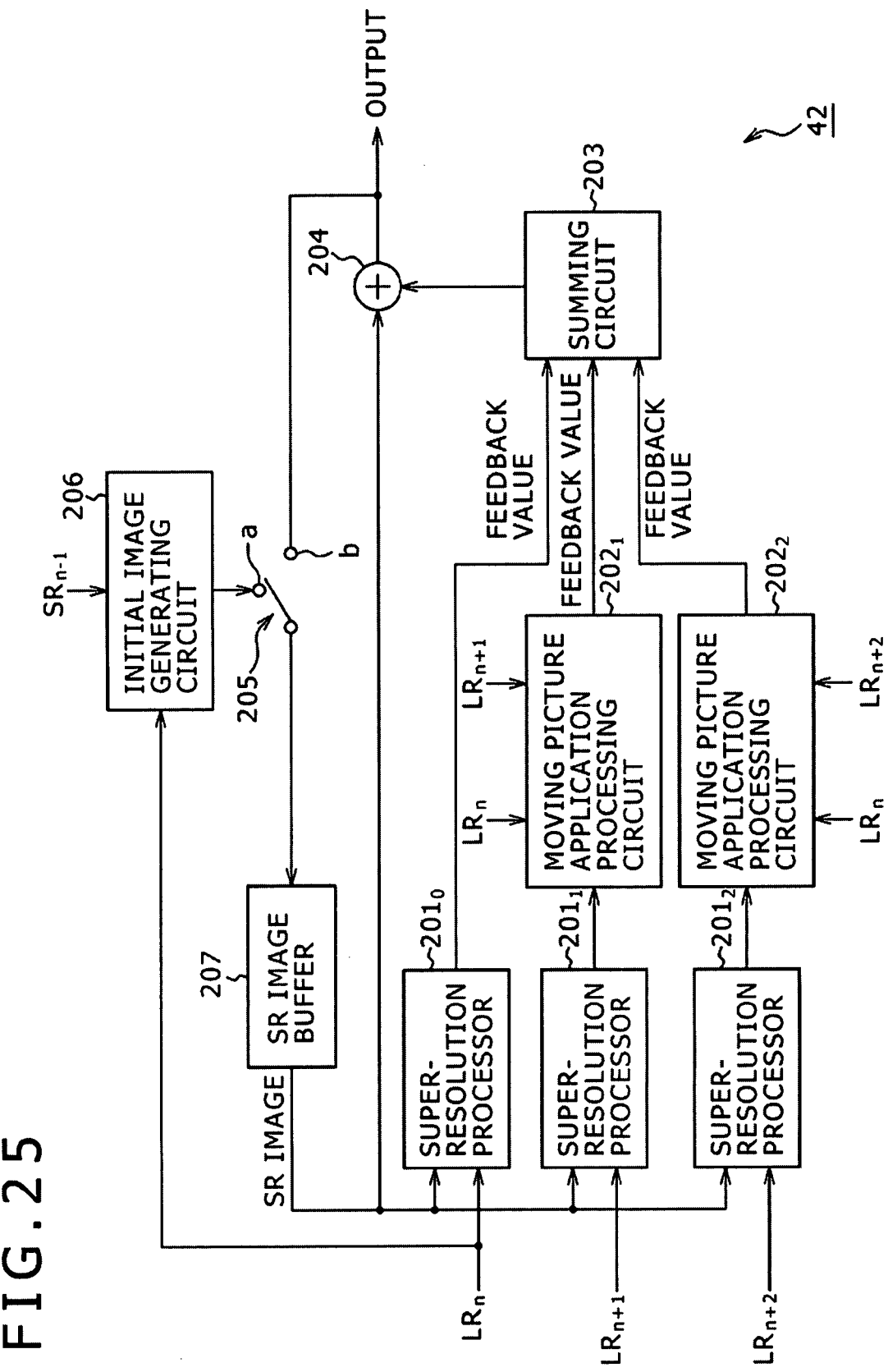
FIG. 25 is a block diagram showing still another configuration example of the image processing unit.

FIG. 25 is a block diagram showing a configuration example of the image processing unit 42 that performs the super-resolution processing using three frames of LR images picked up continuously and one frame of SR image obtained by an immediately preceding super-resolution processing to thereby realize the imaging of a moving picture, as shown in FIG. 23.

The image processing unit 42 of FIG. 25 is basically obtained by extending the configuration of FIG. 3, which realizes the imaging of a still picture, in order to realize the imaging of a moving picture.

As shown in FIG. 25, the image processing unit 42 is made of super-resolution processors $201_0$ to $201_2$, moving picture application processing circuits $202_1$, $202_2$, a summing circuit 203, an addition circuit 204, a switch 205, an initial image generating circuit 206, and an SR image buffer 207.

$LR_n$, which is an LR image obtained by imaging, is inputted to the super-resolution processor $201_0$, the moving picture application processing circuits $202_1$, $202_2$, and the initial image generating circuit 206, and $LR_{n+1}$ is inputted to the super-resolution processor $201_1$ and the moving picture application processing circuit $202_1$. $LR_{n+2}$ is inputted to the super-resolution processor $201_2$ and the moving picture application processing circuit $202_2$.

The super-resolution processor $201_0$ performs the feedback value arithmetic processing based on $LR_n$ and an SR image stored in the SR image buffer 207, and outputs a feedback value to the summing circuit 203. It is considered that there is no large difference between $LR_n$ inputted to the super-resolution processor $201_0$ and the contents caught on the SR image, so that in an SR image represented by the feedback value found by the super-resolution processor $201_0$, information of all pixels thereof are basically used for addition processing. Thus, the output of the super-resolution processor $201_0$ is sent to the summing circuit 203 as it is without being subjected to moving picture application processing, unlike the outputs of the super-resolution processors $201_1$, $201_2$.

The super-resolution processor $201_1$ performs the feedback value arithmetic processing based on $LR_{n+1}$ and the SR image stored in the SR image buffer 207, and outputs a feedback value representing an SR image to the moving picture application processing circuit $202_1$.

The super-resolution processor $201_2$ performs the feedback value arithmetic processing based on $LR_{n+2}$ and the SR image stored in the SR image buffer 207, and outputs a feedback value representing an SR image to the moving picture application processing circuit $202_2$.

The moving picture application processing circuit $202_1$ outputs to the summing circuit 203 only information of pixels that are determined to be usable for adding to the SR image stored in the SR image buffer 207 among pixels of the SR image supplied from the super-resolution processor $201_1$, as a feedback value.

For example, pixels in a region that is considered to degrade the image quality when being added to the SR image stored in the SR image buffer 207 are determined to be pixels unusable for the addition to the SR image, so that only pixels in a region that is considered to contribute to improvement of the image quality when being added are extracted by the moving picture application processing. In the imaging of a moving picture, an object whose motion is large is often a subject, and thus, an unclear image of the subject may be obtained when the motion compensation is performed as one processing in the feedback value arithmetic processing.

Accordingly, this moving picture application processing removes the pixels in the region where the subject is caught unclearly. Details of the moving picture application processing will be described later.

The moving picture application processing circuit $202_2$ outputs to the summing circuit 203 only information of pixels that are determined to be usable for adding to the SR image stored in the SR image buffer 207 among pixels of the SR image supplied from the super-resolution processor $201_2$, as a feedback value.

The summing circuit 203 averages the feedback values supplied from the super-resolution processor $201_0$, and the moving picture application processing circuits $202_1$, $202_2$, and outputs an image at the same resolution as that of the SR image, which has been obtained by averaging, to the addition circuit 204.

The addition circuit 204 adds the SR image stored in the SR image buffer 207 and the SR image supplied from the summing circuit 203, and outputs an SR image obtained by the addition. The output of the addition circuit 204 is supplied to the recording unit 43 as a result of the super-resolution processing, and at the same time, is supplied to the SR image buffer 207 to be stored.

When an initial image is generated by the initial image generating circuit 206, the switch 205 connects to a terminal a to cause the initial image to be stored in the SR image buffer 207. Moreover, when the SR image is supplied from the addition circuit 204, the switch 205 connects to a terminal b to cause the SR image to be stored in the SR image buffer 207. The switch 205 connects to the terminal a when the initial super-resolution processing is performed, and connects to the terminal b when the second super-resolution processing or the subsequent super-resolution processing is performed in the repeated super-resolution processing.

The initial image generating circuit 206 generates the initial image based on $LR_n$ obtained by imaging and $SR_{n-1}$, which is an SR image of an immediately preceding frame obtained as a processing result of the super-resolution processing, and causes the generated initial image to be stored in the SR image buffer 207 through the switch 205 with the terminal a connected. For example, when generating an SR image of the second frame by the super-resolution processing, $LR_2$ obtained by imaging and $SR_1$, which is an SR image obtained as a processing result of the super-resolution processing, are supplied to the initial image generating circuit 206, and when generating an SR image of the third frame by the super-resolution processing, $LR_3$ obtained by imaging and $SR_2$, which is an SR image obtained as a processing result of the super-resolution processing, are supplied.

The SR image buffer 207 stores the initial image generated by the initial image generating circuit 206 or the SR image outputted from the addition circuit 204.

FIG. 26 is a block diagram showing a configuration example of the initial image generating circuit 206.

As shown in FIG. 26, the initial image generating circuit 206 is composed of an upsampling processing unit 221, a motion correcting unit 222, and an image generating unit 223. $LR_n$ is inputted to the upsampling processing unit 221, and $SR_{n-1}$ is inputted to the motion correcting unit 222. The upsampling processing unit 221 upsamples $LR_n$ to an image as the same resolution as that of the SR image, and outputs the image obtained by upsampling to the motion correcting unit 222 and the image generating unit 223.

The motion correcting unit 222 detects a motion vector with the upsampling result of $LR_n$ used as a reference, based on $SR_{n-1}$ and the upsampling result of $LR_n$ supplied from the upsampling processing unit 221, and applies the motion compensation to $SR_{n-1}$ using the detected motion vector. The motion correcting unit 222 outputs an image obtained by applying the motion compensation, to the image generating unit 223.

The image generating unit 223 generates the initial image based on the upsampling result of $LR_n$ supplied from the upsampling processing unit 221, and the result of the motion compensation supplied from the motion correcting unit 222, and causes the generated initial image to be stored in the SR image buffer 207. The image generating unit 223, for example, replaces pixels in a region incapable of performing the motion compensation successfully in the SR image supplied from the motion correcting unit 222 with pixels of the SR image as the upsampling result of $LR_n$ in a region in the same position to thereby generate the initial image.

Figure 27A:
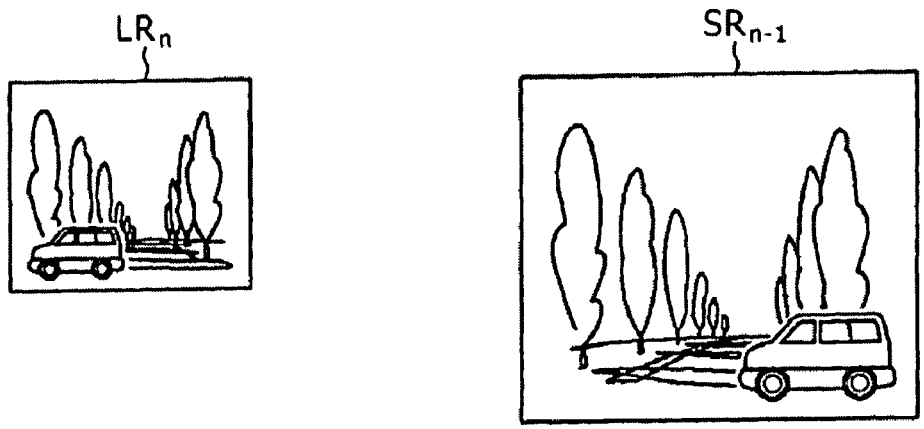
FIGS. 27A-27C are diagrams showing an example of generation of an initial image.
Figure 27B:
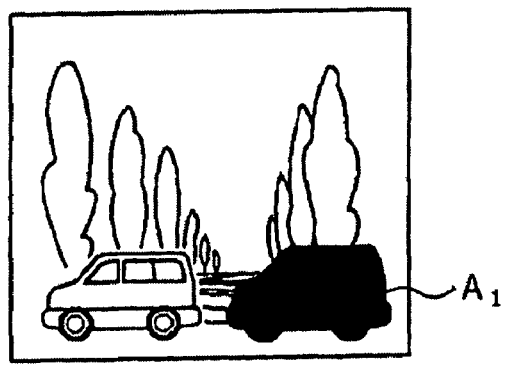
Figure 27C:
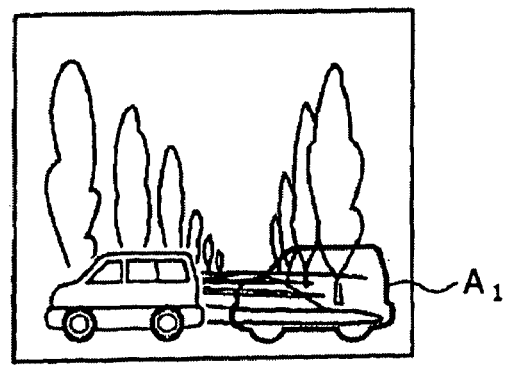

FIGS. 27A to 27C are diagrams showing an example of generation of an initial image.

$LR_n$ shown on the left side of FIG. 27A is an LR image inputted to the upsampling processing unit 221, while $SR_{n-1}$ shown on the right side is an SR image inputted to the motion correcting unit 222. A difference in size between $LR_n$ and $SR_{n-1}$ indicates a difference in resolution. Since $LR_n$ is imaged after $LR_{n-1}$ used for the generation of $SR_{n-1}$, the position of an automobile caught on $LR_n$ is a position moved in a traveling direction from the position of the automobile caught on $SR_{n-1}$. The backgrounds of $LR_n$ and $SR_{n-1}$ are almost the same scenery.

For example, the above-described $LR_n$ is upsampled, and using the upsampling result and $SR_{n-1}$, a motion vector is detected. The detected motion vector is a vector from the position of the automobile caught on $SR_{n-1}$ toward the position of the automobile caught on the upsampling result of $LR_n$. When the motion compensation is applied to $SR_{n-1}$ using the above-described motion vector, an SR image shown in FIG. 27B is obtained as a result of the motion compensation.

In the SR image shown in FIG. 27B, the position of the automobile is moved in the traveling direction as compared with $SR_{n-1}$ of FIG. 27A. A region $A_1$ is a background region not caught on $SR_{n-1}$, which will be extracted as the region to which the motion compensation cannot be applied successfully.

An SR image shown in FIG. 27C is an image where pixels in the region $A_1$ in the SR image shown in FIG. 27B are replaced with pixels in a region in the same position as the region $A_1$ in the upsampling result of $LR_n$. In this manner, the SR image where the pixels in the region to which the motion compensation cannot be applied successfully are replaced with the pixels of the upsampling result of $LR_n$ is used as the initial image. A frame indicating the region $A_1$ shown in the initial image of FIG. 27C is given only for convenience, and does not appear on the actual image.

The above-described initial image generation is performed at the start time of the initial super-resolution processing in the repeated super-resolution processing.

Figure 28:
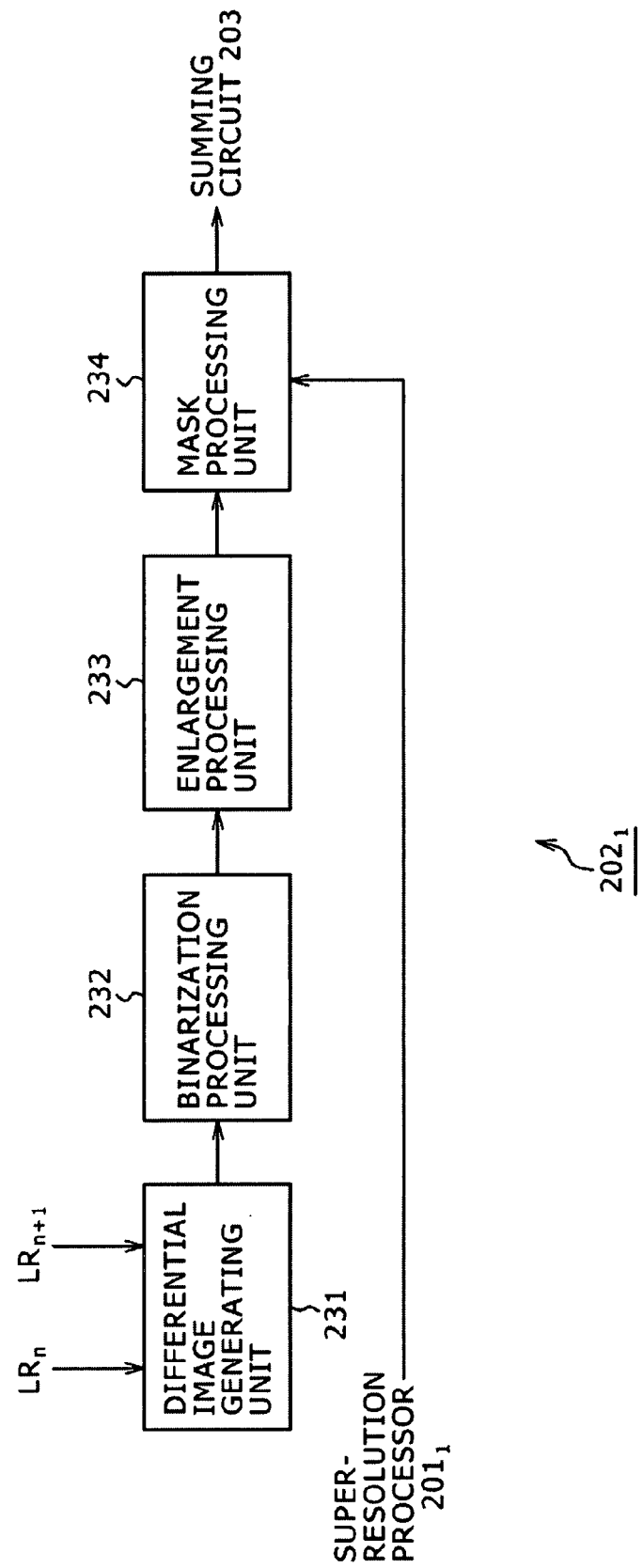
FIG. 28 is a block diagram showing a configuration example of a moving picture application processing circuit.

FIG. 28 is a block diagram showing a configuration example of the moving picture application processing circuit $202_1$.

As shown in FIG. 28, the moving application processing circuit $202_1$ is made of a differential image generating unit 231, a binarization processing unit 232, an enlargement processing unit 233 and a mask processing unit 234.

$LR_n$ and $LR_{n+1}$ obtained by imaging are inputted to the differential image generating unit 231, and an SR image obtained by performing the feedback value arithmetic processing by the super-resolution processor $201_1$ is inputted to the mask processing unit 234.

The differential image generating unit 231 finds a differential image representing a difference between $LR_n$ and $LR_{n+1}$ and outputs the found differential image to the binarization processing unit 232.

Based on the differential image supplied from the differential image generating unit 231, the binarization processing unit 232 generates a binarized image in which, for example, a region with little difference between $LR_n$ and $LR_{n+1}$ is represented by 1, and a region with difference more than a threshold is represented by 0, and outputs the generated binarized image to the enlargement processing unit 233.

The enlargement processing unit 233 enlarges the binarized image generated by the binarization processing unit 232 to an image as the same resolution as that of the SR image and outputs the same to the mask processing unit 234 as a mask image.

The mask processing unit 234 applies the mask processing to the SR image supplied from the super-resolution processor $201_1$ using the mask image supplied from the enlargement processing unit 233, and outputs a result from the mask processing to the summing circuit 203 as a feedback value.

Figure 29A:
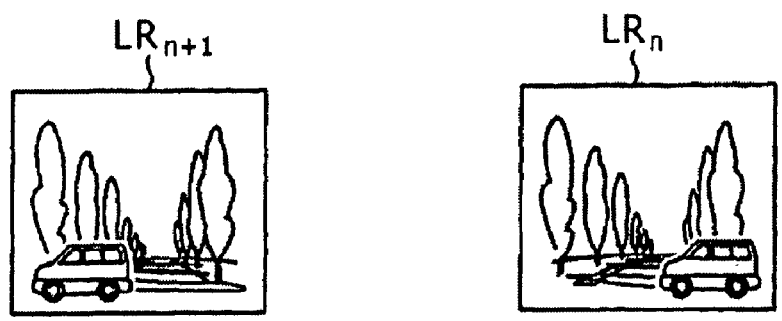
FIGS. 29A-29C are diagrams showing an example of generation of a mask image.
Figure 29B:
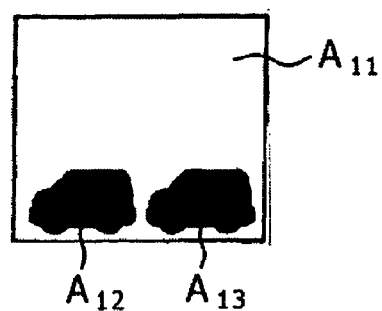
Figure 29C:
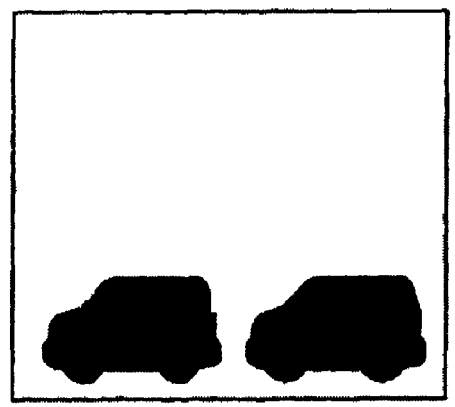

FIGS. 29A to 29C are diagrams showing an example of generation of the mask image.

$LR_{n+1}$ shown on the left side of FIG. 29A and $LR_n$ shown on the right side are LR images inputted to the differential image generating unit 231. For example, the differential image is found from these LR images, and is binarized.

FIG. 29B is a diagram showing an example of the binarized image, in which in the whole binarized image, a region $A_{11}$ is a region corresponding to a region where a background is caught on both $LR_{n+1}$ and $LR_n$, thereby having little difference. Thus, this region is represented by 1.

On the other hand, a region $A_{12}$ is a region corresponding to a region where an automobile is caught on $LR_{n+1}$, and a background is caught on $LR_n$ respectively, thereby having a difference, so that this region is represented by 0. A region $A_{13}$ is a region corresponding to a region where a background is caught on $LR_{n+1}$, and the automobile is caught on $LR_n$ respectively, thereby having a difference. Therefore, this region is also represented by 0.

An SR image shown in FIG. 29C is a mask image obtained by enlarging the binarized image shown in FIG. 29B into an image as the same resolution as that of the SR image. The mask processing using the above-described mask image is applied to the SR image obtained by the feedback arithmetic processing. The mask processing replaces pixels in the region corresponding to the region represented in black in the mask image of FIG. 29C in the SR image obtained by the feedback value arithmetic processing with 0, and outputs the SR image part of which has been replaced with 0 to the summing circuit 203 as a feedback value.

By applying the above-described mask processing to the result of the feedback value arithmetic processing, the information of the pixels in the region of the subject moving considerably can be prevented from being fed back and added to the SR image in the SR image buffer 207. Since subject shake may occur in the region of the subject moving considerably, image quality of the SR image may be prevented from being deteriorated by avoiding causing a feed back of the pixel information in such a region.

The moving picture application processing circuit $202_2$ also has a similar configuration to the configuration of FIG. 28. In the moving picture application processing circuit $202_2$, $LR_{n+2}$ is used instead of $LR_{n+1}$ to perform processing similar to the above-described processing.

Figure 30:
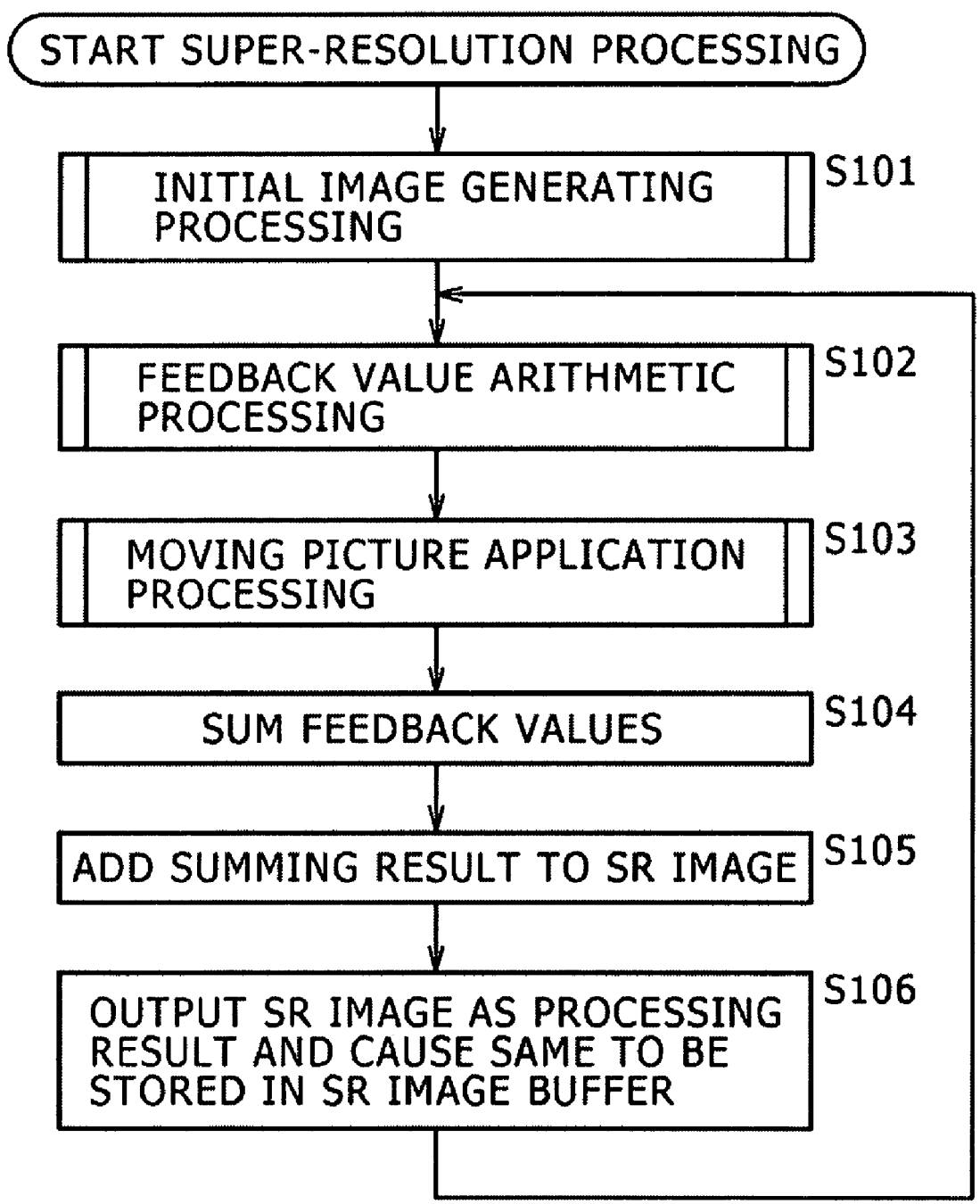
FIG. 30 is a flowchart for explaining super-resolution processing at the time of imaging of a moving picture.

Here, referring to a flowchart of FIG. 30, a description of the super-resolution processing at the time of moving picture imaging, which is performed by the image processing unit 42 having the configuration of FIG. 25, is given.

This processing is started when a moving picture is imaged by the imaging unit 41, $LR_n$ is inputted to the super-resolution processor $201_0$, the moving picture application processing circuits $202_1$, $202_2$, and the initial image generating circuit 206, $LR_{n+1}$ is inputted to the super-resolution processor $201_1$ and the moving picture application processing circuit $202_1$, and $LR_{n+2}$ is inputted to the super-resolution processor $201_2$ and the moving picture application processing circuit $202_2$.

In step S101, the initial image generating circuit 206 executes the initial image generating processing and causes the generated initial image to be stored in the SR image buffer 207. The initial image generating processing will be described later with reference to a flowchart of FIG. 31.

In step S102, each of the super-resolution processors $201_0$ to $201_2$ performs the feedback value arithmetic processing based on an LR image and the SR image stored in the SR image buffer 207, and outputs a feedback value.

Processing similar to the processing described with reference to FIG. 11 is performed, based on $LR_n$ and the SR image in the super-resolution processor $201_0$, based on $LR_{n+1}$ and the SR image in the super-resolution processor $201_1$, and based on $LR_{n+2}$ and the SR image in the super-resolution processor $201_2$, respectively. The feedback value outputted from the super-resolution processor $201_0$ is inputted to the summing circuit 203, and the feedback value outputted from the super-resolution processor $201_1$ is inputted to the moving picture application processing circuit $202_1$. The feedback value outputted from the super-resolution processor $201_2$ is inputted to the moving picture application processing circuit $202_2$.

In step S103, each of the moving picture application processing circuits $202_1$, $202_2$ performs the moving picture application processing, and outputs the feedback value obtained by the moving picture application processing to the summing circuit 203. The moving picture application processing will be described later with reference to a flowchart of FIG. 32.

In step S104, the summing circuit 203 sums the feedback values supplied from the super-resolution processor $201_0$, and the moving picture application processing circuits $202_1$, $202_2$, and outputs the summed result to the addition circuit 204.

In step S105, the summing circuit 204 adds the SR image represented by the feedback value supplied from the summing circuit 203 to the SR image stored in the SR image buffer 207.

In step S106, the addition circuit 204 outputs the SR image obtained by the addition to the recording unit 43, and at the same time, is supplied to the SR image buffer 207 to be stored.

The processing in the step S102 and later is repeated until it is determined that the SR image outputted from the image processing unit 42 has a sufficient resolution.

Figure 31:
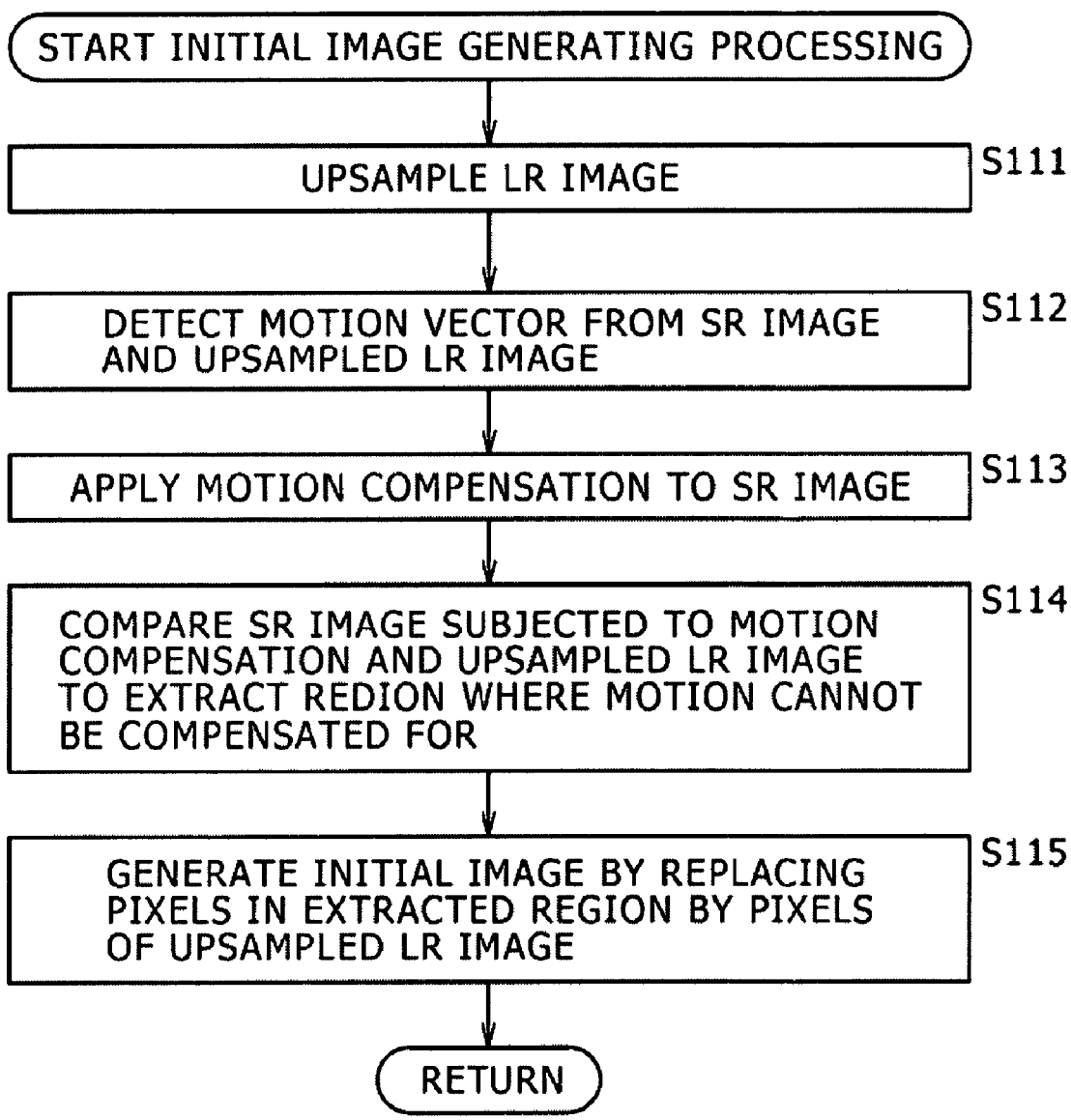
FIG. 31 is a flowchart for explaining initial image generation processing performed in step S101 of FIG. 30.

Next, referring to the flowchart of FIG. 31, the initial image generating processing performed in step S101 of FIG. 30 is described.

In step S111, the upsampling processing unit 221 of the initial image generating circuit 206 upsamples $LR_n$ to an image as the same resolution as that of the SR image, and outputs the image obtained by the upsampling to the motion correcting unit 222 and the image generating unit 223.

In step S112, the motion correcting unit 222 detects a motion vector based on $SR_{n-1}$ and the upsampling result of $LR_n$ supplied from the upsampling processing unit 221.

In step S113, the motion correcting unit 222 applies the motion compensation to $SR_{n-1}$ using the detected motion vector, and outputs an obtained image to the image generating unit 223.

In step S114, the image generating unit 223 compares the SR image as the upsampling result of $LR_n$ supplied from the upsampling processing unit 221 and the SR image as the result of the motion compensation supplied from the motion correcting unit 222, and extracts a region to which the motion compensation cannot be applied in the SR image as the motion compensation result.

In step S115, the image generating unit 223 replaces pixels in the region extracted in step S114 with pixels of the SR image as the upsampling result of $LR_n$ in the region in the same position to thereby generate the initial image. The processing then returns to step S101 of FIG. 30 to perform the relevant processing and the subsequent processing.

Figure 32:
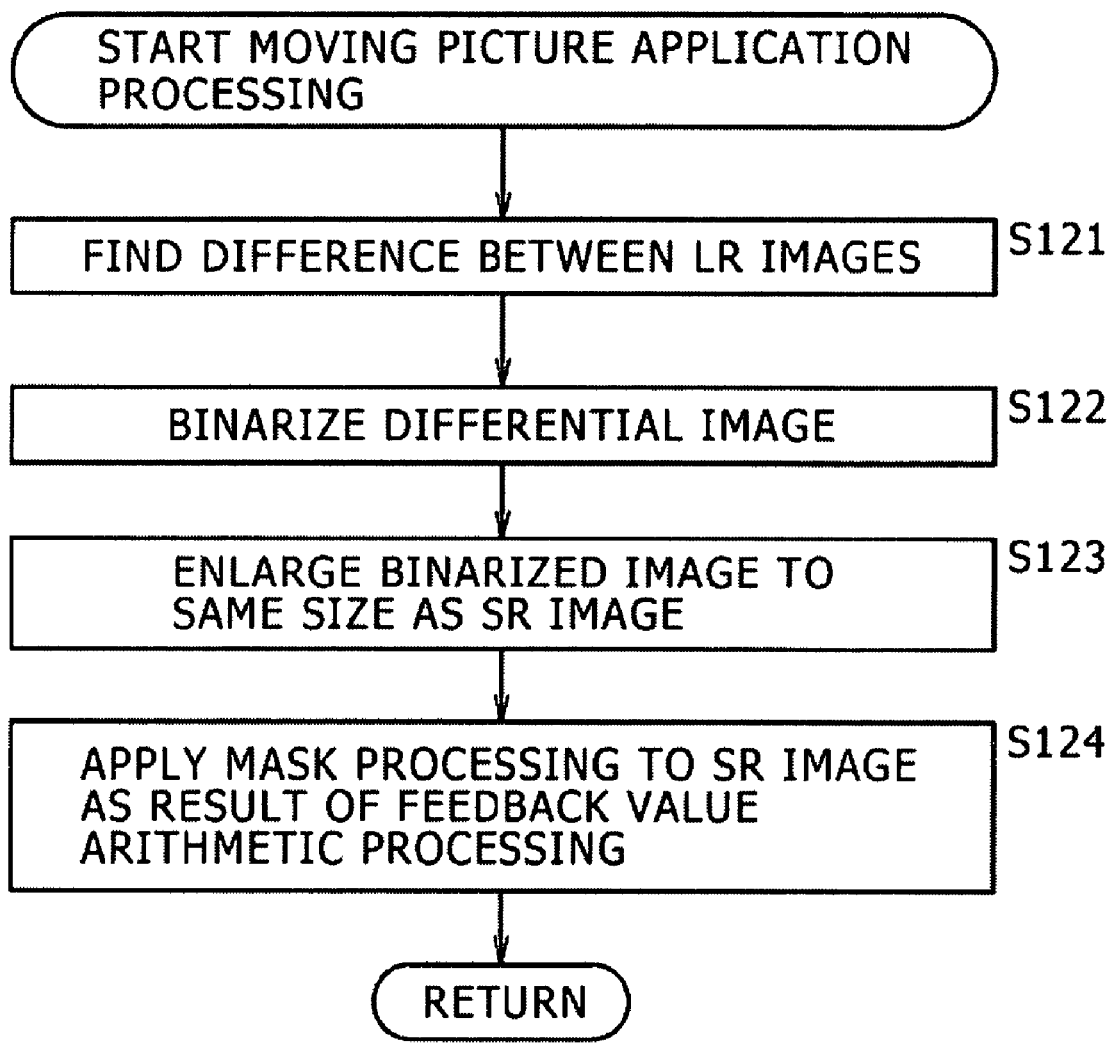
FIG. 32 is a flowchart for explaining moving picture application processing performed in step S103 of FIG. 30.

Next, referring to the flowchart of FIG. 32, the moving picture application processing performed in step S103 of FIG. 30 is described. Here, a description of the processing performed by the moving picture application processing circuit $202_1$ is given. Similar processing is also performed in the moving picture application processing circuit $202_2$.

In step S121, the differential image generating unit 231 of the moving picture application processing circuit $202_1$ finds a differential image representing a difference between $LR_n$ and $LR_{n+1}$, and outputs the found differential image to the binarization processing unit 232.

In step S122, the binarization processing unit 232 generates a binarized image in which, for example, a region with little difference between $LR_n$ and $LR_{n+1}$ is represented by 1, a region with difference more than a threshold is represented by 0, and outputs the generated binarized image to the enlargement processing unit 233.

In step S123, the enlargement processing unit 233 enlarges the binarized image generated by the binarization processing unit 232 to an image at the same resolution (size) as that of the SR image and outputs the same to the mask processing unit 234 as a mask image.

In step S124, the mask processing unit 234 applies the mask processing to the SR image supplied from the super-resolution processor $201_1$ using the mask image supplied from the enlargement processing unit 233, and outputs a result from the mask processing to the summing circuit 203 as a feedback value.

Figure 33:
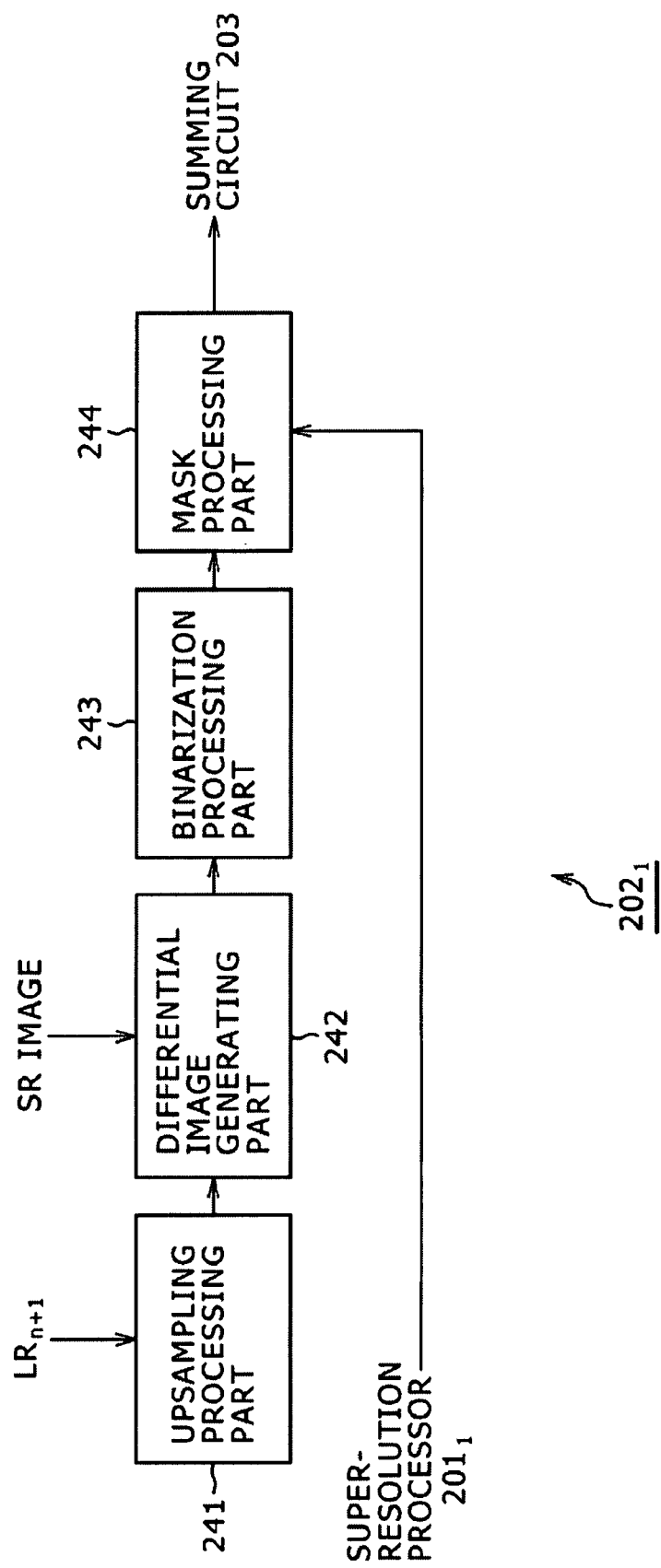
FIG. 33 is a block diagram showing another configuration example of the moving picture application processing circuit.

FIG. 33 is a block diagram showing another configuration example of the moving picture application processing circuit $202_1$.

While in the example of FIG. 25, as the LR image used for the moving picture application processing, $LR_n$ is inputted to the moving picture application processing circuits $202_1$, $202_2$, $LR_{n+1}$ to the moving picture application processing circuit $202_1$, and $LR_{n+2}$ to the moving picture application processing circuit $202_2$, respectively, the SR image stored in the SR image buffer 207 can also be inputted instead of $LR_n$.

In the example of FIG. 33, the moving picture application processing circuit $202_1$ is composed of an upsampling processing unit 241, a differential image generating unit 242, a binarization processing unit 243, and a mask processing unit 244, and $LR_{n+1}$ obtained by imaging is inputted to the upsampling processing unit 241, the SR image stored in the SR image buffer 207 is inputted to the differential image generating unit 242. The SR image obtained by performing the feedback value arithmetic processing by the super-resolution processor $201_1$ is inputted to the mask processing unit 244.

The upsampling processing unit 241 upsamples $LR_{n+1}$ to an image as the same resolution as that of the SR image and outputs the image obtained by the upsampling to the differential image generating unit 242.

The differential image generating unit 242 finds a differential image representing a difference between the upsampling result of $LR_{n+1}$ and the SR image, and outputs the found differential image to the binarization processing unit 243.

Based on the differential image supplied from the differential image generating unit 242, the binarization processing unit 243 generates a binarized image in which, for example, a region with little difference between the upsampling result of $LR_{n+1}$ and the SR image is represented by 1, and a region with difference more than a threshold is represented by 0, and outputs the generated binarized image to the mask processing unit 244 as a mask image.

The mask processing unit 244 applies the mask processing to the SR image supplied from the super-resolution processor $201_1$ using the mask image supplied from the binarization processing unit 243, and outputs a result from the mask processing to the summing circuit 203 as a feedback value.

Figure 34A:
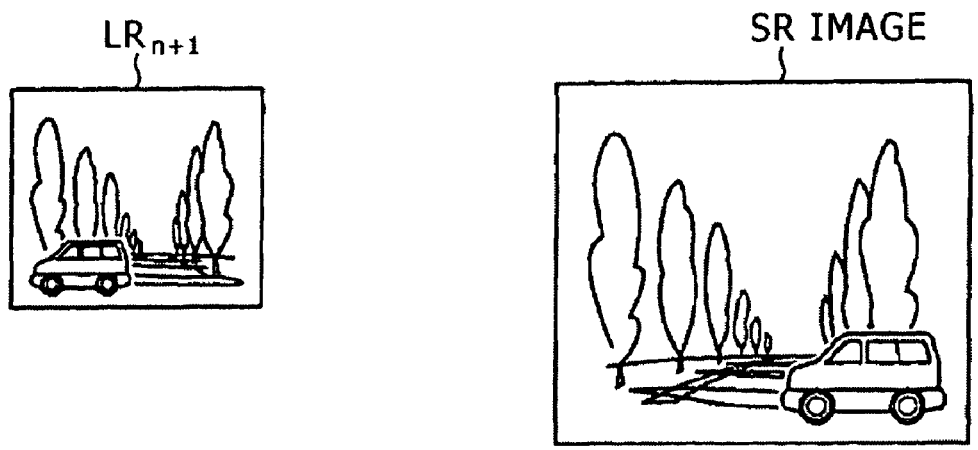
FIGS. 34A-34C are diagrams showing another example of generation of a mask image.
Figure 34B:
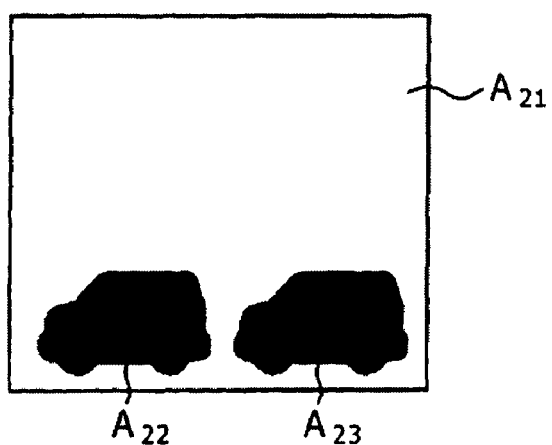
Figure 34C:
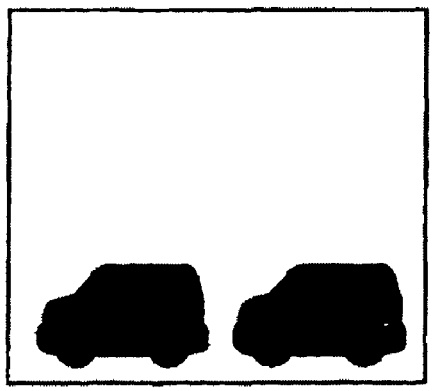

FIGS. 34A to 34C are diagrams showing an example of generation of the mask image.

$LR_{n+1}$ shown on the left side of FIG. 34A is an LR image inputted to the upsampling processing unit 241, and an SR image shown on the right side is an SR image inputted to the differential image generating unit 242. For example, this LR image is subjected to upsampling, and a differential image is found from the upsampling result and an SR image to be binarized.

FIG. 34B is a diagram showing an example of the binarized image. In the whole binarized image, a region $A_{21}$ is a region corresponding to a region where a background is caught on both the upsampling result of $LR_{n+1}$ and the SR image, thereby having little difference, and thus, this region can be represented by 1.

On the other hand, a region $A_{22}$ is a region corresponding to a region where an automobile is caught on the upsampling result of $LR_{n+1}$, and a background is caught on the SR image, thereby having a difference. Thus, this region is represented by 0. A region $A_{23}$ is a region corresponding to a region where a background is caught on the upsampling result of $LR_{n+1}$, and the automobile is caught on the SR image, thereby having a difference. Thus, this region is also represented by 0.

An SR image shown in FIG. 34C is a mask image obtained from the binarized image shown in FIG. 34B. The mask processing using the above-described mask image is applied to the SR image obtained by the super-resolution processor $201_1$. The mask processing replaces pixels in the region corresponding to the region represented in black in the mask image of FIG. 34C in the SR image obtained by the feedback value arithmetic processing with 0, and outputs the SR image part of which has been replaced with 0 to the summing circuit 203 as a feedback value.

By applying the above-described mask processing to the result of the feedback value arithmetic processing, the information of the pixels in the region of the subject moving considerably is also prevented from being used as the feedback value.

The moving picture application processing circuit $202_2$ may also have a similar configuration to the configuration of FIG. 33. In this case, in the moving picture application processing circuit $202_2$, $LR_{n+2}$ is used instead of $LR_{n+1}$ to perform processing similar to the above-described processing.

Figure 35:
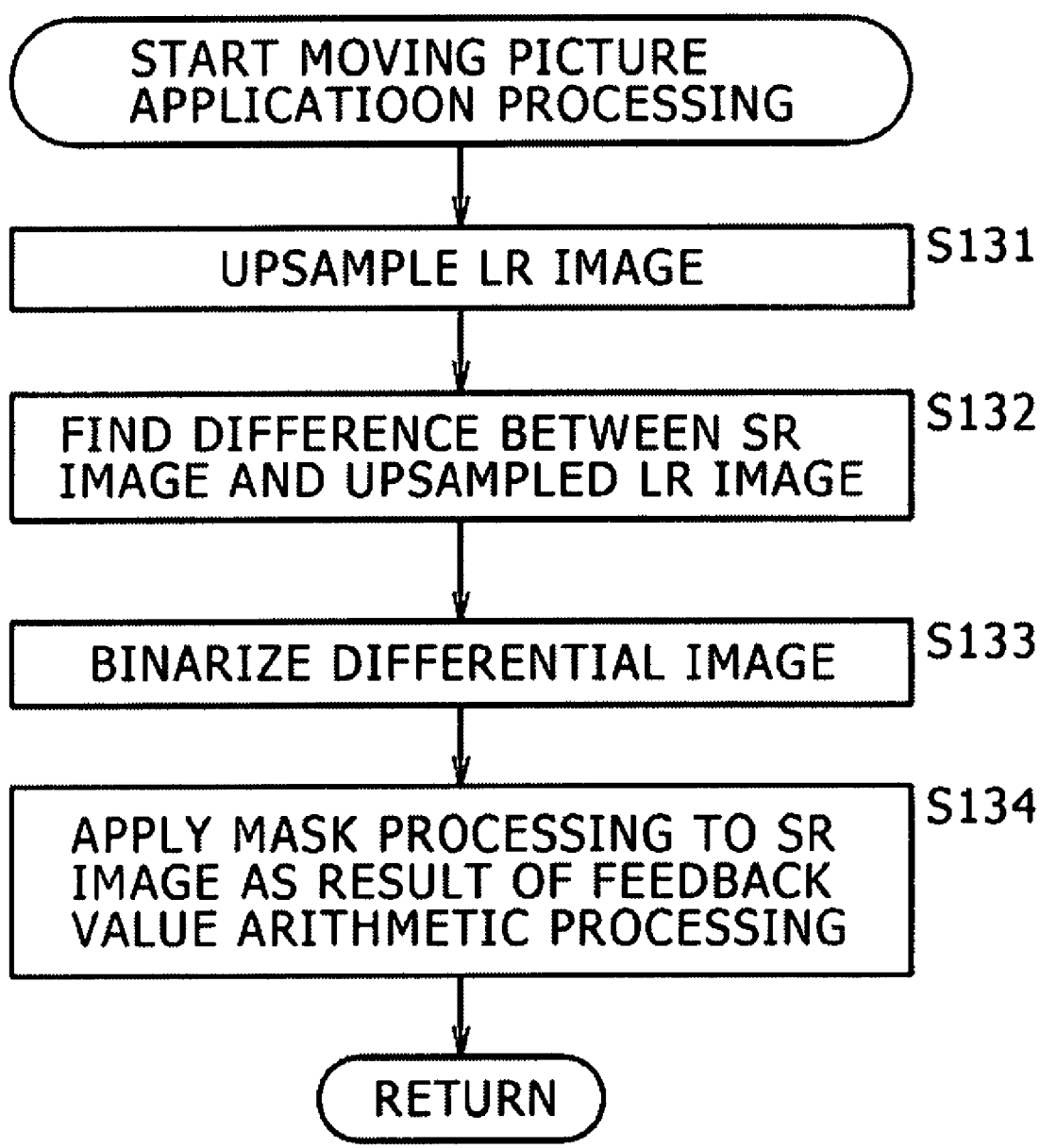
FIG. 35 is a flowchart for explaining another moving picture application processing.

Next, referring to a flowchart of FIG. 35, the moving picture application processing performed by the moving picture application processing circuit $202_1$ having the same configuration of FIG. 33 is described.

This processing is processing performed in step S103 of FIG. 30. Here, the processing performed by the moving picture application processing circuit $202_1$ is described. Similar processing is also performed in the moving picture application processing circuit $202_2$.

In step S131, the upsampling processing unit 241 upsamples $LR_{n+1}$ to an image as the same resolution as that of the SR image and outputs the image obtained by the upsampling to the differential image generating unit 242.

In step S132, the differential image generating unit 242 finds a differential image representing a difference between the upsampling result of $LR_{n+1}$ and the SR image, and outputs the found differential image to the binarization processing unit 243.

In step S133, the binarization processing unit 243 generates a mask image by binarizing the differential image supplied from the differential image generating unit 242, and outputs the generated mask image to the mask processing unit 244.

In step S134, the mask processing unit 244 applies the mask processing to the SR image supplied from the super-resolution processor $201_1$ using the mask image supplied from the binarization processing unit 243, and outputs a result from the mask processing to the summing circuit 203 as a feedback value.

Figure 36:
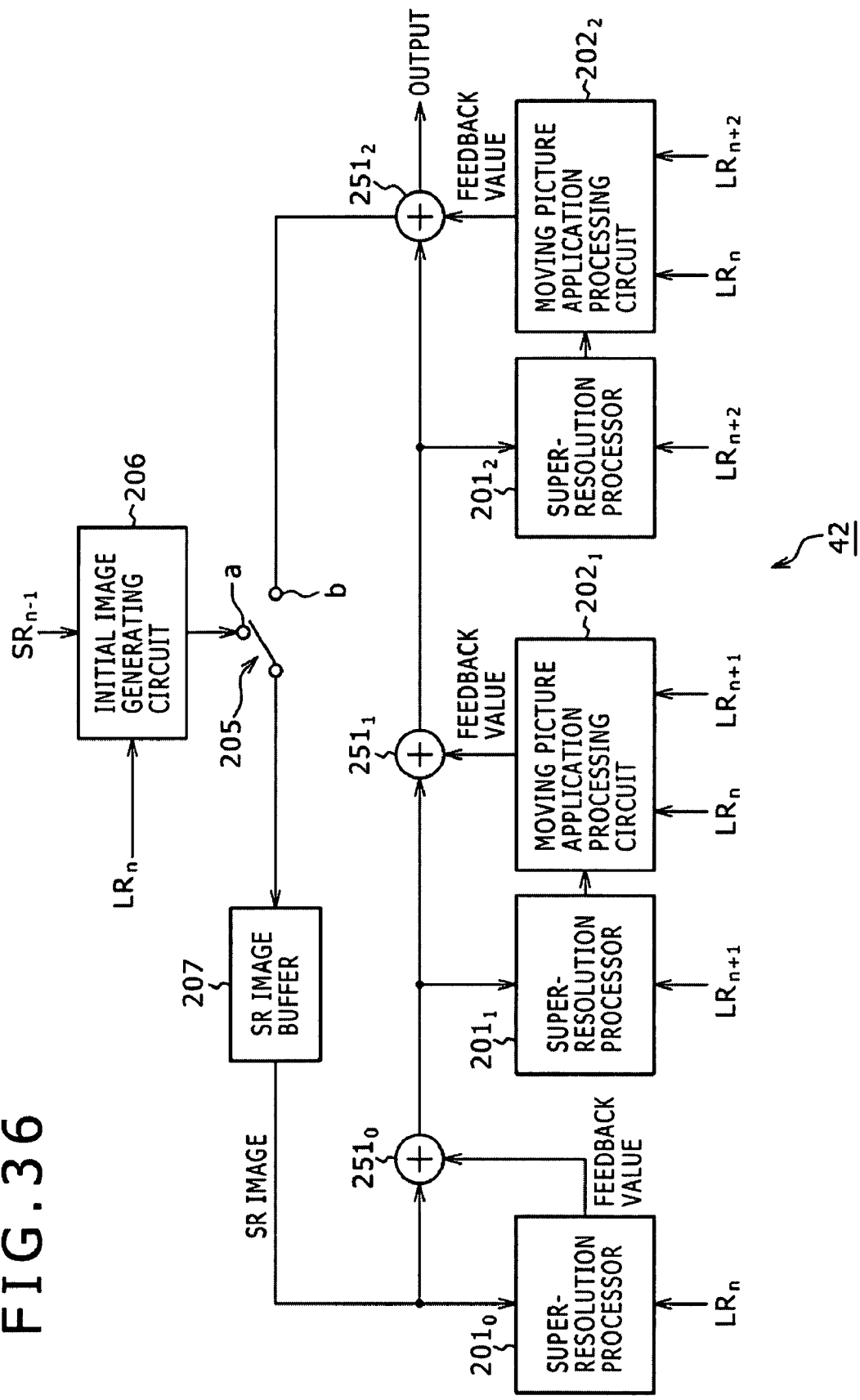
FIG. 36 is a block diagram showing still another configuration example of the image processing unit.

FIG. 36 is a block diagram showing another configuration example of the image processing unit 42 realizing the imaging of a moving picture.

In the image processing unit 42 of FIG. 36, each addition processing is performed using three frames of LR images picked up continuously and one frame of SR image obtained by the immediately preceding addition processing. The same reference numerals are given to the same components of those of FIG. 25. Duplicative description is omitted where appropriate.

In the example of FIG. 36, the image processing unit 42 is composed of the super-resolution processors $201_0$ to $201_2$, the moving picture application processing circuits $202_1$, $202_2$, the addition circuits $251_0$ to $251_2$, the switch 205, the initial image generating circuit 206, and the SR image buffer 207.

The image processing unit 42 of FIG. 36 is obtained by extending the configuration of FIG. 8, which generates an SR image by the super-resolution processing using Gauss-Seidel method, in order to realize the imaging of a moving picture.

$LR_n$, which is an LR image supplied from the imaging unit 41, is inputted to the super-resolution processor $201_0$, the moving picture application processing circuits $202_1$, $202_2$, and the initial image generating circuit 206, and $LR_{n+1}$ is inputted to the super-resolution processor $201_1$ and the moving picture application processing circuit $202_1$. $LR_{n+2}$ is inputted to the super-resolution processor $201_2$ and the moving picture application processing circuit $202_2$. $LR_n$ to $LR_{n+2}$ are LR images picked up continuously.

The super-resolution processor $201_0$ performs the feedback value arithmetic processing based on $LR_n$ and an SR image stored in the SR image buffer 207, and outputs a feedback value to the addition circuit $251_0$.

The addition circuit $251_0$ adds the SR image stored in the SR image buffer 207 and the SR image represented by the feedback value supplied from the super-resolution processor $201_0$, and outputs one frame of SR image obtained by the addition as a result of the first addition processing. The SR image outputted from the addition circuit $251_0$ is inputted to the super-resolution processor $201_1$ and the addition circuit $251_1$.

The super-resolution processor $201_1$ performs the feedback value arithmetic processing based on $LR_{n+1}$ and the SR image supplied from the addition circuit $251_0$, and outputs a feedback value to the moving picture application processing circuit $202_1$.

The moving picture application processing circuit $202_1$ outputs to the addition circuit $251_1$ only information of pixels that are determined to be usable for adding to the SR image among the pixels of the SR image supplied from the super-resolution processor $201_1$, as a feedback value.

The addition circuit $251_1$ adds the SR image supplied from the addition circuit $251_0$ and the SR image represented by the feedback value supplied from the moving picture application processing circuit $202_1$, and outputs one frame of SR image obtained by the addition as a result of the second addition processing. The SR image outputted from the addition circuit $251_1$ is inputted to the super-resolution processor $201_2$ and the addition circuit $251_2$.

The super-resolution processor $201_2$ performs the feedback value arithmetic processing based on $LR_{n+2}$ and the SR image supplied from the addition circuit $251_1$, and outputs a feedback value to the moving picture application processing circuit $202_2$.

The addition circuit $251_2$ adds the SR image supplied from the addition circuit $251_1$ and the SR image represented by the feedback value supplied from the moving picture application processing circuit $202_2$, and outputs one frame of SR image obtained by the addition as a result of the super-resolution processing. The SR image outputted from the addition circuit $251_2$ is inputted to the recording unit 43, and at the same time, is supplied to the SR image buffer 207 through the switch 205 to be stored.

When an initial image is generated by the initial image generating circuit 206, the switch 205 connects to a terminal a to cause the initial image to be stored in the SR image buffer 207. Moreover, when the SR image is supplied from the addition circuit $251_2$, the switch 205 connects to a terminal b to cause the SR image to be stored in the SR image buffer 207.

When the super-resolution processing is started, the initial image generating circuit 206 generates the initial image as described with reference to FIG. 31, for example, and causes the generated initial image to be stored in the SR image buffer 207 through the switch 205 with the terminal a connected.

The SR image buffer 207 stores the initial image generated by the initial image generating circuit 206 or the SR image supplied from the addition circuit $251_2$.

While in the example of FIG. 36, one frame of SR image and three frames of LR images are used to perform the series of super-resolution processing, the number of LR images used for the super-resolution processing is arbitrary.

Figure 37:
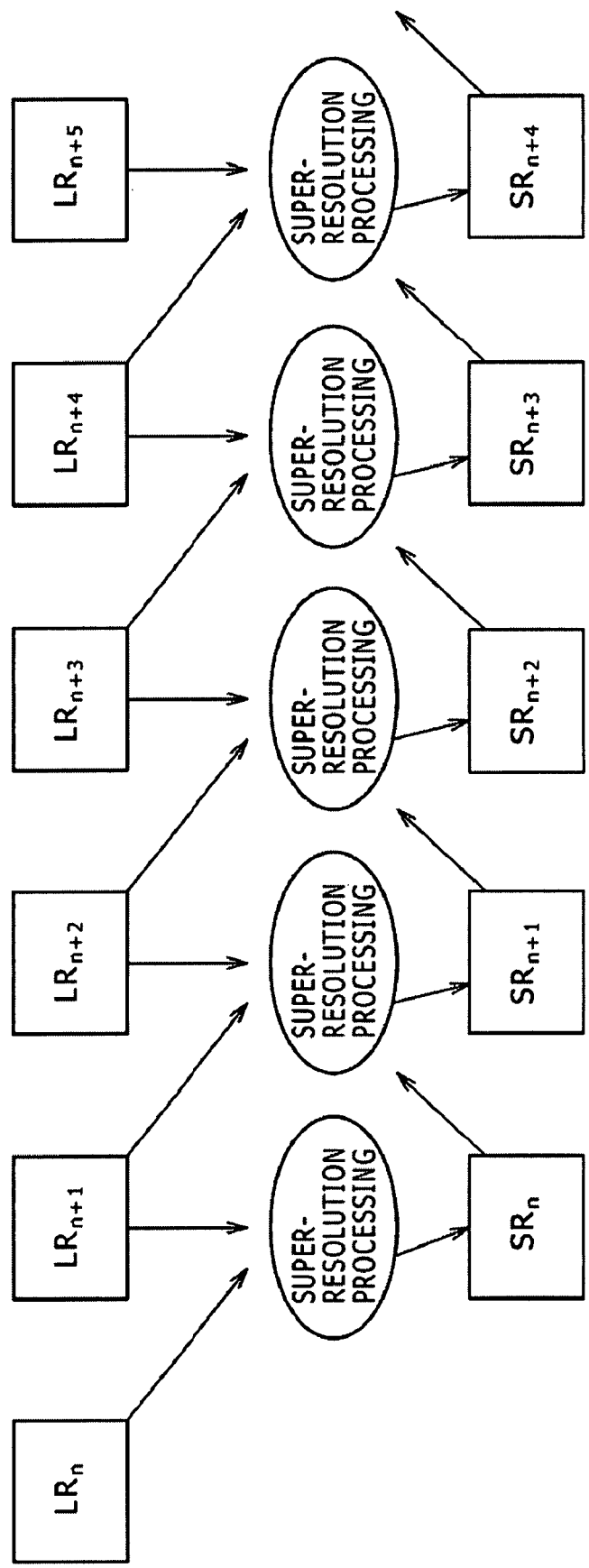
FIG. 37 is a diagram showing an example of super-resolution processing.
Figure 38:
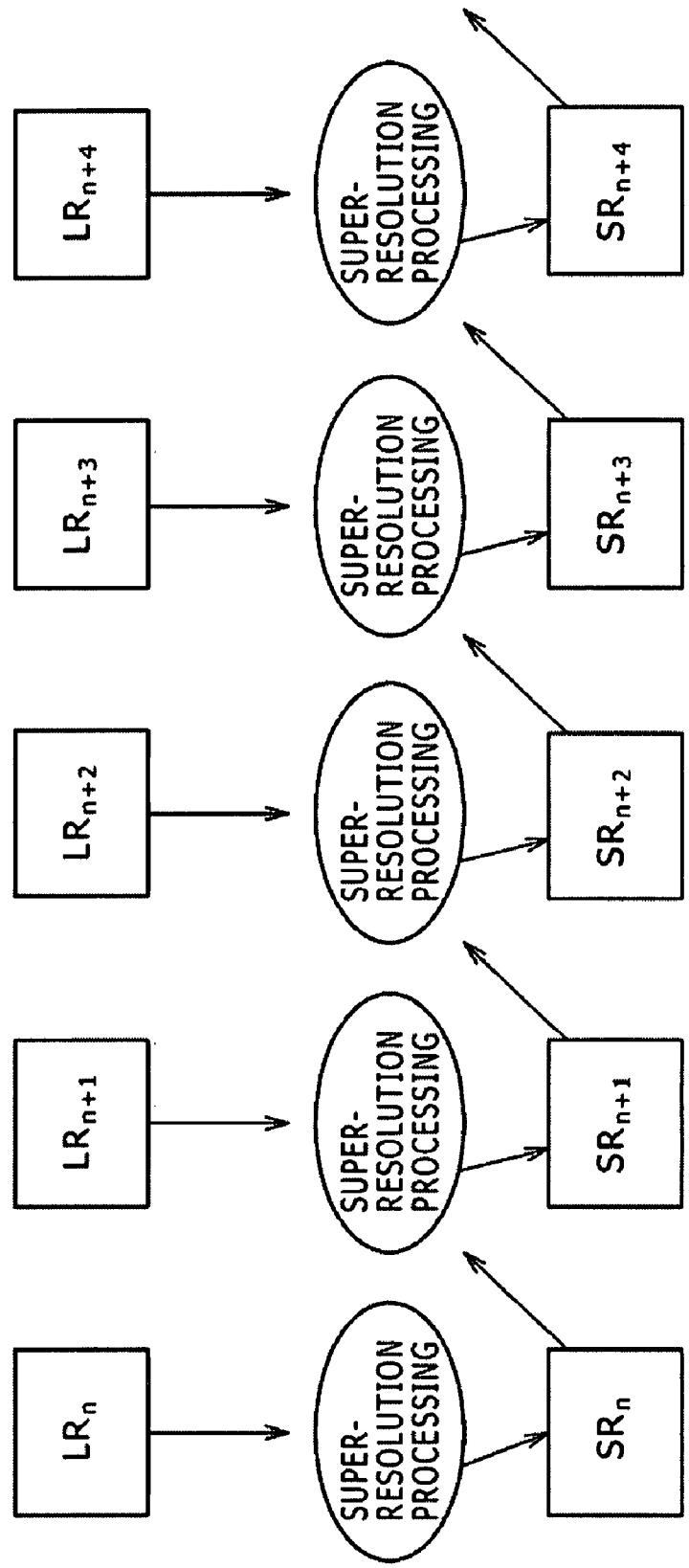
FIG. 38 is a diagram showing another example of super-resolution processing.

For example, as shown in FIG. 37, each super-resolution processing may also be performed using one frame of SR image generated by the immediately preceding super-resolution processing and two frames of LR images, or as shown in FIG. 38, it may also be performed using one frame of SR image generated by the immediately preceding super-resolution processing, and one frame of LR image.

In the example of FIG. 37, each super-resolution processing except for the first processing is performed using two frames of LR images picked up continuously, and one frame of SR image. In the first super-resolution processing, two frames of LR images of $LR_n$, $LR_{n+1}$ are used to generate $SR_n$, which is one frame of SR image.

Moreover, in the second super-resolution processing, two frames of LR images of $LR_{n+1}$, $LR_{n+2}$ and $SR_n$, which is the SR image obtained by the first super-resolution processing, are used to generate $SR_{n+1}$, which is one frame of SR image.

In the third super-resolution processing, two frames of LR images of $LR_{n+2}$, $LR_{n+3}$ and $SR_{n+1}$, which is the SR image obtained by the second super-resolution processing, are used to generate $SR_{n+2}$, which is one frame of SR image.

In the example of FIG. 38, each super-resolution processing except for the first processing is performed using one frame of LR image and one frame of SR image. In the first super-resolution processing, one frame of LR image of $LR_n$ is used to generate $SR_n$, which is one frame of SR image. For example, $SR_n$ is generated by upsampling $LR_n$ to an image at the same resolution as that of the SR image.

Moreover, in the second super-resolution processing, one frame of LR image of $LR_{n+1}$ and $SR_n$, which is the SR image obtained by the first super-resolution processing, are used to generate $SR_{n+1}$, which is one frame of SR image.

In the third super-resolution processing, one frame of LR image of $LR_{n+2}$ and $SR_{n+1}$, which is one frame of SR image obtained by the second super-resolution processing, are used to generate $SR_{n+2}$, which is one frame of SR image.

Figure 39:
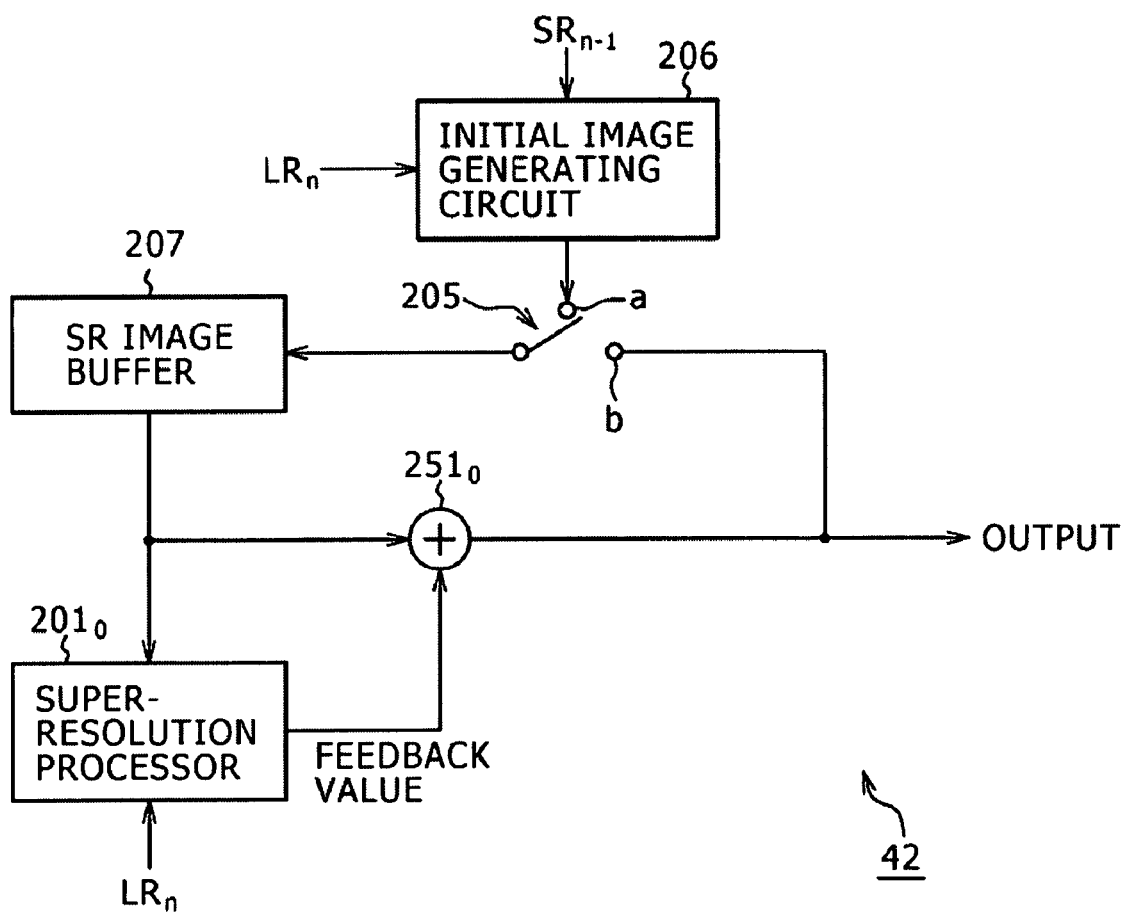
FIG. 39 is a block diagram showing another configuration example of the image processing unit.

FIG. 39 is a block diagram showing still another configuration example of the image processing unit 42 that performs each super-resolution processing using one frame of LR image and one frame of SR image to thereby realize the imaging of a moving picture, as shown in FIG. 38. The same reference numerals are given to the same components of those of FIG. 36. Duplicative description is omitted where appropriate.

The image processing unit 42 of FIG. 39 basically has a similar configuration to the configuration of FIG. 36 except that the super-resolution processor $201_1$, the moving picture application processing circuit $202_1$, and the addition circuit $251_1$ configured to perform the second feedback value arithmetic processing and addition processing, and the super-resolution processor $201_2$, the moving picture application processing circuit $202_2$, and the addition circuit $251_2$ configured to perform the third feedback value arithmetic processing and addition processing are removed.

The super-resolution processor $201_0$ performs the feedback value arithmetic processing based on $LR_n$ and an SR image stored in the SR image buffer 207, and outputs a result of the feedback value arithmetic processing to the addition circuit $251_0$.

The addition circuit $251_0$ adds the SR image stored in the SR image buffer 207 and an SR image represented by the feedback value supplied from the super-resolution processor $201_0$, and outputs an SR image obtained by the addition. The SR image outputted from the addition circuit $251_0$ is supplied to the recording unit 43 as a result of the super-resolution processing, and at the same time, is supplied to the SR image buffer 207 through the switch 205 to be stored.

Thus, the reduction in number of LR images used in one super-resolution processing may make the super-resolution processing faster.

As shown in FIG. 37, in the image processing unit 42 that performs the super-resolution processing using one frame of SR image and two frames of LR images, the super-resolution processor $201_2$, the moving picture application processing circuit $202_2$, and the addition circuit $251_2$ configured for performing the third feedback value arithmetic processing and addition processing are removed from the configuration of the image processing unit 42 of FIG. 36.

While in the foregoing, the LR image(s) and the SR image generated by the immediately preceding super-resolution processing are used to perform each super-resolution processing, in the case where the imaging unit 41 has the function enabling the imaging of a still picture during the imaging of a moving picture, the super-resolution processing may be performed using the LR images and one frame of still picture imaged at the same timing. In this case, the resolution of the still picture imaged during the imaging of the moving picture is larger than the resolution of the LR images.

Figure 40:
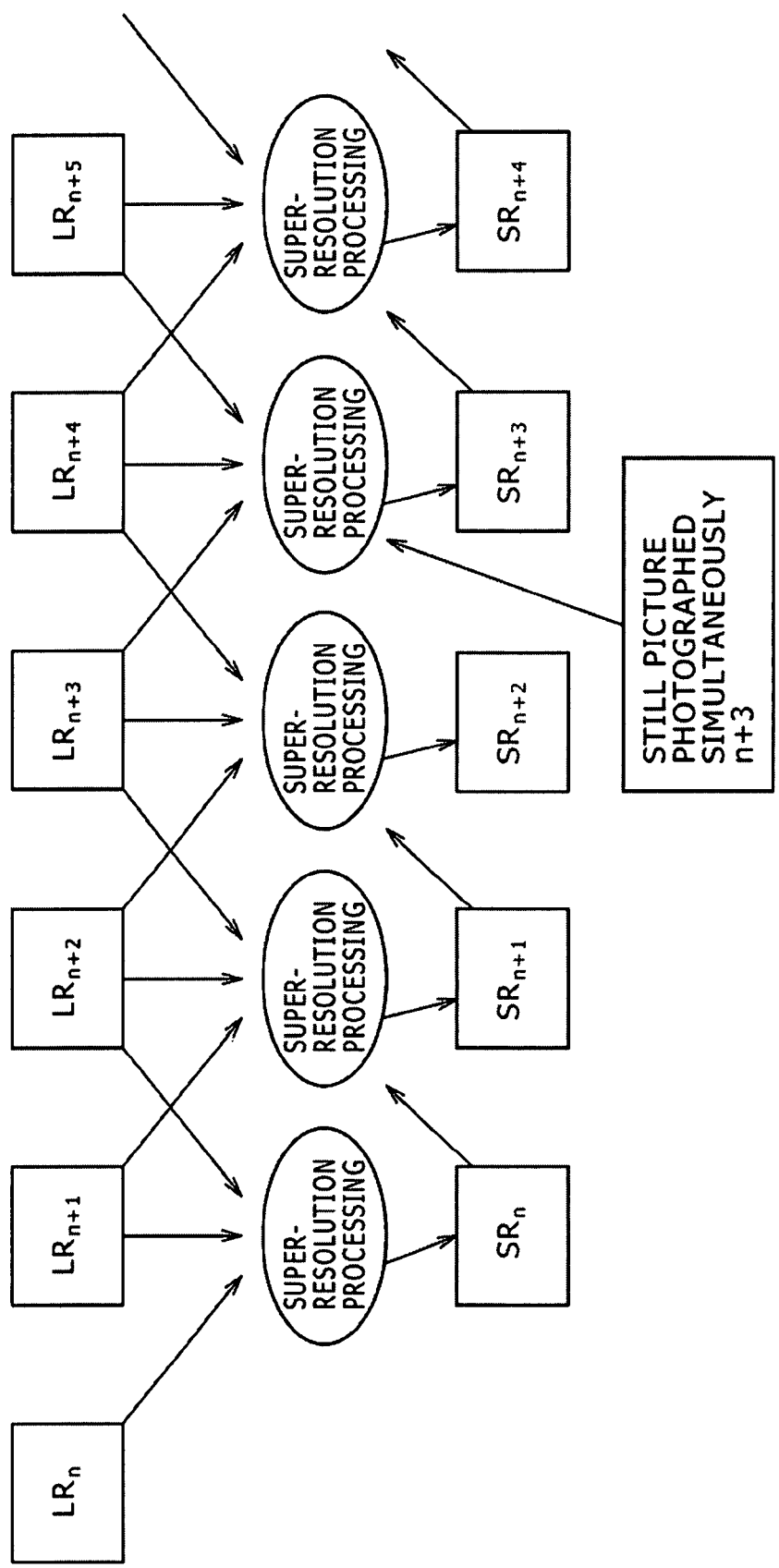
FIG. 40 is a diagram showing still another example of super-resolution processing.

FIG. 40 is a diagram showing a concept of the super-resolution processing using LR images and one frame of still picture imaged during the imaging of the moving picture.

In the example of FIG. 40, the fourth super-resolution processing is performed using three frames of LR images of $LR_{n+3}$, $LR_{n+4}$, $LR_{n+}$, and a still picture$_{n+3}$, which is one frame of still picture imaged with the imaging of $LR_{n+3}$ at the same time.

The above-described series of processing may be executed by a hardware or software. When the series of processing is executed by the software, the software is installed on a computer in which a program configuring the software is installed on a dedicated hardware, or is installed on, for example, a general-purpose personal computer capable of executing various functions by installing various programs, etc. through a program recording medium by the program.

FIG. 41 is a block diagram showing one example of a configuration of a personal computer executing the above-described series of processing.

A CPU (Central Processing Unit) 301 executes various types of processing according to programs stored in a ROM (Read Only Memory) 302, or a storage unit 308. Programs executed by the CPU 301, data and the like are stored in a RAM (Random Access Memory) 303 as appropriate. The CPU 301, ROM 302, and RAM 303 are connected to one another through a bus 304.

An input/output interface 305 is also connected to the CPU 301 through the bus 304. An input unit 306 made of a key board, a mouse, a microphone and the like, and an output unit 307 made of a display, a speaker and the like are connected to the input/output interface 305. The CPU 301 executes various types of processing corresponding to commands inputted from the input unit 306. The CPU 301 outputs results of the processing to the output unit 307.

The storage unit 308 connected to the input/output interface 305 is made of a hard disk, for example, to store the programs executed by the CPU 301 and various types of data. A communication unit 309 communicates with an external apparatus through the internet, or a network such as a local area network.

A driver 310 connected to the input/output interface 305 drives a removable medium 311 such as a magnetic disc, optical disc, magnetic optical disc and semiconductor memory, etc. when the removable medium 311 is loaded, and acquires a program, data or the like stored therein. The acquired program or data is transferred to the storage unit 308 to be stored, as needed.

A program recording medium to store a program, which is installed on the computer and put into an executable state by the computer, as shown in FIG. 41, may be a removable medium 311, which is a package medium consisting of a magnetic disc (including a flexible disc), optical disc (including CD-ROM (Compact Disc-Read Only Memory)), and DVD (Digital Versatile Disc)), magnetic optical disc, semiconductor memory or the like, or the ROM 302 which stores the program temporarily or permanently, the hard disk configuring the storage unit 308, or the like. The storage of the program into the program recording medium is performed utilizing a wired or wireless communication medium including a local area network, the internet and digital satellite broadcasting, through the communication unit 309, which is an interface such as a router and a modem, as needed.

In the present specification, the steps describing the program include not only the processing performed in a chronological order as described but also processing executed in parallel or independently rather than in the chronological order.

The embodiments of the present invention are not limited to the above-described embodiments, but various modifications can be made in a range not departing from the gist of the present invention.

The present application claims benefit of priority of Japanese patent Application No. 2006-324318 filed in the Japanese Patent Office on Nov. 30, 2006, the entire content of which being incorporated herein by reference.

What is claimed is:

1. An image processing apparatus comprising:
   addition means for performing addition processing of adding pixels of a differential image at a second resolution representing a difference between an inputted image at a first resolution and an image at the second resolution higher than the first resolution as pixels of an inputted image at the second resolution; and
   image processing means including a plurality of the addition means, the image processing means being configured to perform second and subsequent addition processing, and generate an image at the second resolution as a processing result by performing the addition processing for a predetermined number of times, the addition processing being performed with inputs of an image at the first resolution and an image at the second resolution obtained by an immediately preceding addition processing, the images at the first and second resolutions being different from each other.

2. The image processing apparatus according to claim 1, further comprising control means for controlling, in accordance with a switch-over of a switch by a loop control means, whether or not to perform the next addition processing with the input of the image at the second resolution obtained by the addition processing, based on the image at the second resolution obtained by the addition processing.

3. The image processing apparatus according to claim 1, further comprising adjustment means for performing adjustment of a gain of a signal representing the differential image.

4. The image processing apparatus according to claim 1, further comprising adjustment means for performing at least any one of adjustment of a gain of the signal representing the image at the second resolution inputted as the image used to obtain the differential image, and adjustment of a gain of the signal representing the differential image.

5. The image processing apparatus according to claim 1, further comprising generation means for generating an initial image at the second resolution, which is an input of the first addition processing,
   wherein when the image processing means generates an image at the second resolution as a processing result of an n-th frame using an picked-up image at the first resolution of an n-th frame,
   the generating means generates as the initial image an image in which a unit of pixels constituting an image at the second resolution of a processing result of an (n−1)-th frame are replaced with pixels constituting an image obtained by upsampling the image at the first resolution of the n-th frame.

6. The image processing apparatus according to claim 5, wherein the generating means further comprises:
   upsampling processing means for upsampling the image at the first resolution of the n-th frame obtained by imaging;
   correction means for applying motion compensation to the image at the second resolution as the processing result of the (n−1)-th frame, using a motion vector detected based on the image at the second resolution as the processing result of the (n−1)-th frame and the image obtained with the upsampling of the upsampling processing means; and
   image generating means for generating the initial image by replacing pixels in a region where an object whose position is moved by the motion compensation is displayed in the image obtained by applying the motion compensation by the correction means, with pixels of the image obtained with the upsampling of the upsampling processing means, in a corresponding region.

7. An image processing method of an image processing apparatus including a plurality of addition means for performing addition processing of adding pixels of a differential image at a second resolution representing a difference between an inputted image at a first resolution and an image at the second resolution higher than the first resolution as pixels of an inputted image at the second resolution, the method comprising the step of:
   performing second and subsequent addition processing with the inputs of the image at the first resolution and the image at the second resolution obtained by an immediately preceding addition processing, the images at the first and second resolutions being different from each other; and
   generating an image at the second resolution as a processing result by performing the addition processing for a predetermined number of times.

8. A computer program comprising programming instructions stored in a non-transitory computer readable medium, wherein the computer program, when executed on a computer controls the computer to execute image processing of an image processing apparatus including a plurality of addition means for performing addition processing of adding pixels of a differential image at a second resolution representing a difference between an inputted image at a first resolution and an image at the second resolution higher than the first resolution as pixels of an inputted image at the second resolution, the program comprising the steps of:
   performing second and subsequent addition processing with the inputs of an image at the first resolution and an image at the second resolution obtained by an immediately preceding addition processing, the images at the first and second resolutions being different from each other, and
   generating an image at the second resolution as a processing result by performing the addition processing for a predetermined number of times.

9. An image processing apparatus comprising:
- an adder for performing addition processing of adding pixels of a differential image at a second resolution representing a difference between an inputted image at a first resolution and an image at the second resolution higher than the first resolution as pixels of an inputted image at the second resolution; and
- a processor including a plurality of the adders, the processor being configured to perform second and subsequent addition processing, and generate an image of the second resolution as a processing result by performing the addition processing for a predetermined number of times, the addition processing being performed with inputs of an image at the first resolution and an image at the second resolution obtained by an immediately preceding addition processing, the images at the first and second resolutions being different from each other.

* * * * *